United States Patent
Kunimatsu et al.

(10) Patent No.: US 9,280,466 B2
(45) Date of Patent: Mar. 8, 2016

(54) INFORMATION PROCESSING DEVICE INCLUDING MEMORY MANAGEMENT DEVICE MANAGING ACCESS FROM PROCESSOR TO MEMORY AND MEMORY MANAGEMENT METHOD

(75) Inventors: Atsushi Kunimatsu, Chiba (JP); Hiroto Nakai, Yokohama (JP); Hiroyuki Sakamoto, Ome (JP); Kenichi Maeda, Kamakura (JP); Masaki Miyagawa, Mushashino (JP); Hiroshi Nozue, Tokyo (JP); Kazuhiro Kawagome, Kokubunji (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1020 days.

(21) Appl. No.: 12/555,952

(22) Filed: Sep. 9, 2009

(65) Prior Publication Data

US 2010/0064111 A1    Mar. 11, 2010

(30) Foreign Application Priority Data

Sep. 9, 2008  (JP) ................................ 2008-231363
Jul. 17, 2009 (JP) ................................ 2009-169371

(51) Int. Cl.
*G06F 12/08* (2006.01)
*G06F 12/02* (2006.01)

(52) U.S. Cl.
CPC ............ *G06F 12/0804* (2013.01); *G06F 12/08* (2013.01); *G06F 12/0888* (2013.01); *G06F 12/0246* (2013.01); *G06F 2212/1036* (2013.01);
(Continued)

(58) Field of Classification Search
None
See application file for complete search history.

(56) References Cited

U.S. PATENT DOCUMENTS 5,737,742 A * 4/1998 Achiwa et al. ................. 711/103
5,930,193 A    7/1999 Achiwa et al.
(Continued)

FOREIGN PATENT DOCUMENTS

CN    1311509 A    9/2001
CN    1620700 A    5/2002
(Continued)

OTHER PUBLICATIONS

Office Action for Japanese Patent Application No. 2008-231363, dated Jan. 6, 2011, mailed Jan. 11, 2011, Japanese Patent Office, 5 pgs. (with English translation).
(Continued)

*Primary Examiner* — Christian P Chace
*Assistant Examiner* — Eric Loonan
(74) *Attorney, Agent, or Firm* — Sprinkle IP Law Group

(57) ABSTRACT

A device according to an example of the invention comprises a section which accepts a write destination logical address and write target data from a processor, the write destination logical address indicating a write position to write the write target data into a composite memory which includes a first memory and a nonvolatile second memory, a section which determines a write destination physical address corresponding to the write destination logical address so that the number of times of access to the second memory is smaller than the number of times of access to the first memory, a section which stores, in a storage section, address conversion data associating the write destination logical address with the write destination physical address, and a section which writes the write target data into a position in the composite memory indicated by the write destination physical address.

9 Claims, 49 Drawing Sheets

(52) U.S. Cl.
CPC ... *G06F 2212/205* (2013.01); *G06F 2212/2022* (2013.01); *G06F 2212/7201* (2013.01)

(56) References Cited

U.S. PATENT DOCUMENTS

| | | | |
|---|---|---|---|
| 6,742,084 B1 * | 5/2004 | Defouw et al. | 711/133 |
| 6,922,754 B2 * | 7/2005 | Liu et al. | 711/138 |
| 2003/0112692 A1 | 6/2003 | Gonzalez et al. | |
| 2005/0132128 A1 | 6/2005 | Lee | |
| 2006/0200276 A1 | 9/2006 | Sayama et al. | |
| 2007/0285980 A1 * | 12/2007 | Shimizu et al. | 365/185.03 |
| 2008/0244165 A1 | 10/2008 | Kunimatsu | |
| 2009/0049234 A1 | 2/2009 | Oh et al. | |
| 2009/0083478 A1 | 3/2009 | Kunimatsu | |
| 2009/0132621 A1 * | 5/2009 | Jensen et al. | 707/205 |
| 2009/0132778 A1 | 5/2009 | Danilak | |

FOREIGN PATENT DOCUMENTS

| | | |
|---|---|---|
| CN | 1828560 A | 9/2006 |
| EP | 1130590 A2 | 9/2001 |
| JP | 05-325593 | 12/1993 |
| JP | 06-215589 | 8/1994 |
| JP | 06-223240 | 8/1994 |
| JP | 07-146820 | 6/1995 |
| JP | 07-296591 | 11/1995 |
| JP | 08-16482 | 1/1996 |
| JP | 08-016482 | 1/1996 |
| JP | 08-241599 | 9/1996 |
| JP | 08-272664 | 10/1996 |
| JP | 09-259029 | 10/1997 |
| JP | 09-288896 | 11/1997 |
| JP | 10-116225 | 5/1998 |
| JP | 10-187548 | 7/1998 |
| JP | 11-003287 | 1/1999 |
| JP | 11-031102 | 2/1999 |
| JP | 11-353219 A | 12/1999 |
| JP | 2000-181805 | 6/2000 |
| JP | 2001-014874 | 1/2001 |
| JP | 2001-266580 | 9/2001 |
| JP | 2002-133880 | 5/2002 |
| JP | 2002-533810 | 10/2002 |
| JP | 2003-178039 | 6/2003 |
| JP | 2003-330792 | 11/2003 |
| JP | 2004-157686 | 6/2004 |
| JP | 2004-535615 | 11/2004 |
| JP | 2006-048506 | 2/2006 |
| JP | 2006-235960 | 9/2006 |
| JP | 2007-293917 | 11/2007 |
| JP | 2007-305210 A | 11/2007 |
| JP | 2007-310625 | 11/2007 |
| JP | 2008-139927 | 6/2008 |
| JP | 2008-140238 | 6/2008 |
| JP | 2008-242944 | 10/2008 |
| JP | 2009-003569 | 1/2009 |
| JP | 2009-048613 | 3/2009 |
| JP | 2009-064394 | 3/2009 |
| JP | 2009-537904 | 10/2009 |
| JP | 2009-301680 | 12/2009 |
| JP | 2010-009500 | 1/2010 |
| JP | 2010-015516 | 1/2010 |
| JP | 2010-198407 | 9/2010 |
| KR | 2007-0109885 A | 11/2007 |
| WO | WO 03/052764 | 6/2003 |
| WO | WO 2008/073421 A2 | 6/2008 |
| WO | WO 2008/098363 A1 | 8/2008 |
| WO | WO 2009/067138 A1 | 5/2009 |
| WO | WO 2009/090731 A1 | 7/2009 |

OTHER PUBLICATIONS

Office Action for Chinese Patent Application No. 200910002294.0, Chinese Patent Office, dated Mar. 24, 2011, with English translation, 26 pgs.
International Search Report for PCT/JP2010/053817 mailed Jun. 8, 2010, 7 pgs.
Written Opinion for PCT/JP2010/053817 mailed Jun. 8, 2010, 5 pgs.
Office Action (with English translation) for Japanese Patent Application No. 2010-048331, mailed Jul. 9, 2013, 11 pgs.
Office Action (with English translation) for Japanese Patent Application No. 2010-048338, mailed Jul. 9, 2013, 12 pgs.
Office Action (with English translation) for Japanese Patent Application No. 2010-048328, mailed Jul. 9, 2013, 6 pgs.
Office Action (with English translation) for Japanese Patent Application No. 2009-169371, mailed Jul. 9, 2013, 8 pgs.
Office Action (with English translation) for Japanese Patent Application No. 2010-048334, mailed Jun. 25, 2013, 7 pgs.
Office Action (with English translation) for Japanese Patent Application No. 2010-048335, mailed Jun. 25, 2013, 8 pgs.
Office Action (with English translation) for Japanese Patent Application No. 2010-048337, mailed Jun. 25, 2013, 11 pgs.
Office Action (with English translation) for Japanese Patent Application No. 2010-048329, mailed Jun. 25, 2013, 12 pgs.
Office Action (with English translation) for Japanese Patent Application No. 2010-048339, mailed Jun. 25, 2013, 8 pgs.
Kohji, Kai, "Study of the Memory Architecture for Systems Using a Flash Memory as Main Memory," Considerations on Memo, IEICE Technical Report, the Institute of Electronics, Information and Communication Engineers, Japan, Oct. 6, 1998, vol. 98, No. 323, pp. 51-58.
Office Action (with English translation) for Chinese Patent Application No. 201080031863.5, issued Jan. 6, 2014, 24 pgs.
Office Action (with English translation) for Chinese Patent Application No. 200910002294.0, issued Dec. 26, 2014, 21 pgs.
European Search Report for European Patent Application No. 10799661.3, dated Nov. 6, 2014, 7 pgs.

* cited by examiner

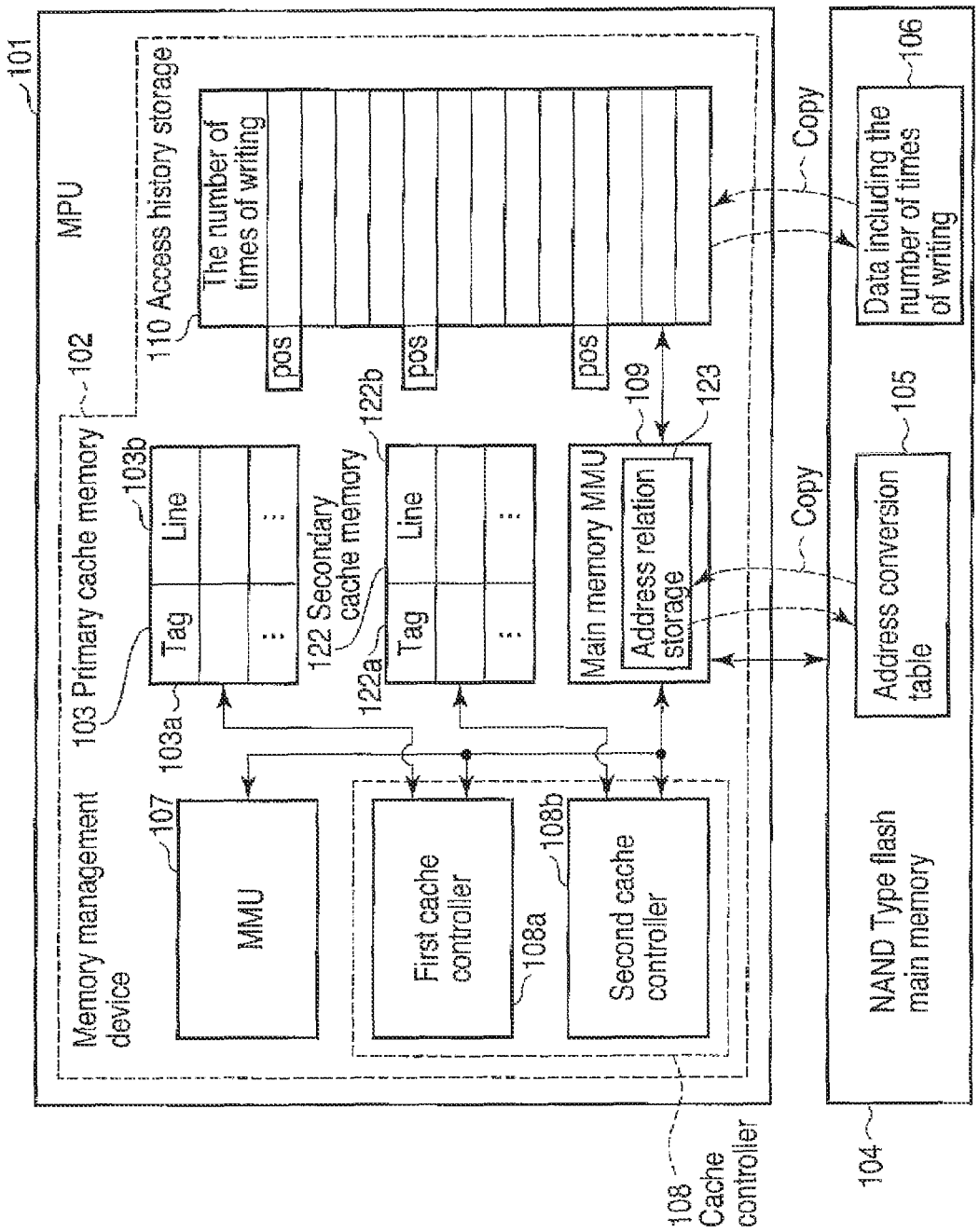
F I G. 1

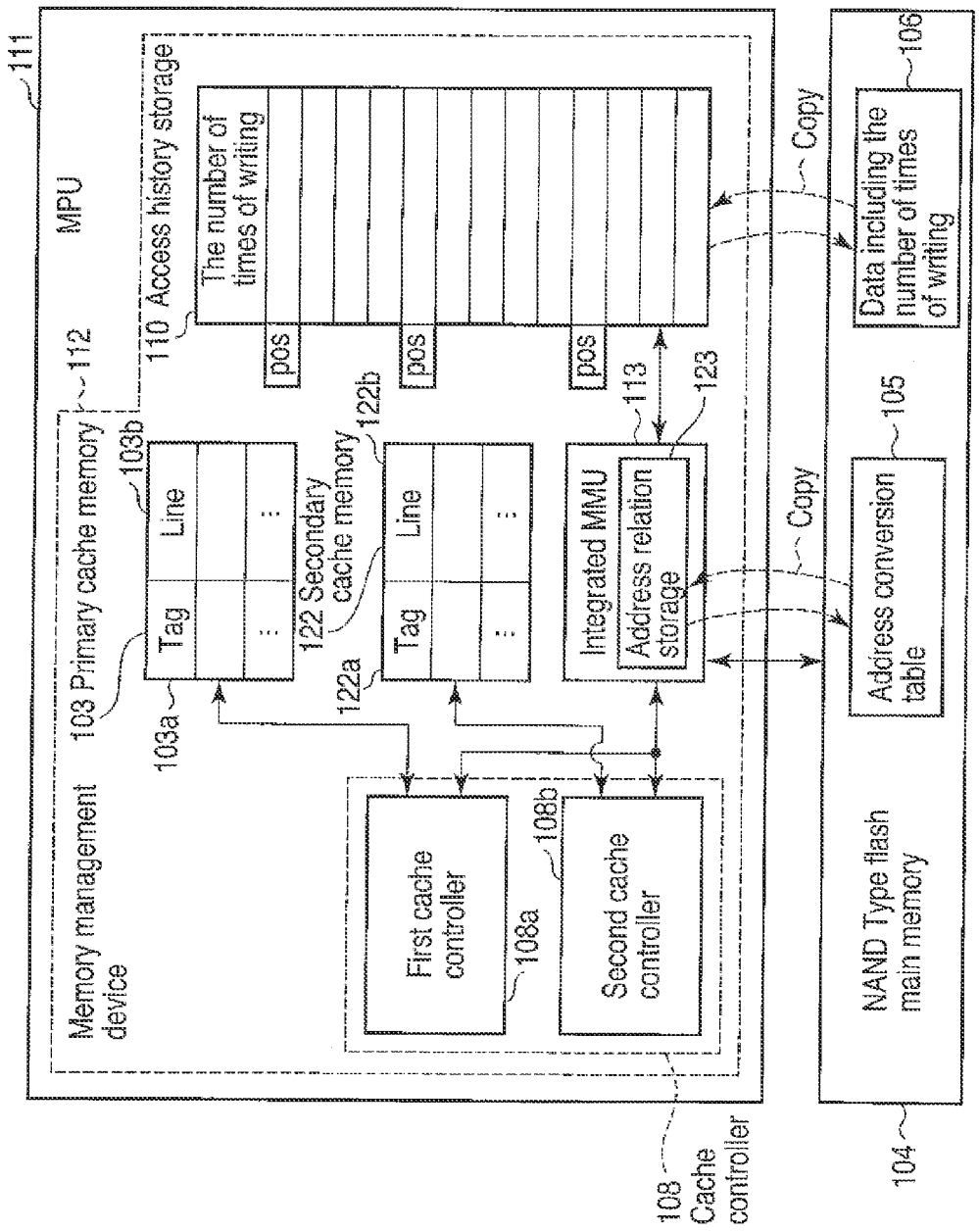
F I G. 6

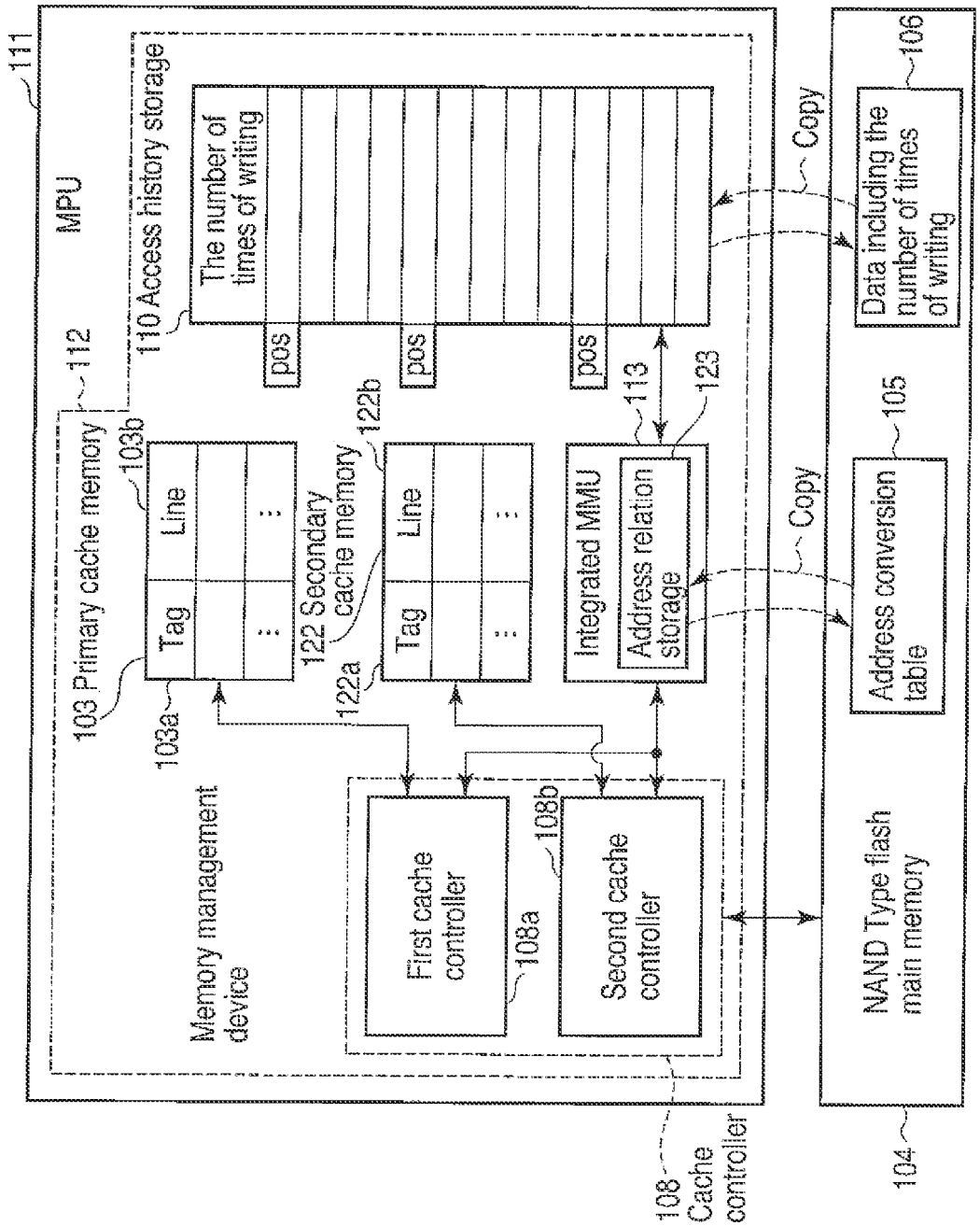
F I G. 9

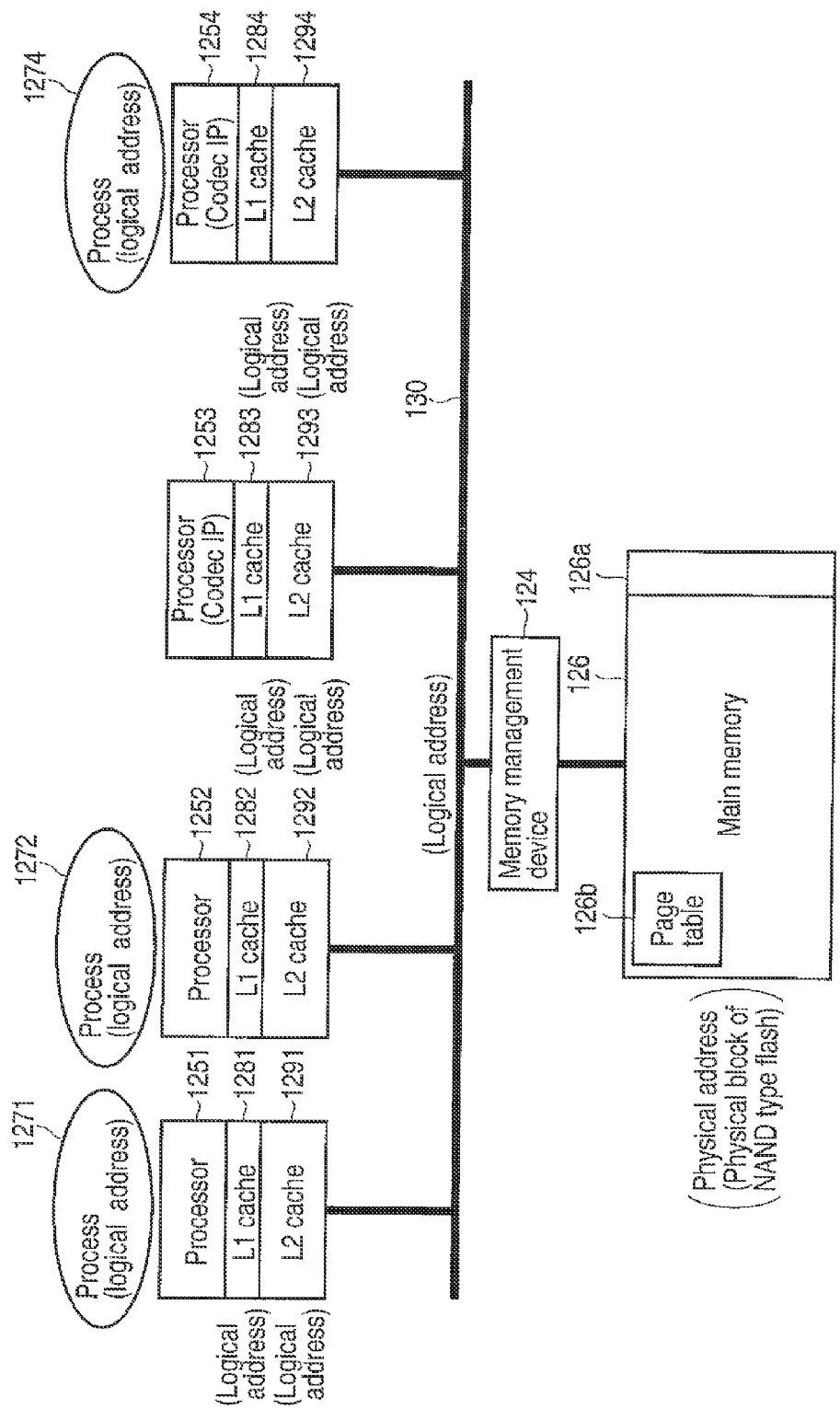
F I G. 11

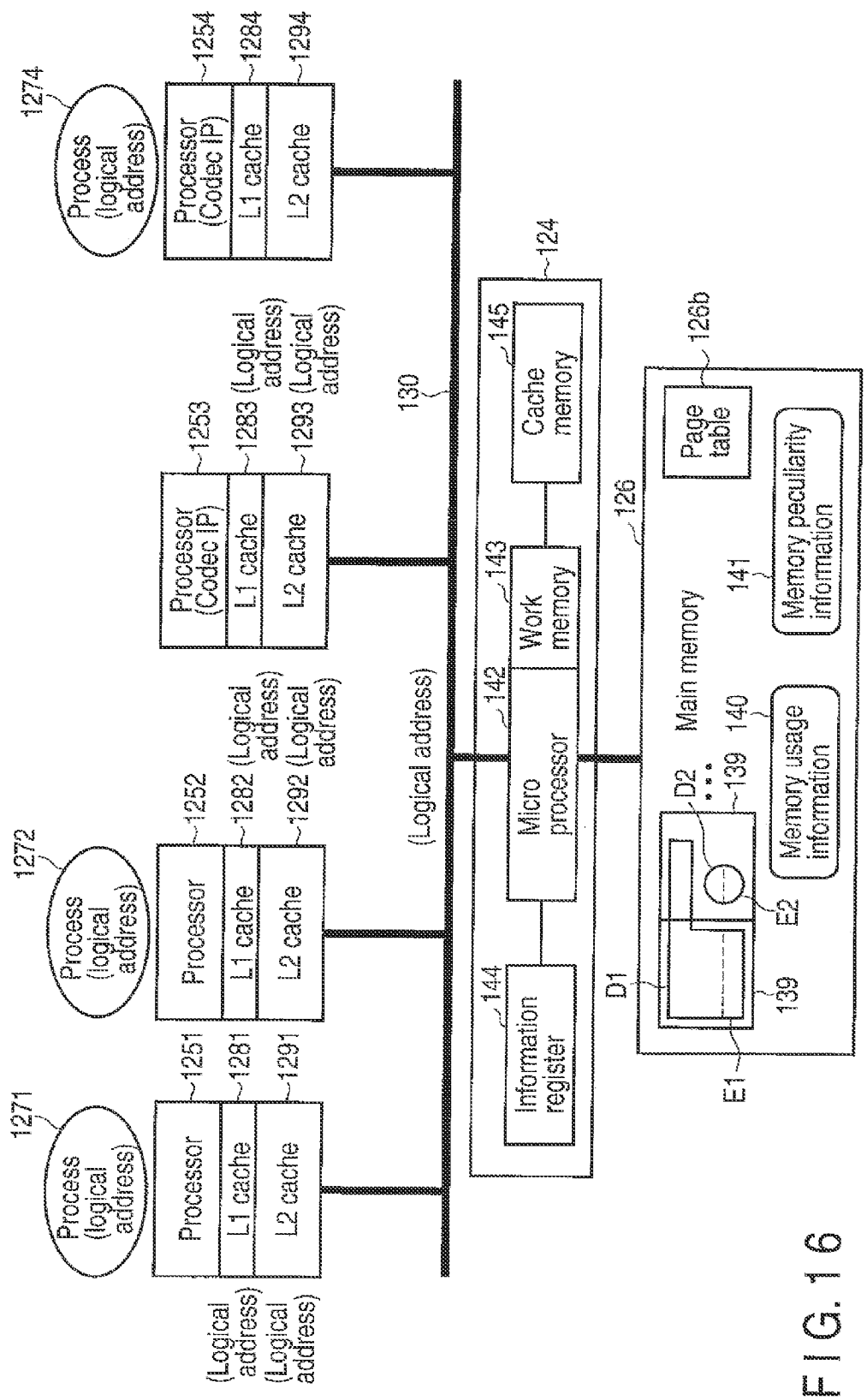
F I G. 16

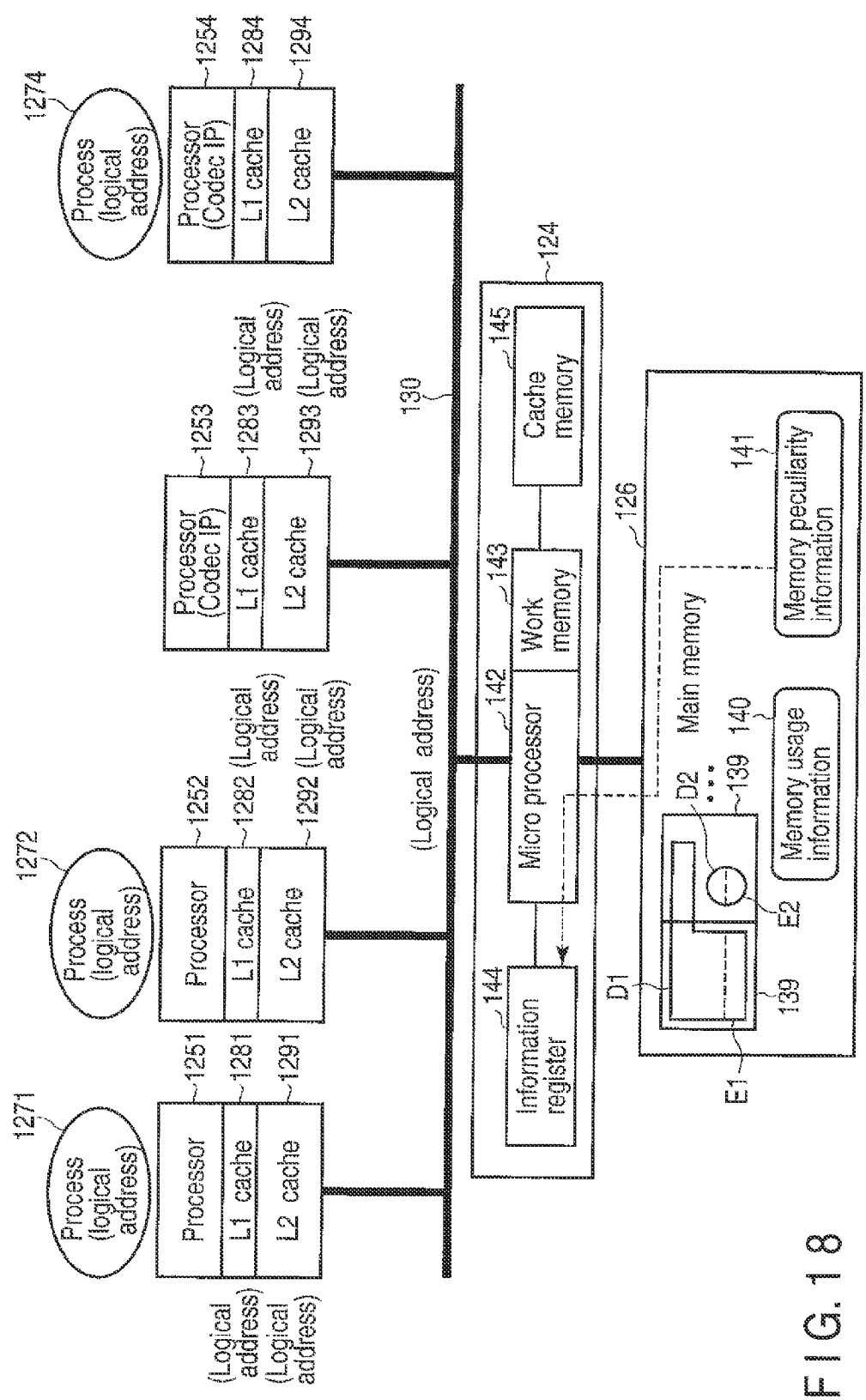
F I G. 18

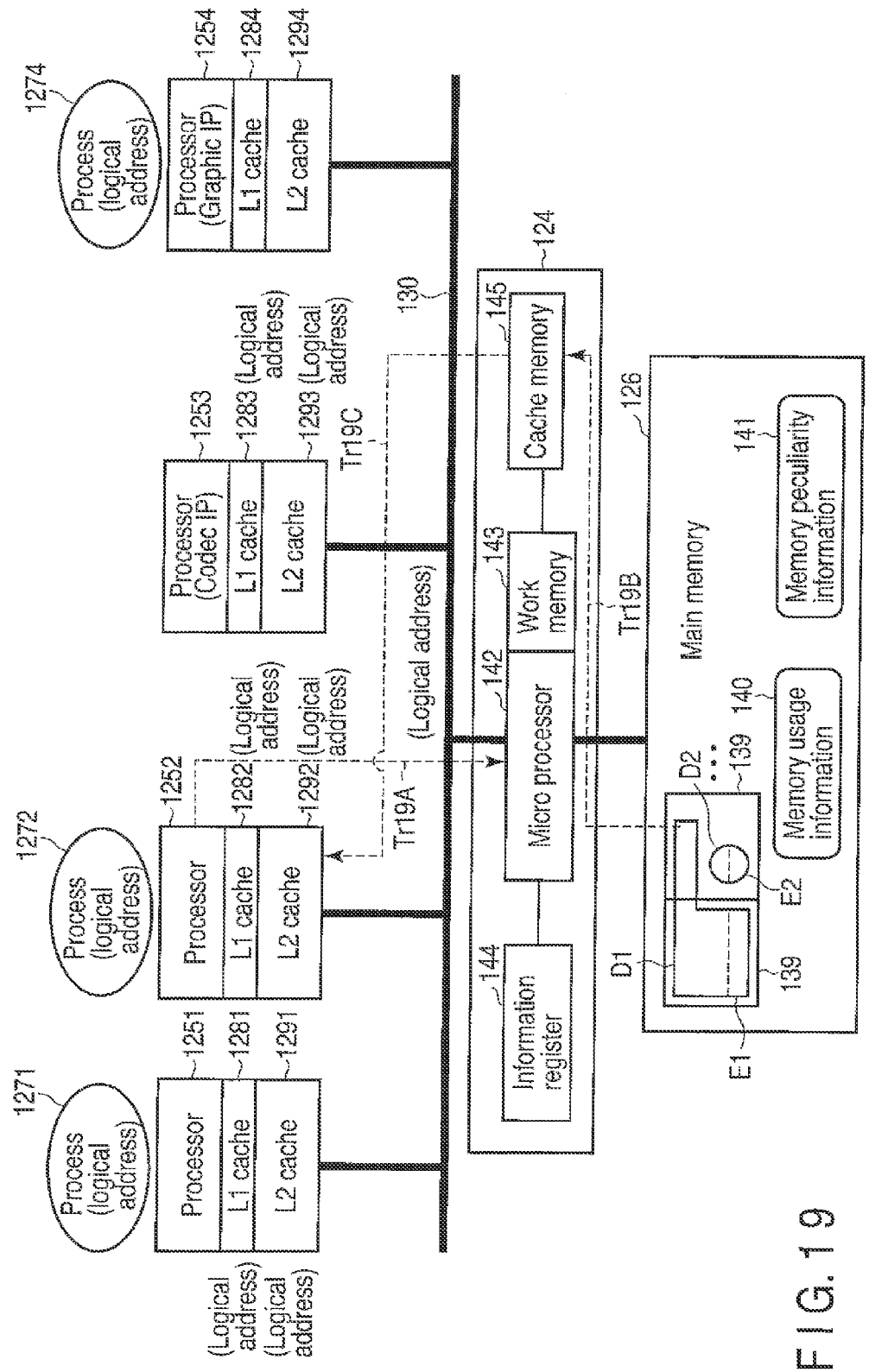
F I G. 19

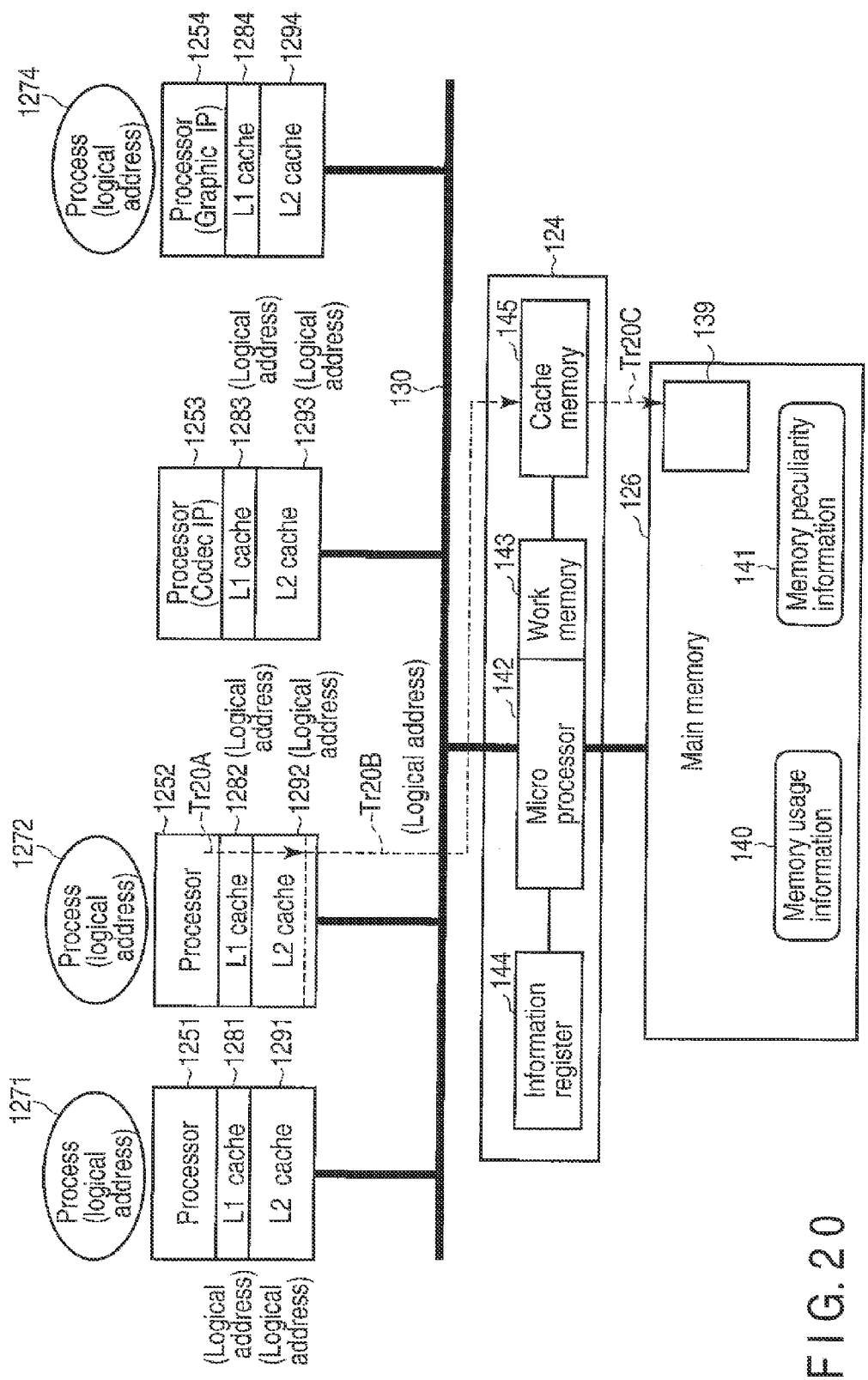
F I G. 20

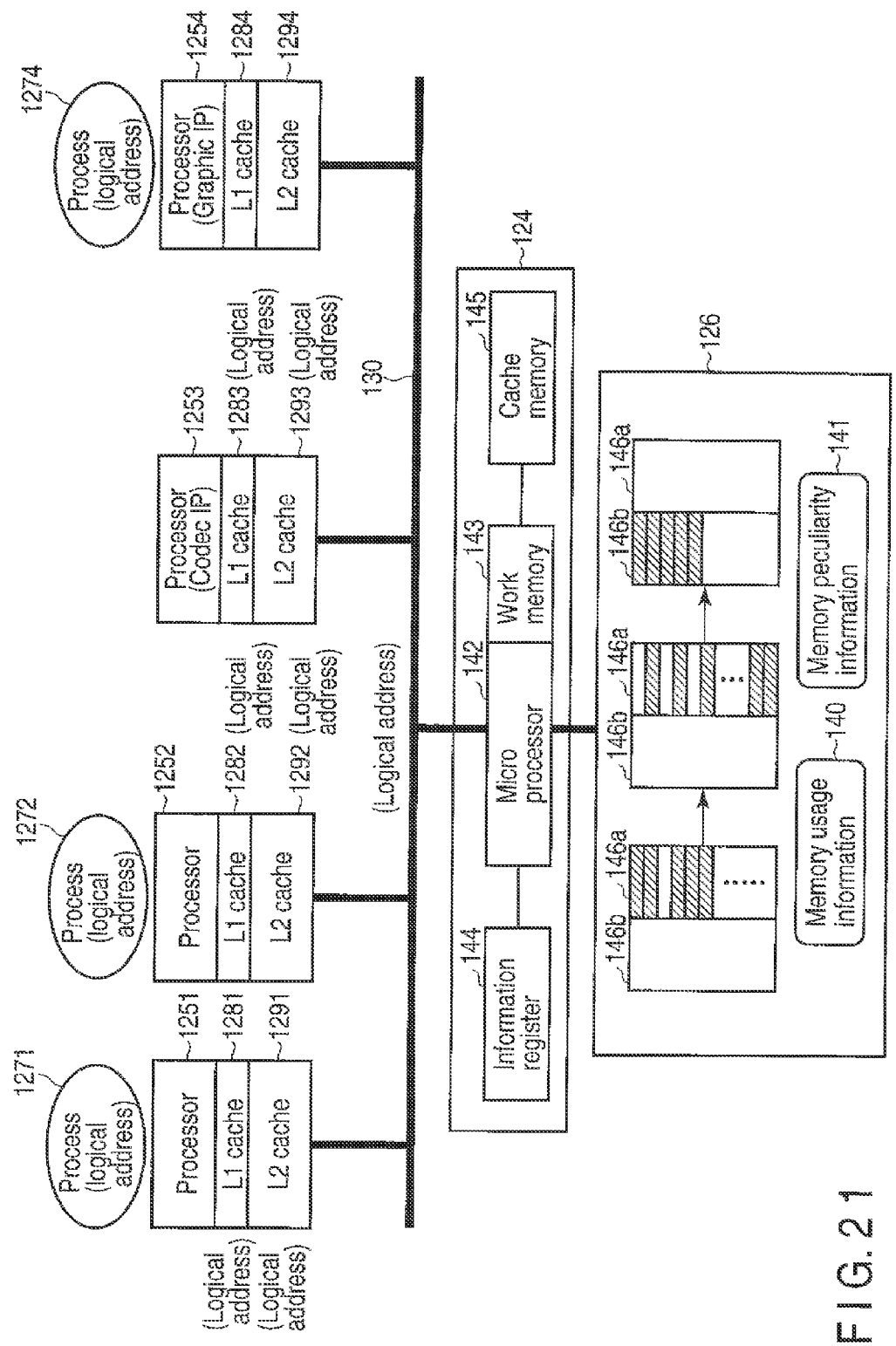
F I G. 21

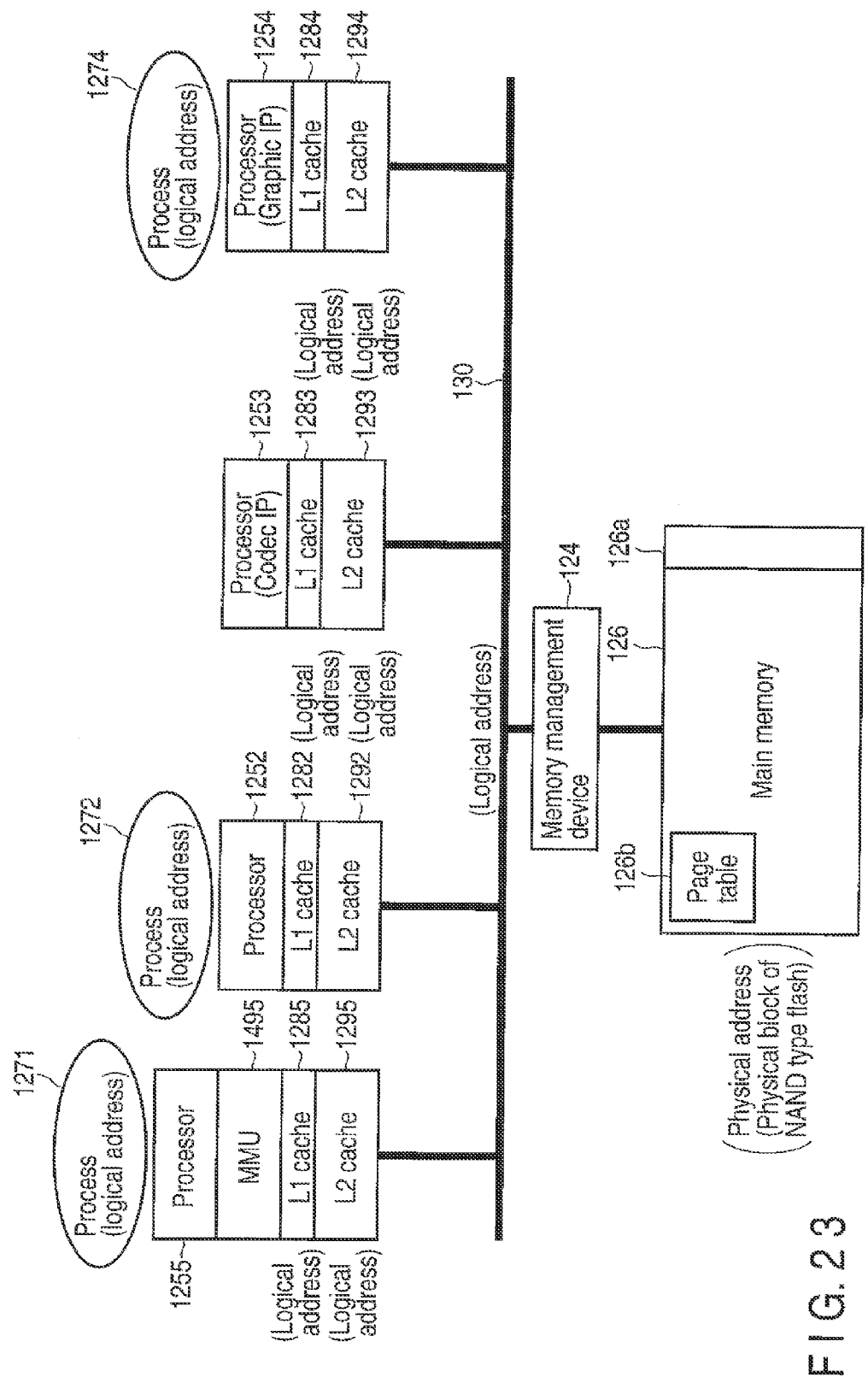
F I G. 23

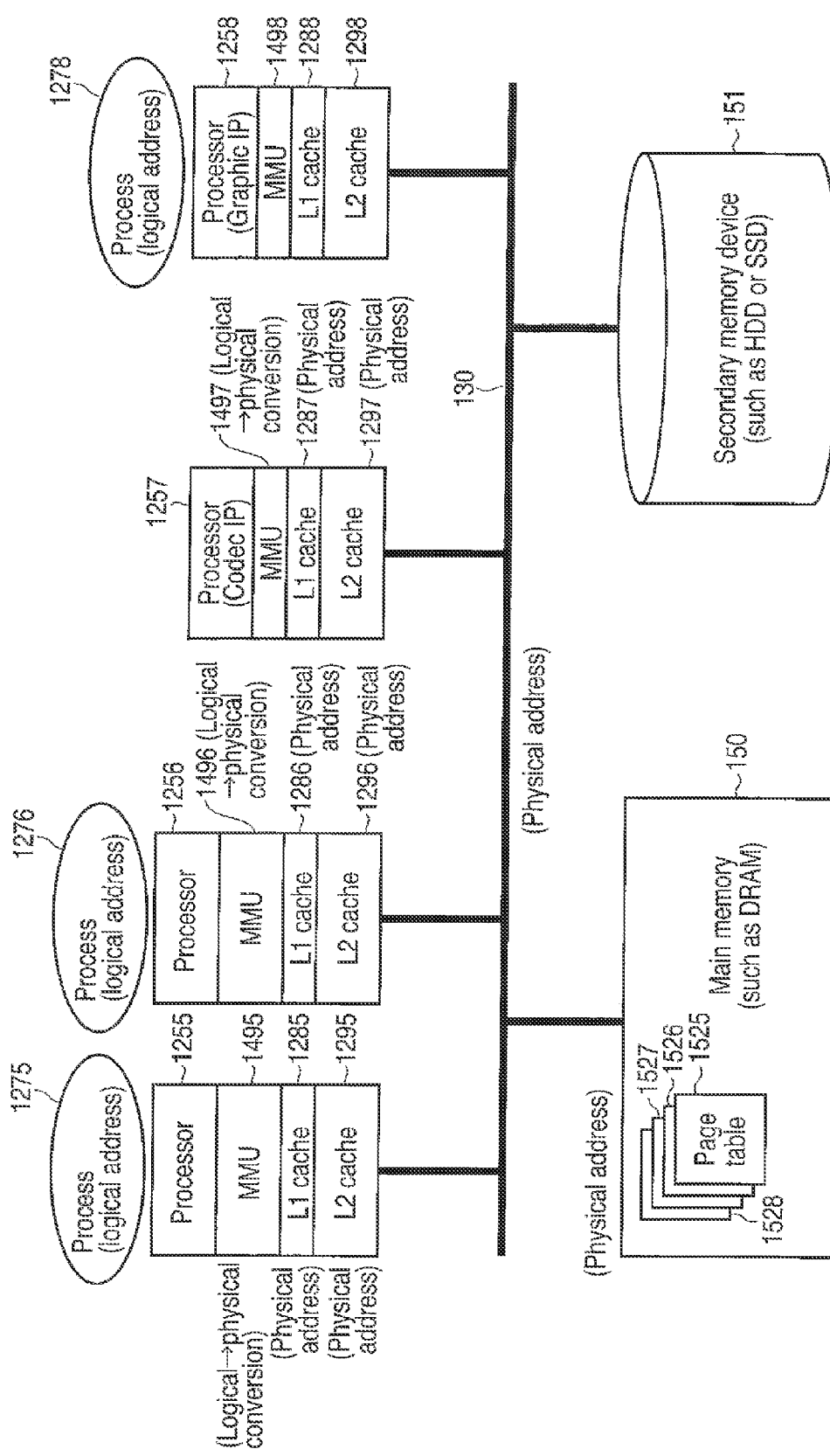
F I G. 24

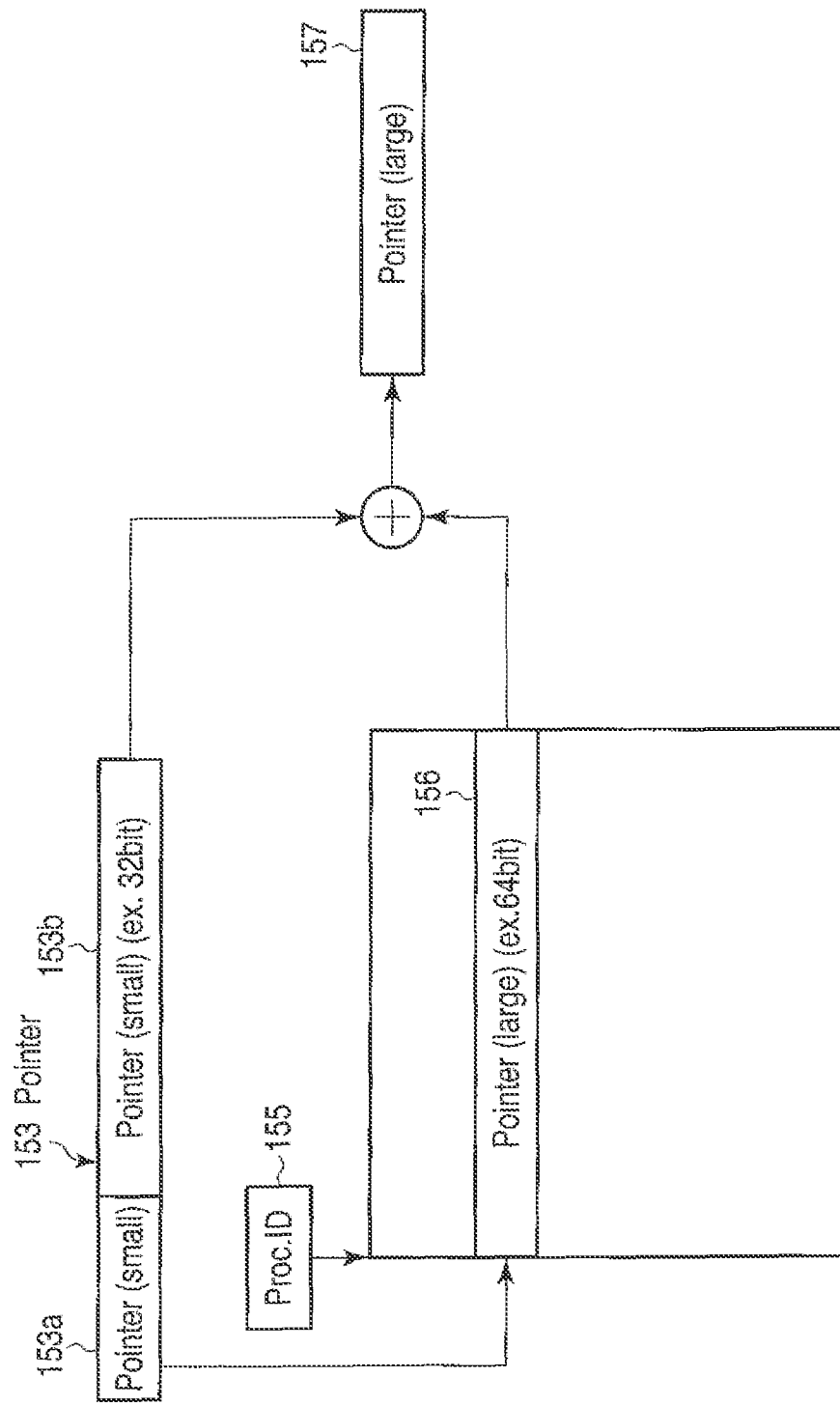
F I G. 25

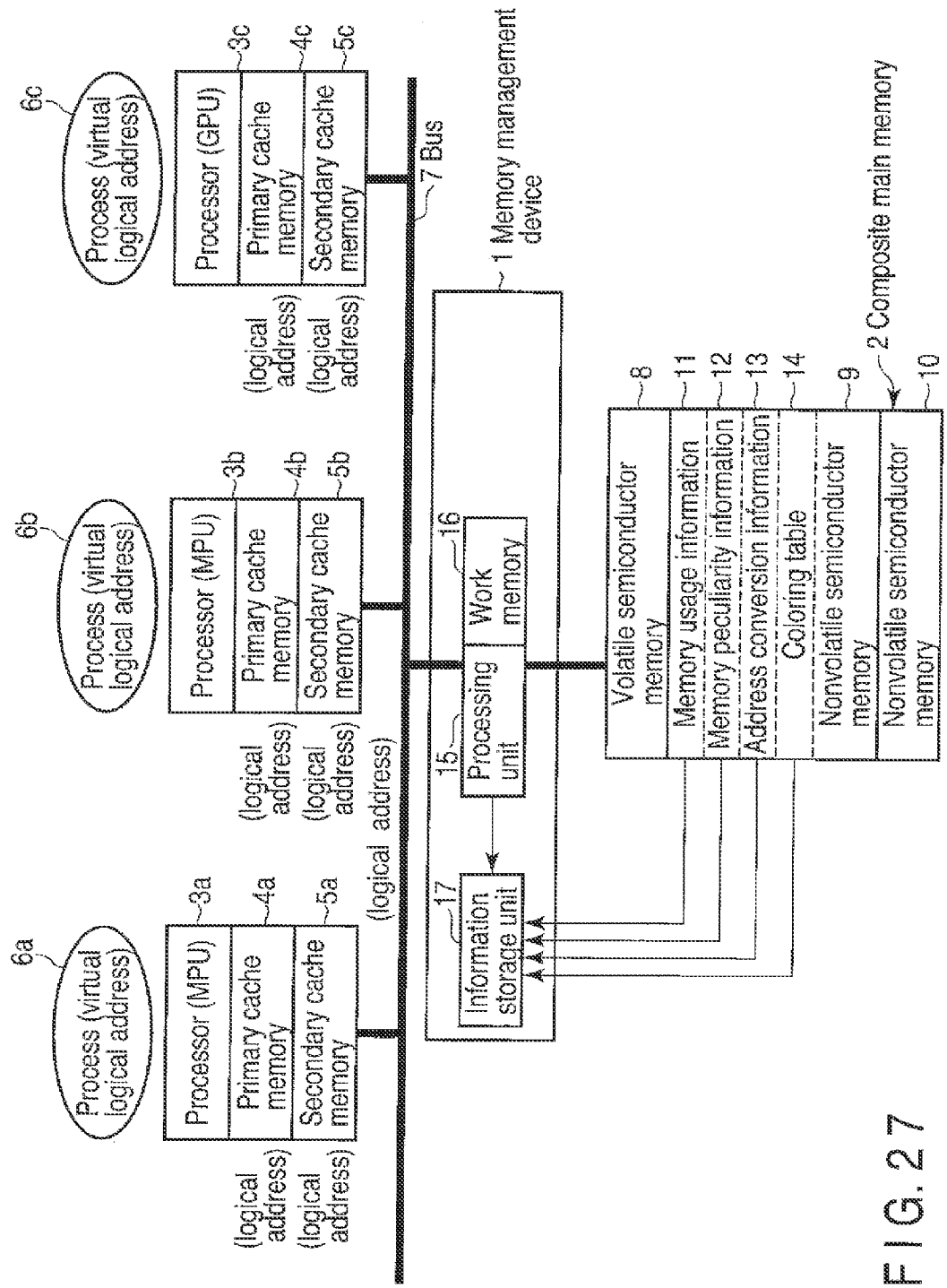
F I G. 27

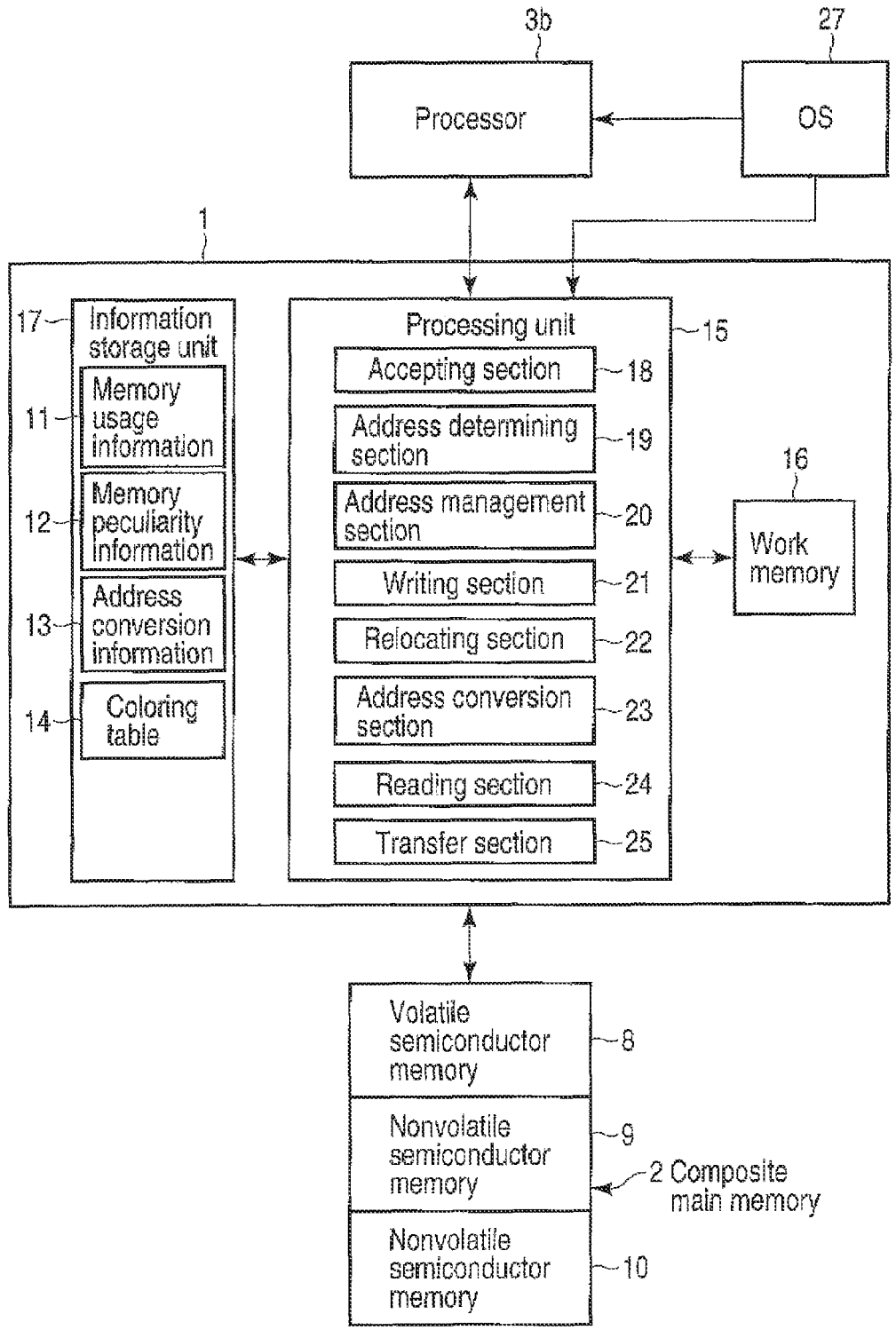
F I G. 28

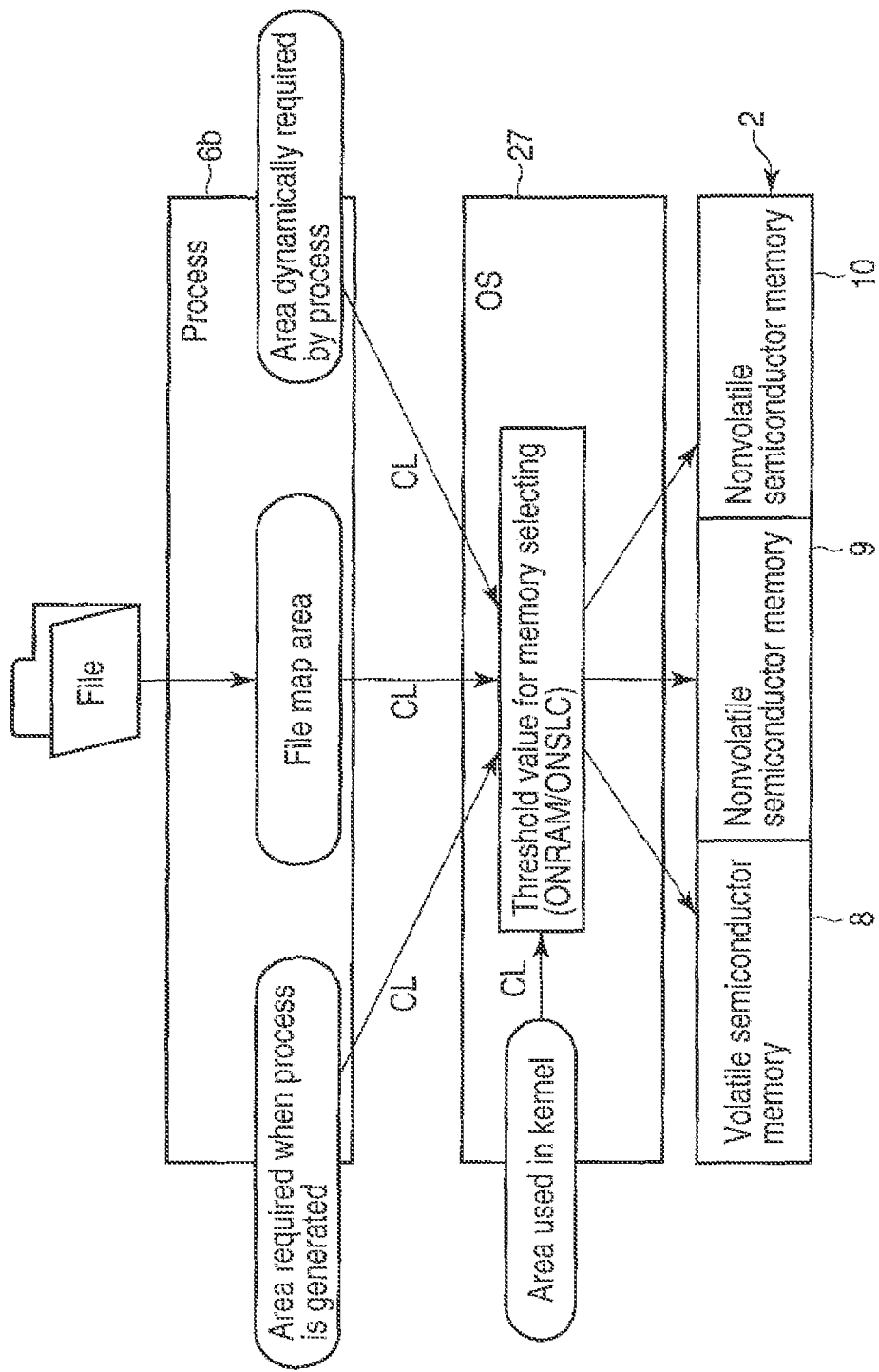
F I G. 30

| Data type | Static importance | Access time interval (month) | | | | | | | | | | |
|---|---|---|---|---|---|---|---|---|---|---|---|---|
| | | | 0 | 1 | 2 | 3 | 4 | 5 | 6 | 7 | 8 | 9 | 10 |
| | | Time correction value (T) | 1 | 0.9 | 0.8 | 0.7 | 0.6 | 0.5 | 0.4 | 0.3 | 0.2 | 0.1 | 0 |
| | | Dynamic importance (decimals are omitted) | | | | | | | | | | | |
| Executable file | 9 | | 9 | 8 | 7 | 6 | 5 | 4 | 3 | 2 | 1 | 0 | 0 |
| Media file | 4 | | 4 | 3 | 3 | 2 | 2 | 2 | 1 | 1 | 0 | 0 | 0 |
| Trash box file | 2 | | 2 | 1 | 1 | 1 | 1 | 1 | 0 | 0 | 0 | 0 | 0 |

FIG. 31

| Usage rate (%) | | Coloring level | | | | | | | | | | |
|---|---|---|---|---|---|---|---|---|---|---|---|---|
| Volatile memory | SLC | 9 | 8 | 7 | 6 | 5 | 4 | 3 | 2 | 1 | 0 |
| | | Selection of used memory corresponding to coloring level | | | | | | | | | |
| 0 | 0 | Volatile memory | | | | SLC | | | MLC | | |
| 10 | 10 | Volatile memory | | | | SLC | | | MLC | | |
| 20 | 20 | Volatile memory | | | SLC | | | MLC | | | |
| 30 | 30 | Volatile memory | | SLC | | | MLC | | | | |
| 40 | 40 | | SLC | | | | MLC | | | | |
| 50 | 50 | | SLC | | | | MLC | | | | |
| 60 | 60 | | SLC | | | | MLC | | | | |
| 70 | 70 | | SLC | | | | MLC | | | | |
| 80 | 80 | | SLC | | | | MLC | | | | |
| 90 | 90 | | SLC | | | | MLC | | | | |
| 100 | 100 | | SLC | | | | MLC | | | | |

F I G. 32

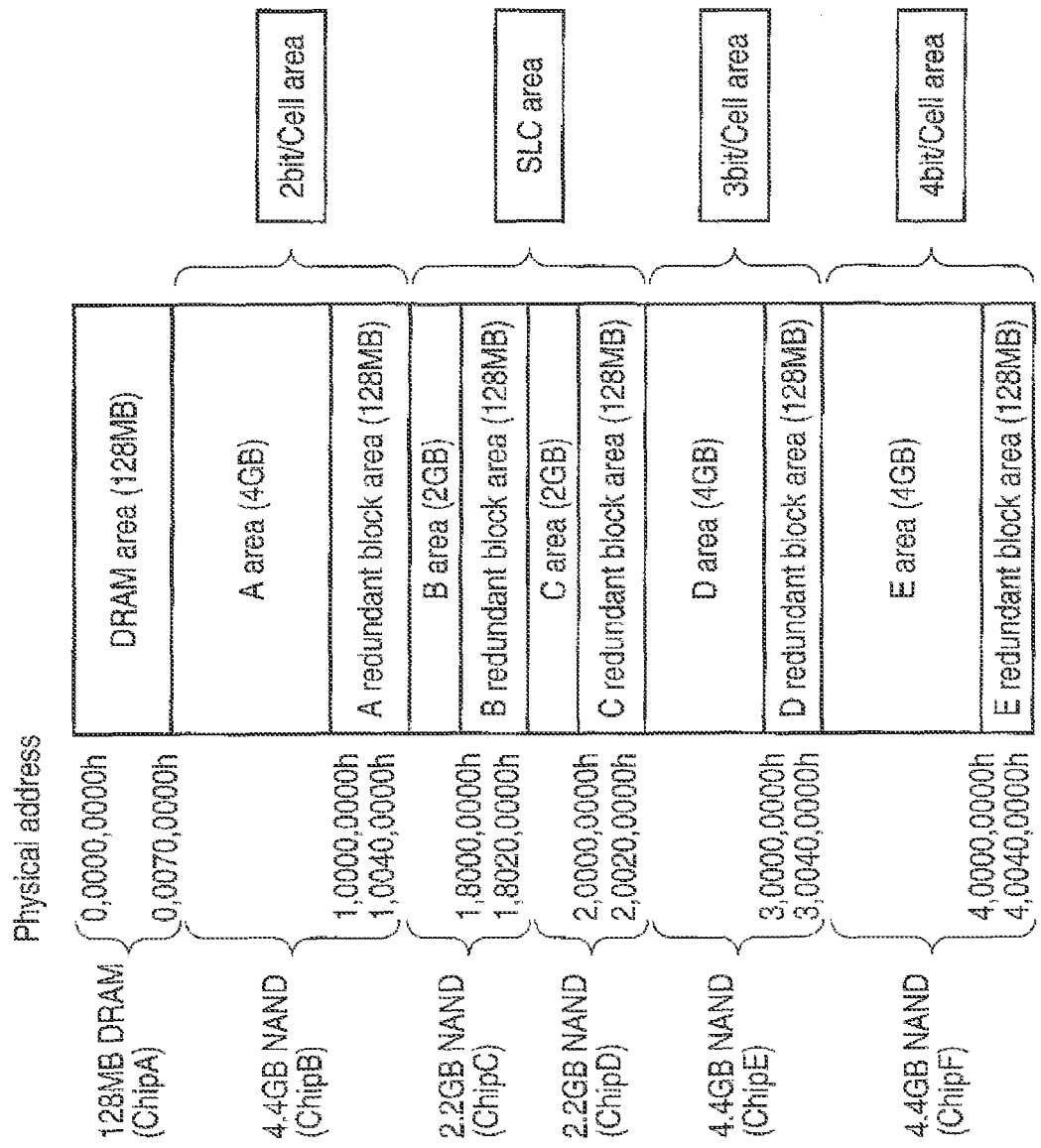
F I G. 37

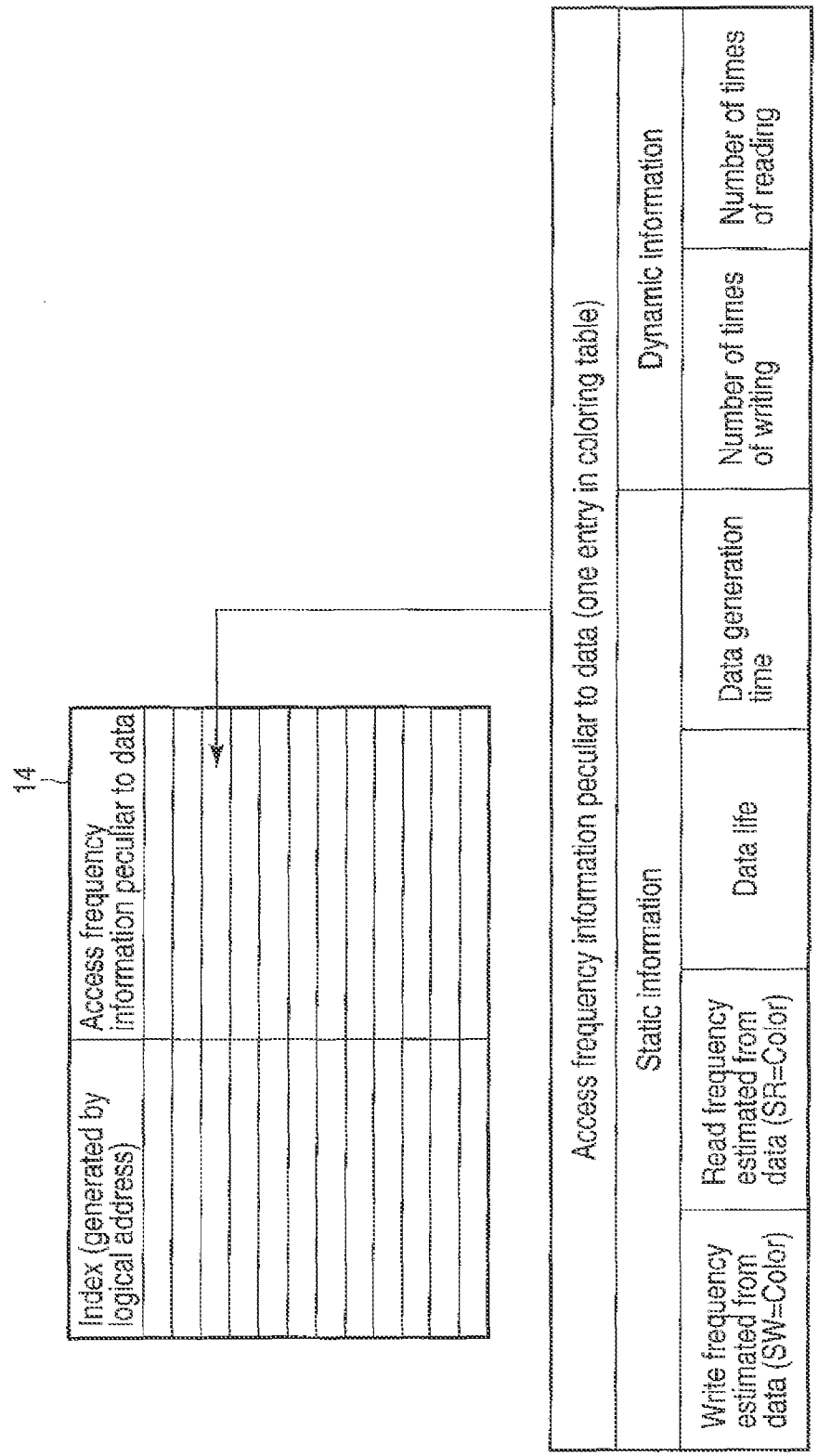
F I G. 38

| Data type | Data life | SW_Color | SR_Color | Remarks |
|---|---|---|---|---|
| Data dynamically secured by kernel (area dynamically secured by, e.g., kernel stack or device driver) | SHORT(S) | 5 | 5 | There is considered to be constant highly frequent read/write access during activation of system |
| Text area of kernel (including statically secured data) | LONG(L) | 1 | 5 | There is considered to be constant highly frequent read access during activation of system |
| Data dynamically secured by process | S | 4 | 4 | Data unnecessary at end of process in area dynamically secured by process. There are frequent reading and writing during process execution. Data as such is discarded after end of process |
| Stack area of program | S | 4 | 4 | Area (stack area) used for, e.g., auto-variable out of data dynamically secured by process. There are frequent reading and writing during process execution. Data as such is discarded after end of process |
| Text area of program | L | 1 | 4 | There is frequent reading during process execution. Read frequency rapidly decreases while process is inactive or after process has ended |
| System file (SYS,dll,DRV) | L | 1 | 3 | There is considered to be constant highly frequent read access to files referred to by OS during activation of system |

F I G. 41

| Data type | Data life | SW_Color | SR_Color | Remarks |
|---|---|---|---|---|
| Music data (MP3) | L | 1 | 2 | There are read/write access to a file referred to by process during process execution. There are not many users who use program having function to edit an audio file, and frequency of write access is considered to be low |
| Moving image data (MPEG2) | L | 1 | 2 | There are read/write access to a file referred to by process during process execution. There are not many users who use moving image editing program, and frequency of write access is considered to be low |
| Text file (txt) | L | 3 | 3 | There are read/write access to a file referred to by process during process execution. There are many users who use text editing program, and access frequency is therefore higher than that of a media file both in reading and writing |
| Browser cache file | L | 1 | 3 | There are read/write access to a file referred to by process during process execution. There are many users who use web browser, and access frequency is therefore higher than that of a media file in reading |
| File placed in a directory of low access frequency (e.g., trash box) | L | 1 | 1 | |

F I G. 42

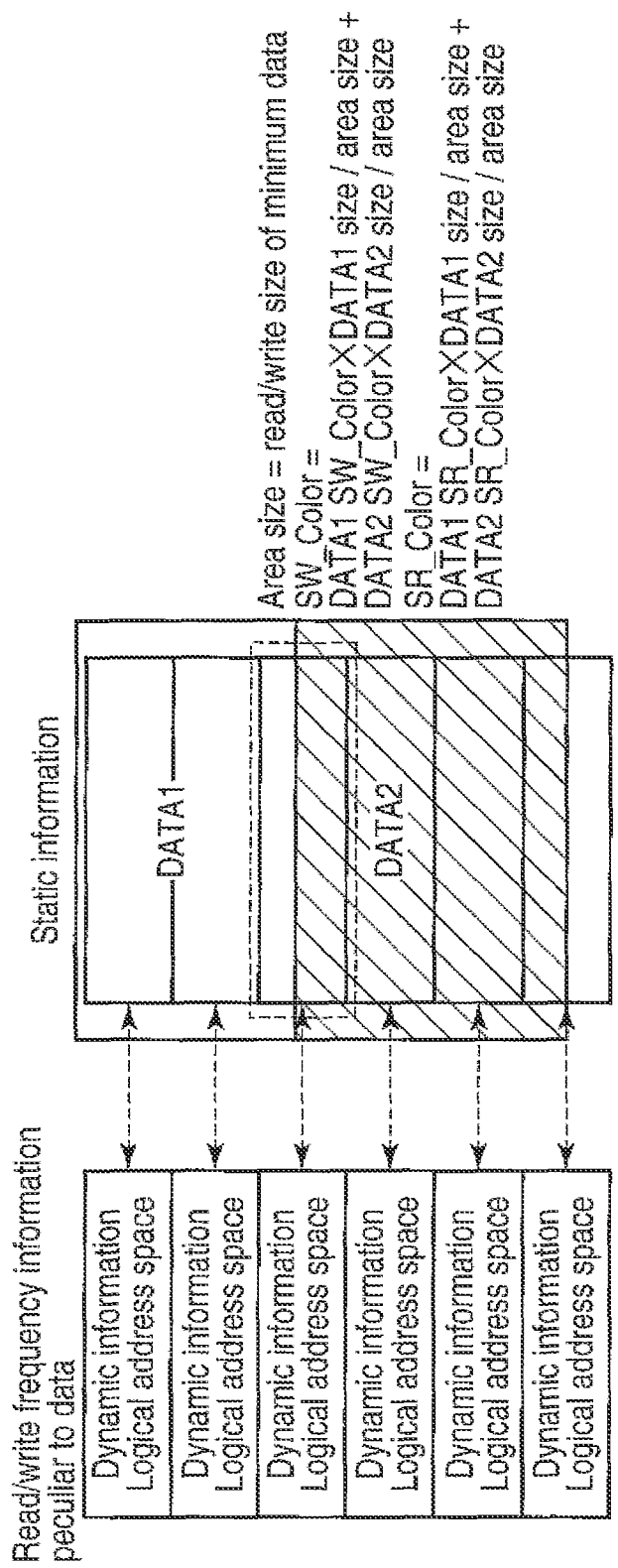
F I G. 44

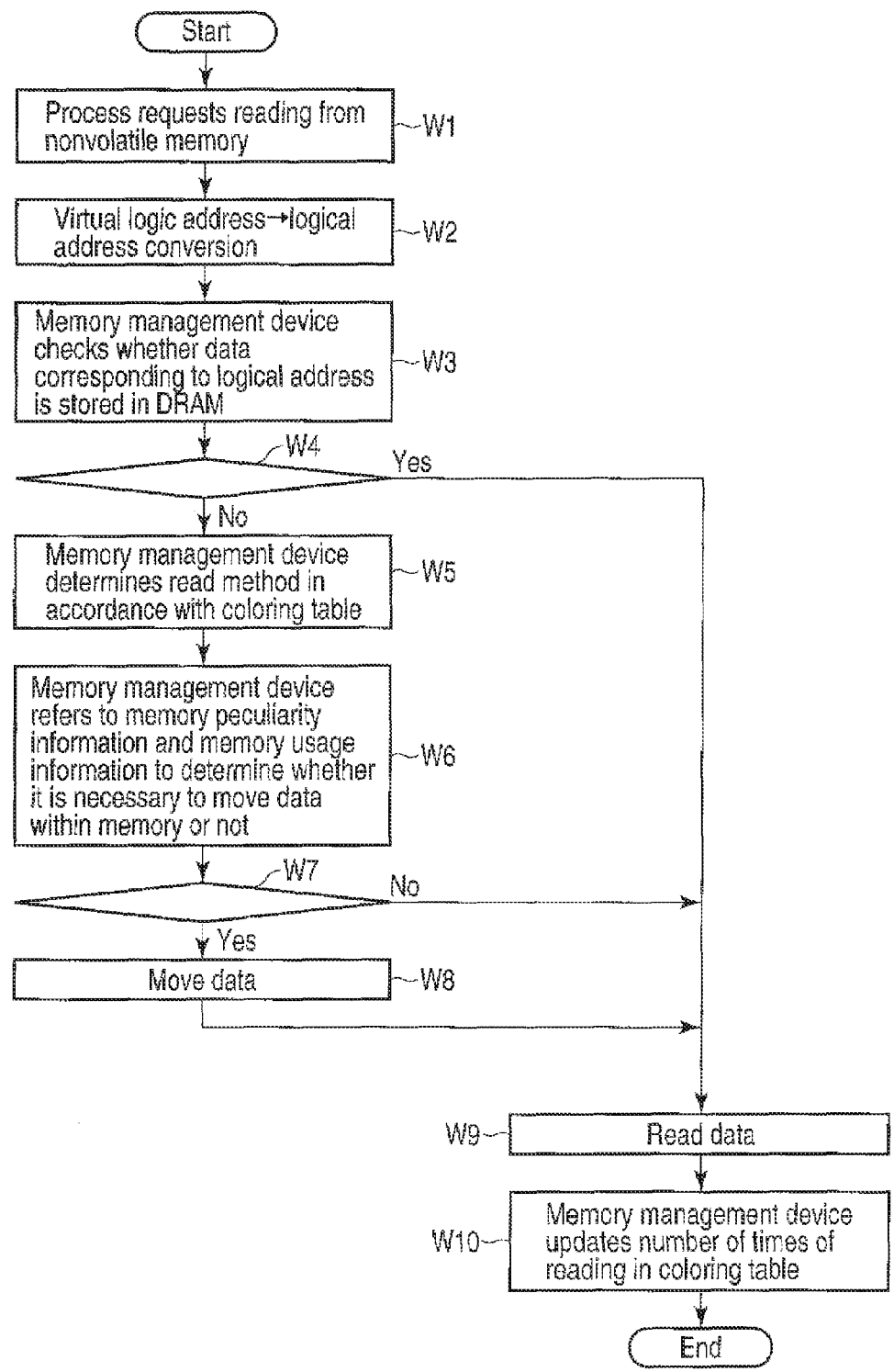
F I G. 47

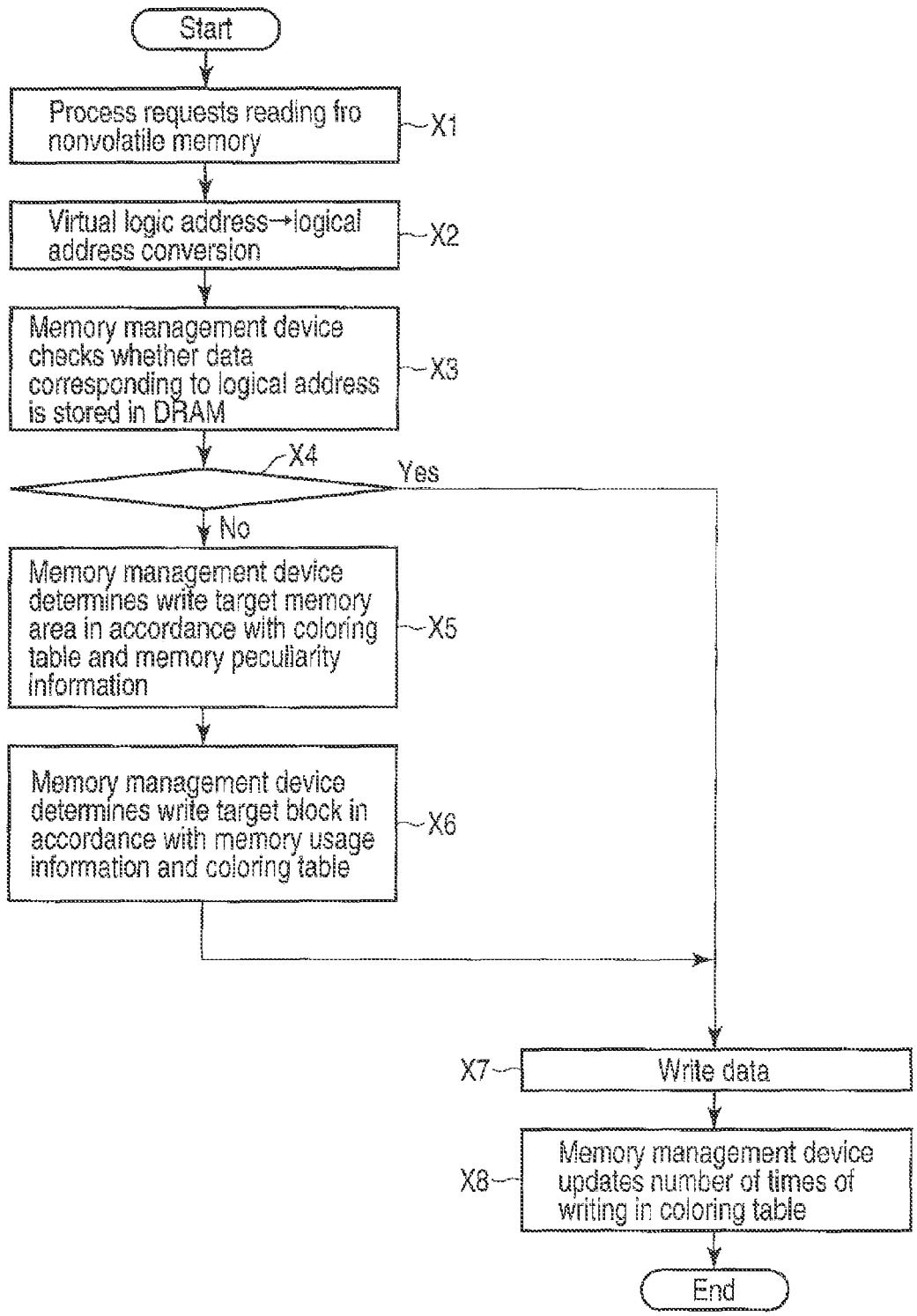
F I G. 48

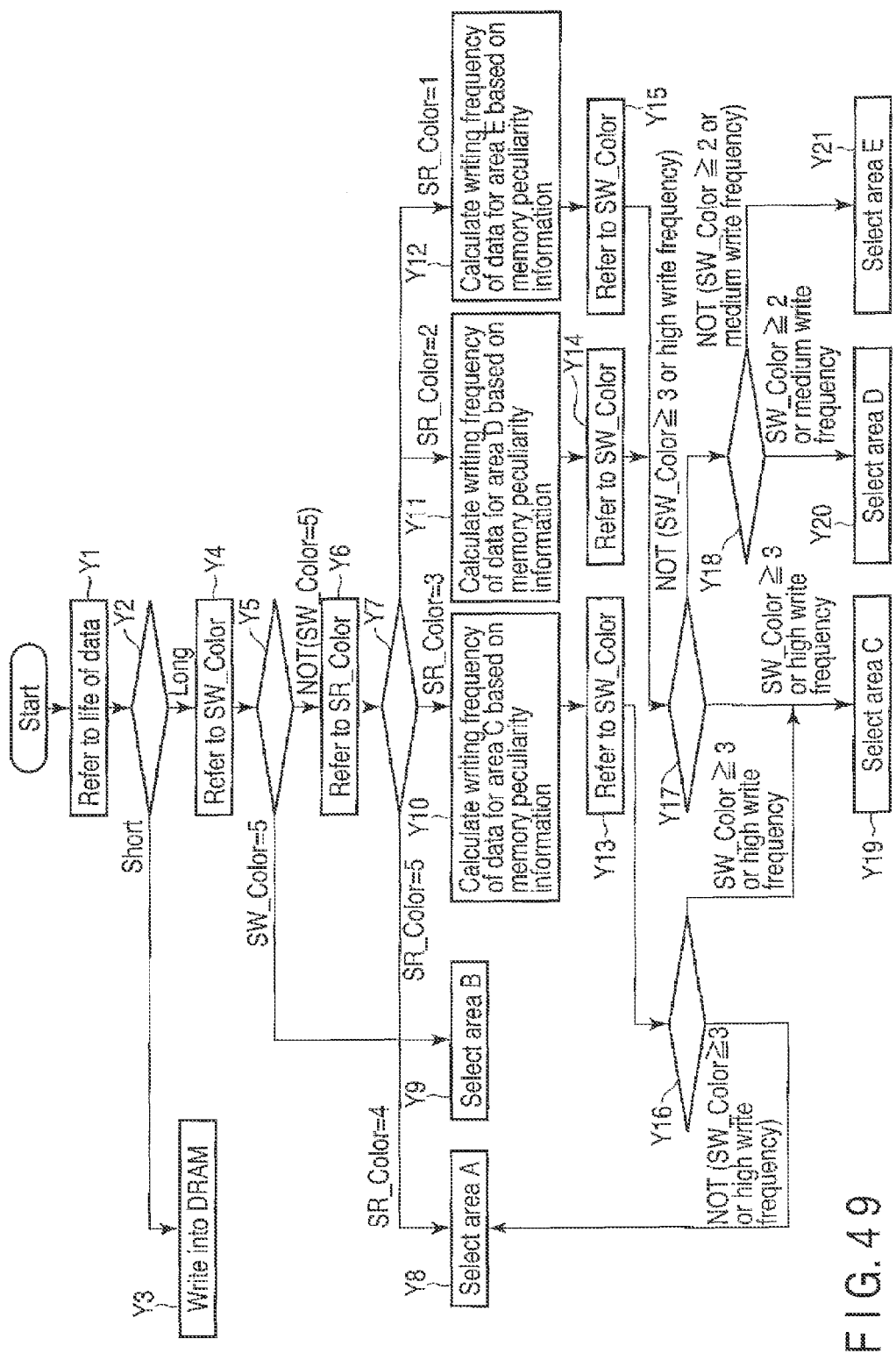
F I G. 49

| Coloring table information | | Usage rate |
|---|---|---|
| SW_Color | Write frequency (number of times of writing/sec) | |
| 5 | High | Below 10% |
| 5 | Medium | Below 10% |
| 5 | Low | Below 20% |
| 4 | High | Below 20% |
| 4 | Medium | Below 30% |
| 4 | Low | Below 40% |
| 3 | High | Below 40% |
| 3 | Medium | Below 50% |
| 3 | Low | Below 60% |
| 2 | High | Below 70% |
| 2 | Medium | Below 70% |
| 2 | Low | Below 80% |
| 1 | High | Below 90% |
| 1 | Medium | Below 90% |
| 1 | Low | Below 100% |

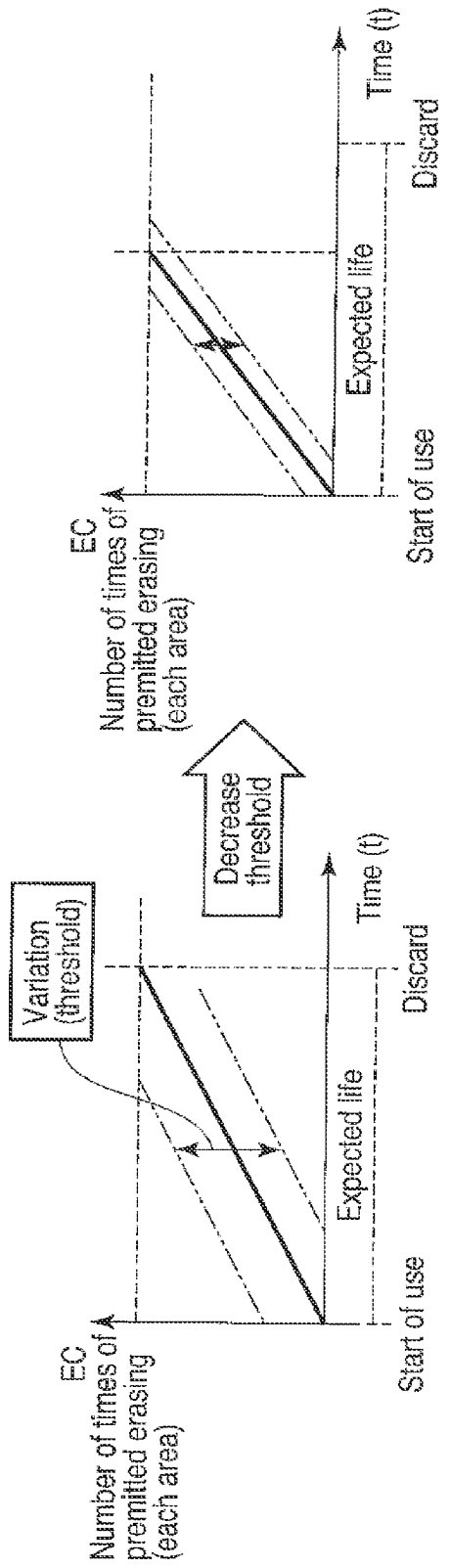
F I G. 51

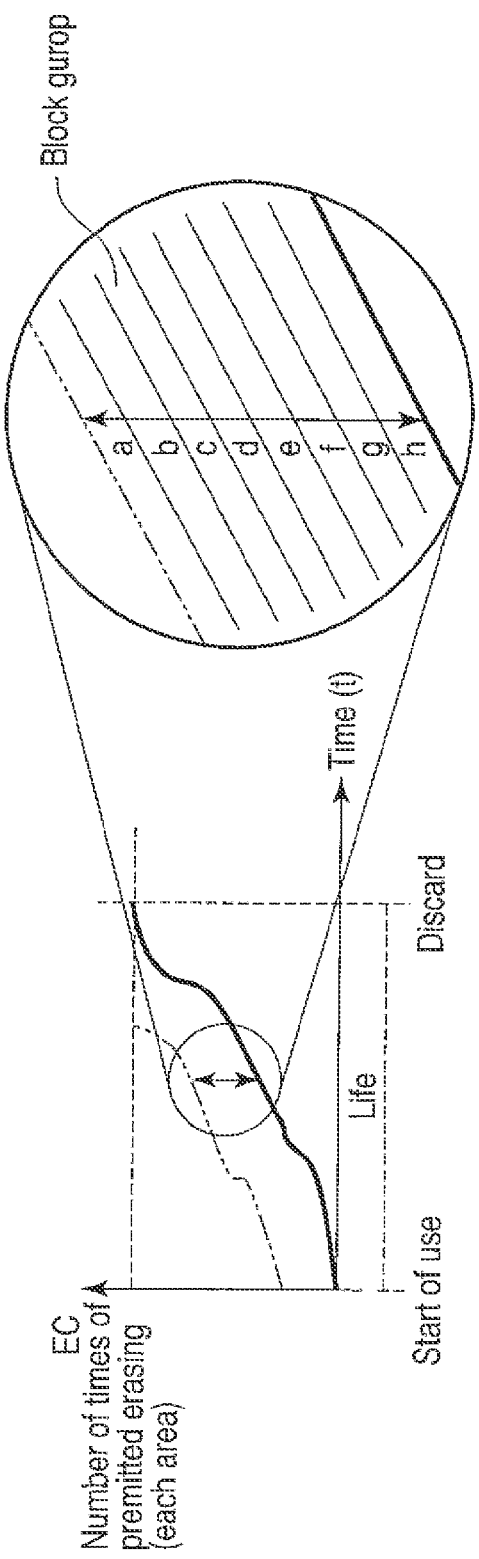
F I G. 53

| Group | EC upper limit | EC lower limit |
|---|---|---|
| a | Below currently minimum EC + THRESHOLD | Currently minimum EC + THRESHOLD 7/8 and above |
| b | Below currently minimum EC + THRESHOLD 7/8 | Currently minimum EC + THRESHOLD 6/8 and above |
| c | Below currently minimum EC + THRESHOLD 6/8 | Currently minimum EC + THRESHOLD 5/8 and above |
| d | Below currently minimum EC + THRESHOLD 5/8 | Currently minimum EC + THRESHOLD 4/8 and above |
| e | Below currently minimum EC + THRESHOLD 4/8 | Currently minimum EC + THRESHOLD 3/8 and above |
| f | Below currently minimum EC + THRESHOLD 3/8 | Currently minimum EC + THRESHOLD 2/8 and above |
| g | Below currently minimum EC + THRESHOLD 2/8 | Currently minimum EC + THRESHOLD 1/8 and above |
| h | Below currently minimum EC + THRESHOLD 1/8 | None |

F I G. 54

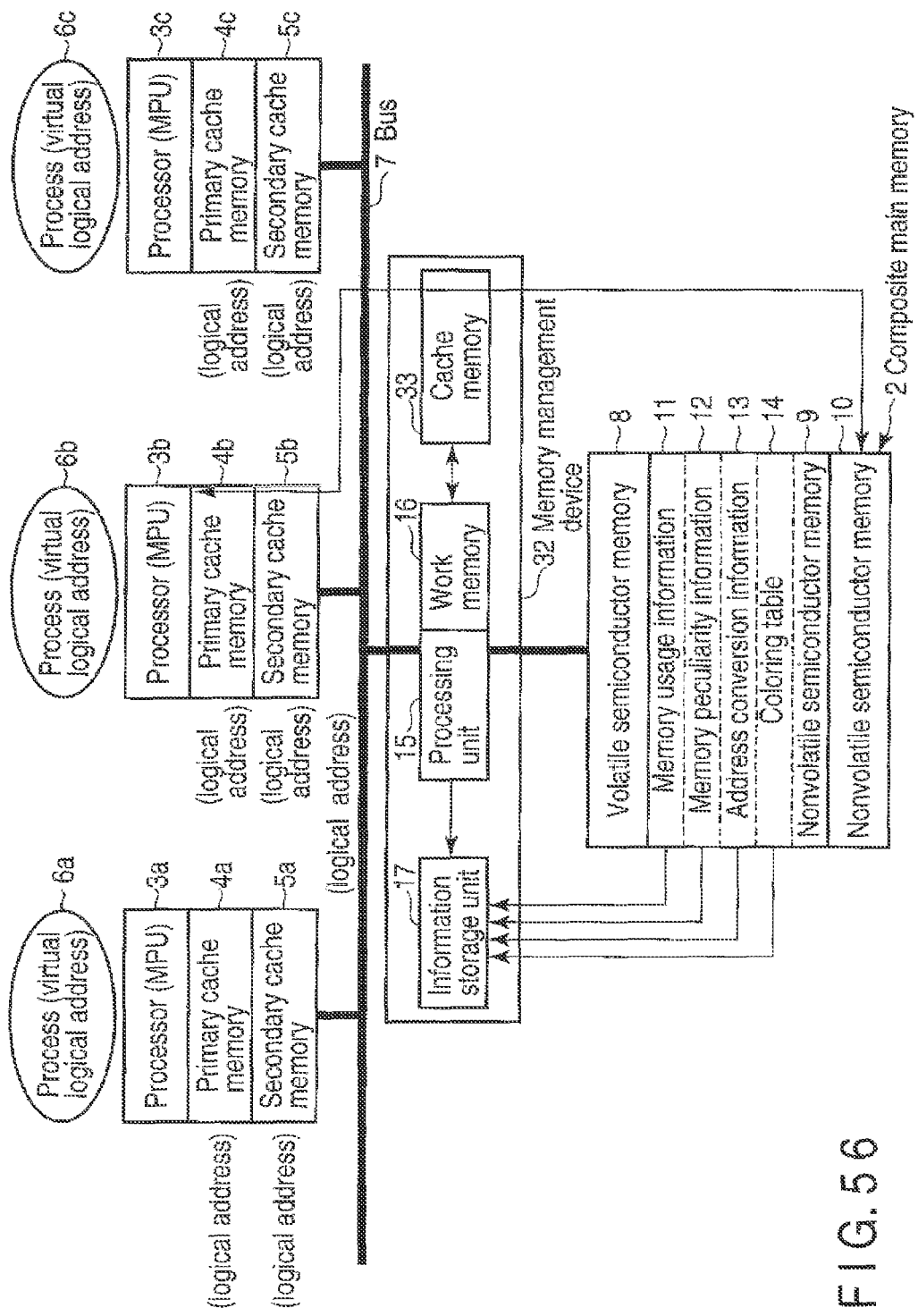
F I G. 56

INFORMATION PROCESSING DEVICE INCLUDING MEMORY MANAGEMENT DEVICE MANAGING ACCESS FROM PROCESSOR TO MEMORY AND MEMORY MANAGEMENT METHOD

CROSS-REFERENCE TO RELATED APPLICATIONS

This application is based upon and claims the benefit of priority from prior Japanese Patent Applications No. 2008-231363, filed Sep. 9, 2008; and No. 2009-169371, filed Jul. 17, 2009, the entire contents of both of which are incorporated herein by reference.

BACKGROUND OF THE INVENTION

1. Field of the Invention

The present invention relates to an information processing device including a memory management device managing an access from a processor to a memory and a memory management method.

2. Description of the Related Art

A conventional micro processing unit (MPU) uses a dynamic random access memory (DRAM) as a main memory (main storage). Moreover, the conventional MPU uses, for example, a flash memory as a secondary memory device. The conventional MPU and the flash memory are connected together via an I/O interface. The flash memory is treated as a file memory by the MPU.

Conventionally, a management function of a NAND type flash memory is built into a file system.

When the MPU is provided with a cache memory, the DRAM is used as the main memory, and the MPU accesses the NAND type flash memory, an operation is carried out according to the following memory hierarchy in the conventional case.

First, the MPU converts a logical address to a physical address using a memory management unit (MMU) to make an access to a cache memory.

In this case, the MPU accesses the main memory, that is, DRAM, with respect to partial data by virtual memory management of an operating system (OS).

If the MPU further has a need to access the NAND type flash memory, the MPU makes following controls to determine a physical location of the NAND type flash memory by a Flash File System. One is control for avoiding a defective block in NAND type flash memory. Another is control for making accesses to all blocks of the NAND type flash memory almost equally (without difference).

The MPU accesses the NAND type flash memory based on the determined physical location.

In the conventional MPU, when there are many layers of a memory hierarchy, there are many operations which is included in the different layers of the memory hierarchy. It is difficult to effect optimization between operations in difference layers. For example, it is difficult to realize control of managing bad block peculiar to the NAND type flash memory when the MPU makes a changeover of data of the cache memory. Because the control of managing bad block and the changeover of the data of the cache memory are belong to different layers of the memory hierarchy.

When the MPU accesses a file in the secondary memory device, the conventional operating system (OS) needs to perform a great amount of processing. In an information processing device in which a storage capacity of a main memory is small, the number of times of access of the MPU to the secondary memory device such as a hard disk (HDD) or a solid state drive (SSD) is great, so that the number of processes for a program may increase, and processing time may increase.

In order to solve such a problem, the following method is used in, for example, a mobile device; a DRAM having the same capacity as the NAND type flash memory is prepared so that the whole data in the NAND type flash memory is transferred to the DRAM at the start of operation.

However, an expensive DRAM having the same capacity as the inexpensive NAND type flash memory needs to be installed in this method. Thus, this method is easily applied to a device having a low-capacity memory such as a mobile device, but is not easily applied to other device having greater storage capacity.

A document 1 (Jpn. Pat. Appln. KOKAI Publication No. 2008-242944) has proposed an integrated memory management device. In this integrated memory management device, a NAND type flash memory is used as a main memory for an MPU. Further, in the document 1, a primary cache memory, a secondary cache memory and the NAND type flash memory as the main memory in the MPU are treated in a same memory layer. A cache controller of the integrated memory management device performs the management of the main memory in addition to the management of the primary cache memory and the secondary cache memory.

A document 2 (Jpn. Pat. Appln. KOKAI Publication No. 7-146820) discloses a technique for employing a flash memory as a main memory of an information processing device. In the document 2, the flash memory is connected to a memory bus of a system via a cache memory which is a nonvolatile memory. The cache memory is provided with an address array for recording information including, for example, addresses or access histories of data stored in this cache memory. A controller refers to the address to access, and supplies data in the cache memory or flash memory to the memory bus or stores data in the memory bus.

A document 3 (Jpn. Pat. Appln. KOKAI Publication No. 2001-266580) discloses an invention enable different kind of semiconductor memory devices to be connected to a common bus.

The semiconductor memory device disclosed in the document 3 includes a random access memory chip and a package having the random access memory chip. The package comprises a plurality of pins electrically connecting the random access memory chip to an external device. The pins provide a memory function in common to a random access memory and an electrically erasable and programmable non-volatile semiconductor memory. The pins are arrayed according to the corresponding pin position of the non-volatile semiconductor memory.

BRIEF SUMMARY OF THE INVENTION

An information processing device including a memory management device according to the first example of the invention comprises: an accepting section which accepts a write destination logical address and write target data from a processor, the write destination logical address indicating a write position to write the write target data into a composite memory which includes a first memory and a nonvolatile second memory; an address determining section which determines a write destination physical address corresponding to the write destination logical address so that the number of times of access to the second memory is smaller than the number of times of access to the first memory; an address management section which stores, in a storage section, address conversion data associating the write destination logical address with the write destination physical address; and a writing section which writes the write target data into a position in the composite memory indicated by the write destination physical address.

A memory management method according to the second example of the invention comprises: accepting a write destination logical address and write target data from a processor, the write destination logical address indicating a write position to write the write target data into a composite memory which includes a first memory and a nonvolatile second memory; determining a write destination physical address corresponding to the write destination logical address so that the number of times of access to the second memory is smaller than the number of times of access to the first memory; storing, in a storage section, address conversion data associating the write destination logical address with the write destination physical address; and writing the write target data into a position in the composite memory indicated by the write destination physical address.

BRIEF DESCRIPTION OF THE SEVERAL VIEWS OF THE DRAWING

FIG. 1 is a block diagram showing an example of a memory management device in accordance with a first embodiment of the present invention;

FIG. 6 is a block diagram showing an example of an memory management device in accordance with a second embodiment of the present invention;

FIG. 9 is a block diagram showing a second example of the memory management device in accordance with the third embodiment;

FIG. 11 is a block diagram showing an example of a memory management device according to a fifth embodiment of the present invention;

FIG. 16 is a block diagram illustrating an example of a structure of a memory management device according to an eighth embodiment of the present invention;

FIG. 18 is a diagram illustrating an example of a first operation of transmission algorithm of the memory management device according to the eighth embodiment;

FIG. 19 is a diagram illustrating an example of a second operation of a transmission algorithm of the memory management device according to the eighth embodiment;

FIG. 20 is a diagram illustrating an example of a third operation of a transmission algorithm of the memory management device according to the eighth embodiment;

FIG. 21 is a block diagram illustrating an example of a wear-leveling;

FIG. 23 is a block diagram illustrating an example of a multi-processor system using the memory management device according to the eighth embodiment for an existing processor including an MMU;

FIG. 24 is a block diagram illustrating an example of a general multi-processor system according to the related art;

FIG. 25 is a block diagram illustrating an example of a process of obtaining a pointer for a large address space;

FIG. 27 is a block diagram illustrating an example of a structure of a memory management device according to a ninth embodiment of the present invention;

FIG. 28 is a block diagram showing an example of a structure of a processing unit in the memory management device according to the ninth embodiment;

FIG. 30 is a block diagram showing an example of an operation of an operating system according to the ninth embodiment;

FIG. 31 is a table showing an example of a calculation of a dynamic importance for an area used by the process to map a file in a composite main memory;

FIG. 32 is a table showing an example of a relation between an usage rate of memories and a threshold value according to the ninth embodiment;

FIG. 37 is a diagram showing an example of a memory map of the composite main memory according to a tenth embodiment of the present invention;

FIG. 38 is a diagram showing an example of a coloring table according to the tenth embodiment;

FIG. 41 is a table showing a first example of assignment settings of SW_Color, SR_Color and data life to various kinds of data;

FIG. 42 is a table showing a second example of assignment setting of the SW_Color, the SR_Color and the data life to various kinds of data;

FIG. 44 is a diagram showing a second example of an alignment of entries of the coloring table;

FIG. 47 is a flowchart showing an example of data reading processing in the memory management device according to the tenth embodiment;

FIG. 48 is a flowchart showing an example of data write processing in the memory management device according to the tenth embodiment;

FIG. 49 is a flowchart showing an example of write destination area determining processing performed by the memory management device according to the tenth embodiment;

FIG. 51 is a graph showing an example of a change made when a threshold value for a difference in the number of times of erasure is lowered in a wear-leveling;

FIG. 53 is a graph showing an example of a grouping of a block in accordance with the number of times of permitted erasure;

FIG. 54 is a table showing a judgmental standard for the grouping of a block in accordance with the number of times of permitted erasure;

FIG. 56 is a block diagram showing an example of a memory management device further comprising a cache memory according to the tenth embodiment.

DETAILED DESCRIPTION OF THE INVENTION

Figure 2:
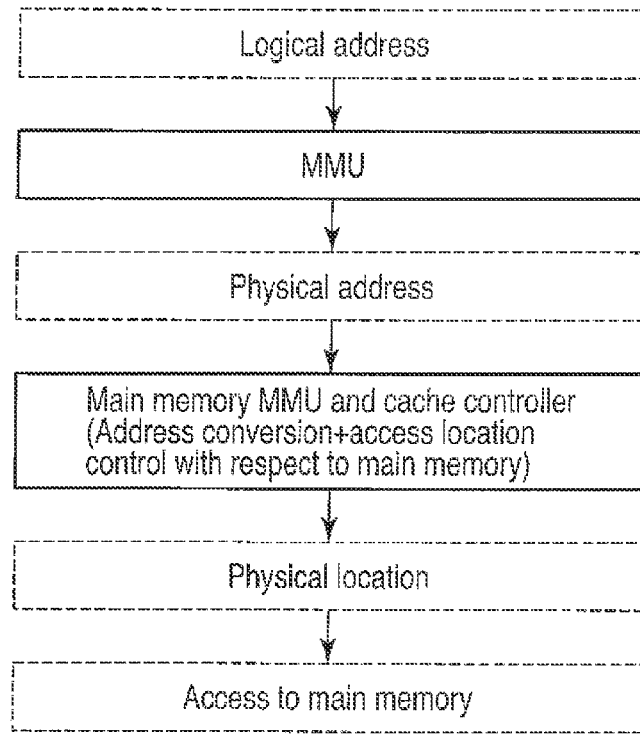
FIG. 2 is a view showing an example of a memory hierarchy of the memory management device in accordance with the first embodiment.

Hereinafter, embodiments of the present invention will be described with reference to the accompanying drawings. Throughout the drawings, the same or similar structural elements (functions and components) will be denoted by the same reference numbers. The overlapping explanation will be made if necessary only.

In the following embodiments, a memory management device is provided in an information processing device including a processor such as a MPU, or in an information processing device including a processor and a memory.

(First Embodiment)

A memory management device (flat memory management device) of this embodiment is included in a MPU. The memory management device makes memory management with respect to a cache memory and a main memory. The memory management device reduces the number of memory hierarchies related to memory access, and easily realizes optimization of memory access.

In this embodiment, a nonvolatile semiconductor memory is used as the main memory. However, a composite (hybrid) main memory including a first memory and a nonvolatile second memory as described in the following ninth embodiment and after the ninth embodiment may be used as the main memory.

This embodiment relates to a memory management device, which is integrated with a MMU of MPU, a cache controller of the MPU and a main memory MMU.

FIG. 1 is a block diagram showing an example of the memory management device according to this embodiment. A main memory is a NAND type flash memory in the case described by way of example in this embodiment, other memory devices such as a composite main memory can also be used as described above. As the main memory, other nonvolatile semiconductor memories such as a NOR type flash memory may be used. According to this embodiment, the term, "access" includes at least one of read and write of data (or program).

A MPU 101 includes a memory management device 102, and accesses a NAND type flash main memory 104.

The NAND type flash main memory 104 stores an address conversion table 105 and write (or rewrite) number data (or write frequency data) 106 including the number of times of writing (or write frequency) inside. The write number data 106 corresponds to main memory history data indicating an accessed state of the main memory.

The address conversion table 105 is data associating a logical address with a physical location (or physical address) for the NAND type flash main memory 4.

The write number data 106 indicates the number of times of writing of each page or block of the NAND type flash main memory 104.

The memory management device 102 includes MMU 107, cache controller 108, primary cache memory 103, secondary cache memory 122, main memory MMU 109, and access history storage (NAND information registers) 110. The cache controller 108 includes a first cache controller 108a used for the primary cache memory 103 and a second cache controller 108b used for the secondary cache memory 122. The main memory MMU 109 includes an address relation storage 123. The address relation storage 123 may be separated from the main memory MMU 109.

For example, the memory management device 102 is formed on one chip and has an integrated structure.

The first embodiment relates to the case where the number of cache memories is two. However, in this case, the number of cache memories may be one or three or more.

The MMU 107 converts a logical address of the cache memory 103 or the cache memory 122 into a physical address.

The primary cache memory 103 comprises a tag storage area 103a and a line storage area 103b.

The secondary cache memory 122 comprises a tag storage area 122a and a line storage area 122b.

According to this embodiment, each line size of the primary and secondary cache memories 103 and 122 is set as follows. Specifically, the line size is set to the same size (e.g., 256 kilobytes) as a block of the NAND type flash main memory 104, to the multiple of a block size of the NAND type flash main memory 104, to the same size as a page of the NAND type flash main memory 104, or to the multiple of a page size of the NAND type flash main memory 104. In this way, the following operations are carried out at a unit of a page size, the multiple (two or more) of the page size, a block, or the multiple (two or more) of the block size. One is an operation of moving data of the NAND type flash main memory 104 to the primary or secondary cache memory 103 or 122. Another is an operation of moving data of the primary or secondary cache memory 103 or 122 to the NAND type flash main memory 104. Thus, data move can be simplified.

In this embodiment, the primary and secondary cache memories 103 and 122 are a write back type. The secondary cache memory 122 has a storage capacity larger than the primary cache memory 103; however, the operation is low speed.

The first cache controller 108a controls access to the primary cache memory 103.

More specifically, when the first cache controller 108a reads data from the primary cache memory 3, the first cache controller 108a reads data corresponding to a physical address of the primary cache memory 103 according to the physical address obtained from the MMU 107. When writing data to the primary cache memory 103, the first cache controller 108a writes write target data to a location corresponding to the physical address of the primary cache memory 103 according to the physical address obtained from the MMU 107.

The second cache controller 108b controls access to the secondary cache memory 122.

More specifically, when reading data from the secondary cache memory 122, the second cache controller 108b reads data corresponding to a physical address of the secondary cache memory 122 according to the physical address obtained from the MMU 107. When writing data to the secondary cache memory 122, the second cache controller 108b writes write target data to a location corresponding to the physical address of the secondary cache memory 122 according to the physical address obtained from the MMU 107.

The main memory MMU 109 controls access to the NAND type flash main memory 104.

The main memory MMU 109 stores part or all of the address conversion table 105 of the NAND type flash main memory 104 in the address relation storage 123 as address relation data if necessary. The main memory MMU 109 stores part or all of the write number data 106 including the number of times of writing of the NAND type flash main memory 104 to the access history storage 110 as access history data if necessary.

The main memory MMU 109 converts the logical address of the NAND type flash main memory 104 to a physical location.

The main memory MMU 109 reads data from the NAND type flash main memory 104 based on the physical location of the NAND type flash main memory 104. Thereafter, the main memory MMU 109 stores the read data in the primary or secondary cache memory 103 or 122 using the first or second cache controller 108a or 108b.

When reading new data from the NAND type flash main memory 104, the main memory MMU 109 reads data of address conversion table related to the new data and data including the number of times of writing related to the new data. Thereafter, the main memory MMU 109 stores the foregoing two data in the address relation storage 123 and the access history storage 110, respectively.

When writing data to the NAND type flash main memory 104, the main memory MMU 109 executes the following controls based on the foregoing address relation data and access history data. One is control to access without disparity for all area or all blocks of the NAND type flash main memory 104. Another is control for equalizing the number of times of writing of each area or block of the NAND type flash main memory 104. Another is control of avoiding a defective area or defective block. Another is control of avoiding an used area or used block. The main memory MMU 109 acquires data stored in the primary or secondary cache memory 103 or 122 using the first or second cache controller 108a or 108b. Then, the main memory MMU 109 stores the acquired data in the NAND type flash main memory 104 based on the physical location of the NAND type flash main memory 104.

When data is written in the NAND type flash main memory 104, the main memory MMU 109 updates the address relation data of the address relation storage 123 based on the relationship between a logical address and a physical location related to the written data. The main memory MMU 109 further updates the access history data of the access history storage 110.

The main memory MMU 109 reflects the following data to the address conversion table 105 and the write number data 106 of the NAND type flash main memory 4. One is the address relation data stored in the main memory MMU 109 and another is the access history data stored in the access history storage 110. In other words, the main memory MMU 109 matches the address relation data stored in the MPU 101 with the address conversion table 105 stored in the NAND type flash main memory 104. The main memory MMU 109 further matches the access history data of the access history storage 110 with the write number data 106 of the NAND type flash main memory 104.

The access history storage 110 stores an access state history of the page or block (physical location) of the NAND type flash main memory 104. According to this embodiment, the access history storage 110 stores write number data 106 of part or all pages or blocks in the write number data 106 including the number of times of writing (or write frequency) of each page or block of the NAND type flash main memory 104.

For example, the number of times of writing of each block is recorded using four bytes. Each block size is set to 256 kilobytes. In this case, if the storage capacity of the NAND type flash main memory 104 is 1 megabyte, the number of blocks stored in the NAND type flash main memory 104 is four. Thus, the storage capacity required for storing the number of times of writing of each block is 16 bytes. In the same case as above, if the storage capacity of the NAND type flash main memory 104 is 1 gigabyte, the number of blocks stored in the NAND type flash main memory 104 is 4096. Thus, the storage capacity required for storing the number of times of writing of each block is 16 kilobytes. Likewise, if the storage capacity of the NAND type flash main memory 104 is 16 gigabytes, the storage capacity required for storing the number of times of writing of each block is 64 kilobytes.

For example, if the NAND type flash main memory 104 has a large capacity such as 128 gigabytes, the access history storage 110 stores part of the write number data 106 in the NAND type flash main memory 104. As described above, a symbol "pos" is marked on the number of times of writing because the access history storage 110 stores part of the write number data 106. The "pos" is used the same manner as a cache tag.

Hereinafter, an operation of the main memory MMU 109 will be schematically described.

The main memory MMU 109 stores part of the address conversion table 105 of the NAND type flash main memory 104 in the address relation storage 123. The main memory MMU 109 further stores part of the write number data 106 in the access history storage 110.

When the cache memories 103 and 122 does not store read target data, the main memory MMU 109 reads the data from the NAND type flash main memory 104. Thereafter, the main memory MMU 109 stores data which corresponds to the read data and is included in the address conversion table 105 in the address relation storage 123. In addition, the main memory MMU 109 stores data which corresponds to the read data and is included in the write number data 106 in the access history storage 110.

When writing data from the MPU 101 to the NAND type flash main memory 104, the main memory MMU 109 converts a logical address of the NAND type flash main memory 104 into a physical location. Then, the main memory MMU 109 writes write target data in cache line 3b or 22b to the NAND type flash main memory 4. In addition, the main memory MMU 109 updates address relation data stored in the address relation storage 123 and access history data stored in the access history storage 110.

The main memory MMU 9 updates the address conversion table 5 and the write number data 106 based on the address relation data of the address relation storage 23 and the access history data of the access history storage 10.

For example, if the primary cache memory 103 is read only, there is no write to the cache line 103b from the MPU 101. In this case, the main memory MMU 109 overwrites data read from the NAND type flash main memory 104 on the primary cache memory 103 using the first cache controller 108a. When read of the data stored in the primary cache memory 103 is generated, the first cache controller 108a reads data from the first cache memory 103.

Conversely, if the primary cache memory 103 is not read only, the MPU 101 executes a program to write data obtained by the program to the cache memory 103. When data is written from the MPU 101 to the cache line 103b, the data of the cache line 103b is written back to the NAND type flash main memory 104. In this case, the main memory MMU 109 reads the written-back data from the cache memory 103 via the first cache controller 108a. The main memory MMU 109 selects a page or block having the number of times of writing less than a predetermined number as a write back location of the NAND type flash main memory 104 based on the access history data of the access history storage 110. Thereafter, the main memory MMU 109 stores the written-back data in the selected page or block. Then, the main memory MMU 109 updates address relation data indicating a conversion relationship between a logical address and a physical location in the NAND type flash main memory 104 with respect to the selected page or block. The main memory MMU 109 further updates the number of times of writing of the access history storage 110 with respect to the selected page or block.

Thereafter, the main memory MMU 109 updates the address conversion table 105 and the write number data 106 according to the contents of the address relation storage 123 and the access history storage, if necessary.

FIG. 2 is a view indicating an example of a memory hierarchy of the memory management device 102 of this embodiment.

The memory hierarchy has a layer (class) belonging to the MMU 107, and a layer belonging to the main memory MMU 109 and the cache controller 108.

In the layer of the MMU 107, a logical address is converted into a physical address.

In the layer belonging to the main memory MMU 109, for example, access destination, that is, the physical location or address of the NAND type flash main memory 104 is determined. In the layer belonging to the main memory MMU 109, access control for a page or block having the number of times of writing less than a predetermined number (e.g., minimum) is carried out.

Then, the memory management device 102 accesses the NAND type flash main memory 104 based on the determined physical location.

Figure 3:
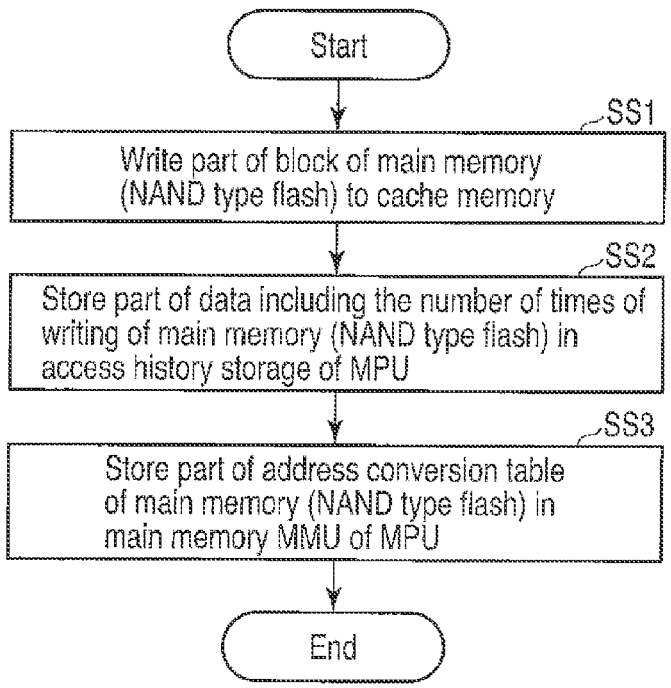
FIG. 3 is a flowchart to explain an example of an operation when a MPU including the memory management device according to the first embodiment stores data of a NAND type flash memory, part of write number data of the NAND type flash memory, and part of an address conversion table of the NAND type flash memory in the MPU.

FIG. 3 is a flowchart to explain an example of an operation when the MPU 101 including the memory management device 102 stores data of the NAND type flash main memory 104, part of the write number data 106 of the NAND type flash main memory 104, and part of the address conversion table 105 of the NAND type flash main memory 104 in the MPU 101.

In step SS1, the main memory MMU 109 reads partial data (i.e., incidentally, data corresponding to 1 gigabyte from the header) of the NAND type flash main memory 104 used by the MPU 101. The cache controller 108 writes the read data to the cache line 103b of the cache memories 103 or the cache line 122b of the cache memories 122.

In step SS2, the main memory MMU 109 copies part of the write number data 106 stored in the NAND type flash main memory 104 into the access history storage 110 included in the MPU 101. (i.e., the part is the number of times of writing of a block with respect to data stored in cache memories 103 and 122. Incidentally, data corresponding to 1 gigabyte from the header may be first copied.)

In step SS3, the main memory MMU 109 copies part of the address conversion table 105 stored in the NAND type flash main memory 104 into the address relation storage 123 of the main memory MMU 109 of the MPU 101. (i.e., the part is data showing the relationship between logical address and physical location of the block corresponding to data stored in cache memories 103 and 102. Incidentally, data corresponding to 1 gigabyte from the header may be first copied.)

The procedures of the foregoing steps SS1 to SS3 are taken in the free sequence, and may be executed in parallel.

Figure 4:
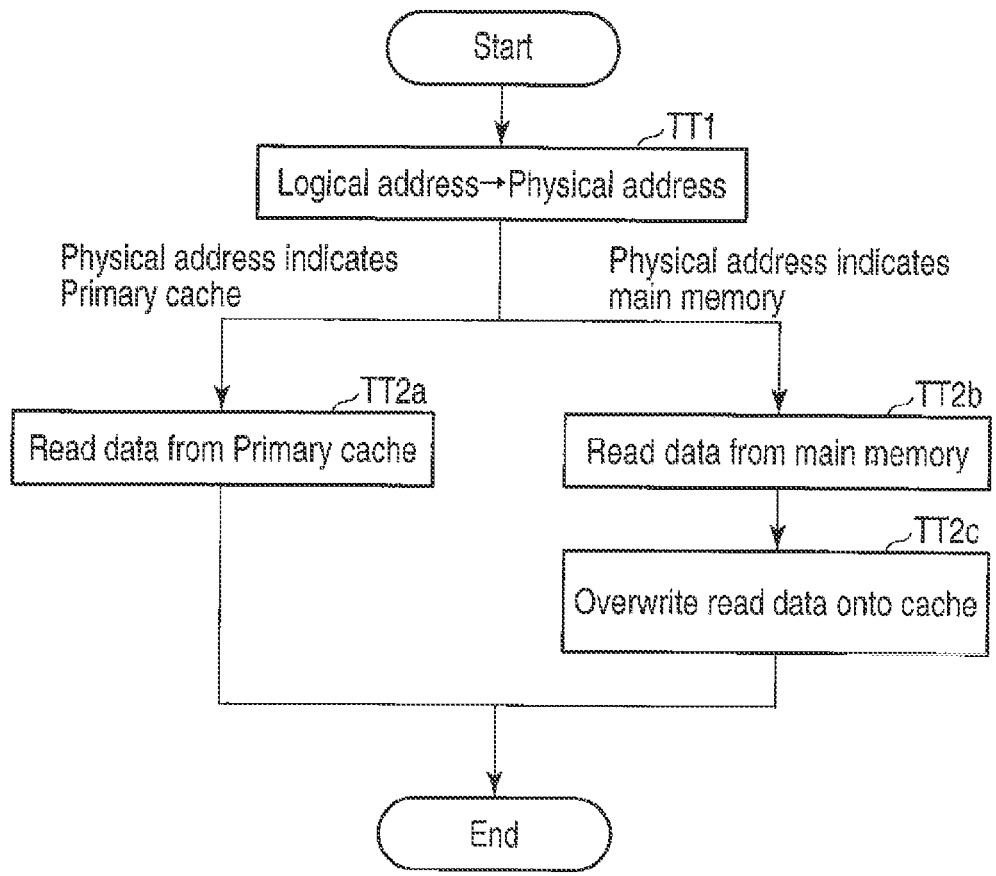
FIG. 4 is a flowchart to explain an example of an operation of reading data from a primary cache memory or the NAND type flash main memory by the MPU including the memory management device according to the first embodiment.

FIG. 4 is a flowchart to explain an example of an operation of reading data from the primary cache memory 103 or NAND type flash main memory 104 by the MPU 101 including the memory management device 102. In this case, the case of reading data from the secondary cache memory 122 is the same as the case of the primary cache memory 103.

In step TT1, the MMU 107 and the main memory MMU 109 converts a read target logical address to a physical address.

If the read target physical address indicates the primary cache memory 103, in step TT2a, the first cache controller 108a reads the read target data from the primary cache memory 103 based on the physical address.

If the read target physical address (physical location) indicates the NAND type flash main memory 104, in step TT2b, the main memory MMU 109 reads data corresponding to the physical address from the NAND type flash main memory 104.

In step TT3*b*, the main memory MMU 109 overwrites the data read from the NAND type flash main memory 104 onto the primary cache memory 103 via the first cache controller 108*a*.

If Address relation data and access history data corresponding to data newly read from the NAND type flash main memory 104 are not stored in the address relation storage 123 and the access history storage 110, the main memory MMU 109 stores data corresponding to the newly read data in the address relation storage 123 and the access history storage 110 based on the address conversion table 105 and the write number data 106 of the NAND type flash main memory 104.

Figure 5:
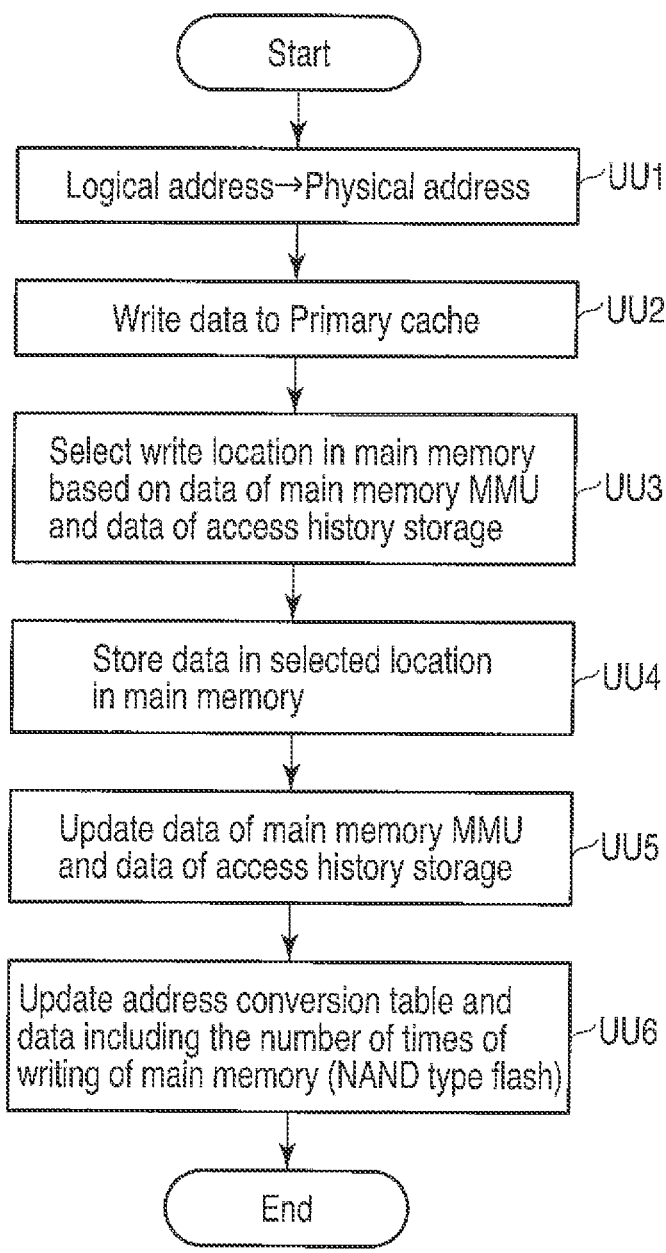
FIG. 5 is a flowchart to explain an example of an operation when overwrite to a cache line of the Primary cache memory occurs from the MPU including the integrated memory management device according to the first embodiment and data in the Primary cache memory is stored in the NAND type flash memory.

FIG. 5 is a flowchart to explain an example of an operation when overwrite to the cache line 103*b* of the primary cache memory 103 is generated from the MPU 101 including the memory management device 102 of this embodiment and data in the Primary cache memory 103 is stored in the NAND type flash memory 104. The case where overwrite to the secondary cache memory 122 is generated is the same as the case of the primary cache memory 103.

In step UU1, the MMU 107 makes conversion from a logical address to a physical address.

In step UU2, the first cache controller 108*a* stores write target data in the primary cache memory 103 in accordance with the physical address.

In step UU3, the main memory MMU 109 selects a location of a block having the number of times of writing less than a predetermined value or a location of a block having the least number of times of writing as a write location of the NAND type flash main memory 104 based on the following data. One is address relation data of the address relation storage 123, and another is access history data of the access history storage 110.

In step UU4, the main memory MMU 109 stores the write target data in the selected location of the NAND type flash main memory 104.

In step UU5, the main memory MMU 109 updates the address relation data of the address relation storage 123 and updates the access history data of the access history storage 110 so that the address relation data and access history data correspond to the cache line 103*b* after overwritten. The main memory MMU 9 further updates the access history data of the access history storage 10.

In step UU6, the main memory MMU 109 updates the address conversion table 105 of the NAND type flash main memory 104 to match with the address relation data stored in the main memory MMU 109. In addition, the main memory MMU 109 updates the write number data 106 of the NAND type flash main memory 104 to match with the address history data stored in the access history storage 110. For example, update of write number data 106 of the NAND type flash main memory 104 is executed when the power of the MPU 101 is turned off or when the access history storage 110 of the MPU 101 is written.

According to this embodiment, the memory management device 102 selects a physical location of the written page or block based on the number of times of writing. Moreover, the memory management device 102 executes the following controls in place of the foregoing control (operation). One is control of avoiding a defective area or block, and another is control of accessing all areas or blocks of the NAND type flash main memory 104 equally without disparity. Another is control of dispersing a location of the access destination area or block. In this case, the access history storage 110 is stored with data such as a generating location of a defective area or block stored in the NAND type flash main memory 104 or write location distribution in the NAND type flash main memory 104. The memory management device 102 may freely combine various controls to select a location of the written area or block.

According to this embodiment, the memory management device 102 may execute garbage collection or erase control in the NAND type flash main memory 104 when interchanging data of cache memory 103.

According to this embodiment, data of at least one of the address relation storage 123 of the main memory MMU 109 and the access history storage 110 may be stored in the secondary cache memory 122. In other words, the address relation data stored in the address relation storage 123 may be stored in the secondary cache memory 122. In addition, access history data including the number of times of writing stored in the access history storage 110 may be stored in the secondary cache memory 122.

The memory management device 102 of the MPU 101 according to this embodiment employs the following algorithm. According to the algorithm, the write target, that is, a physical location of the NAND type flash main memory 104 is selected using data stored in the access history storage 110, and then, written back. The memory management device 102 can utilize a program for executing the foregoing algorithm. For example, it is possible to employ excellent algorithm of avoiding writing a block having many write frequencies.

The foregoing memory management device 102 according this embodiment employs the following configuration in the MPU 101. Specifically, the foregoing MMU 107, first and second cache controllers 108*a*, 108*b*, cache memories 103, 122, main memory MMU 109 and access history storage 110 are integrated. In other words, according to this embodiment, the following architecture is realized. Namely, memory mapping management of the NAND type flash main memory 104 is executed by the memory management device 2 of the MPU 101.

In this way, a layer having large overhead is deleted in the memory hierarchy.

In this embodiment, the MPU 101 executes an operation of a memory controller included in a general NAND type flash memory. As described above, the operation of the MPU and the operation of the memory controller are combined, and then, executed by the MPU 101, and thereby, memory control are cooperated.

According to this embodiment, it is possible to simplify multi-layer memory hierarchy, and to reduce various costs such as time required for access, time required for manufacture, and cost required for manufacture.

According to this embodiment, the memory hierarchy is simple; therefore, a programmer easily grasps a layer where MMU conversion and a generation of replacement of the cache memory are made. Thus, this serves to easily carry out program optimization.

According to this embodiment, it is possible to easily realize optimization between a cache operation of the MPU 101 and an access operation of the main memory.

In a conventional nonvolatile memory, a conventional memory controller controlling access to the conventional nonvolatile memory is separated from a conventional MPU. When the conventional memory controller accesses to the conventional nonvolatile memory, the conventional MPU executes a data transmission to the conventional memory controller via I/O interface. The conventional memory controller executes access control for the conventional nonvolatile memory based on received data from the conventional MPU by the I/O interface.

In this embodiment, a nonvolatile memory is used in a main memory area, and an operating system can access to the nonvolatile memory in a main memory level.

Thus, in this embodiment, it is not necessary to transfer data via the I/O interface. High speed access is realized in this embodiment. A cheep nonvolatile memory can be used as a main memory.

(Second Embodiment)

The second embodiment relates to a modification example of the foregoing first embodiment.

FIG. 6 is a block diagram indicating an example of a memory management device according to the second embodiment.

A MPU 111 includes a memory management device 112 according to the second embodiment. An integrated MMU 113 realizes a function of integrating the MMU 107 and the main memory MMU 109 of the first embodiment.

According to the second embodiment, each tag of the primary and secondary cache memories 103 and 122 is used for managing the cache memories 103 and 122 using a process ID and a logical address.

According to this embodiment, the integrated MMU 113 of MPU 111 as a processor executes a memory mapping management of the primary and secondary cache memories 103, 122 and the NAND type flash main memory 104. In this way, various memories are integrally managed by the integrated MMU 113.

Figure 7:
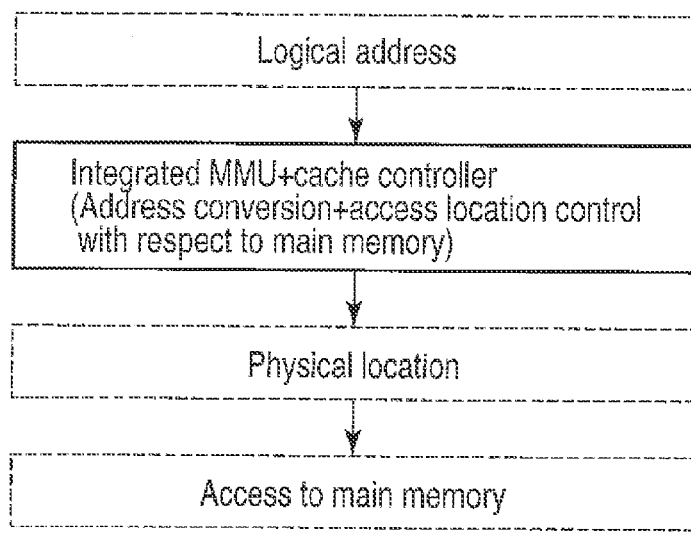
FIG. 7 is a view showing an example of a memory hierarchy of the memory management device in accordance with the second embodiment.

FIG. 7 is a view indicating an example of a memory hierarchy of the memory management device 112 according to the second embodiment.

In the FIG. 7, the integrated MMU 113 and the cache controller 108 belong to a same layer in the memory hierarchy of the second embodiment. The memory management device 112 integrates address conversions for the primary and secondary cache memories 103, 122, and an address conversion for the NAND type flash main memory 104. The address conversions belong to the same memory layer. The memory management device 112 determines an access target area among the primary and secondary cache memories 103, 122 and the NAND type flash main memory 104 in according with a rule.

In this layer of memory hierarchy, when a logical address is converted into a physical location of the NAND type flash main memory 104, control of accessing an area or block having the number of times of writing less than a predetermined number is carried out.

The memory management device 112 accesses the NAND type flash main memory 104 based on the determined physical location.

According to the foregoing embodiment, the MMU 107 and the main memory MMU 109 of the first embodiment are integrated. By doing so, the configuration is simplified, and it is possible to reduce various costs such as time cost required for access and economic cost required for manufacture.

The integrated MMU 113 is used, and thereby, the following address conversions are integrated. One is an address conversion with respect to the primary and secondary cache memories 103 and 122. Another is an address conversion with respect to the NAND type flash main memory 104. For example, storage contents related to a certain process is stored in a near location in the NAND type flash main memory 104 as much as possible. This serves to enable high-speed access. For example, only block having few number of times of writing is selected, and then, assigned to one process.

(Third Embodiment)

The third embodiment relates to modification examples of the memory management devices 102 and 112 according to the foregoing first and second embodiments.

Figure 8:
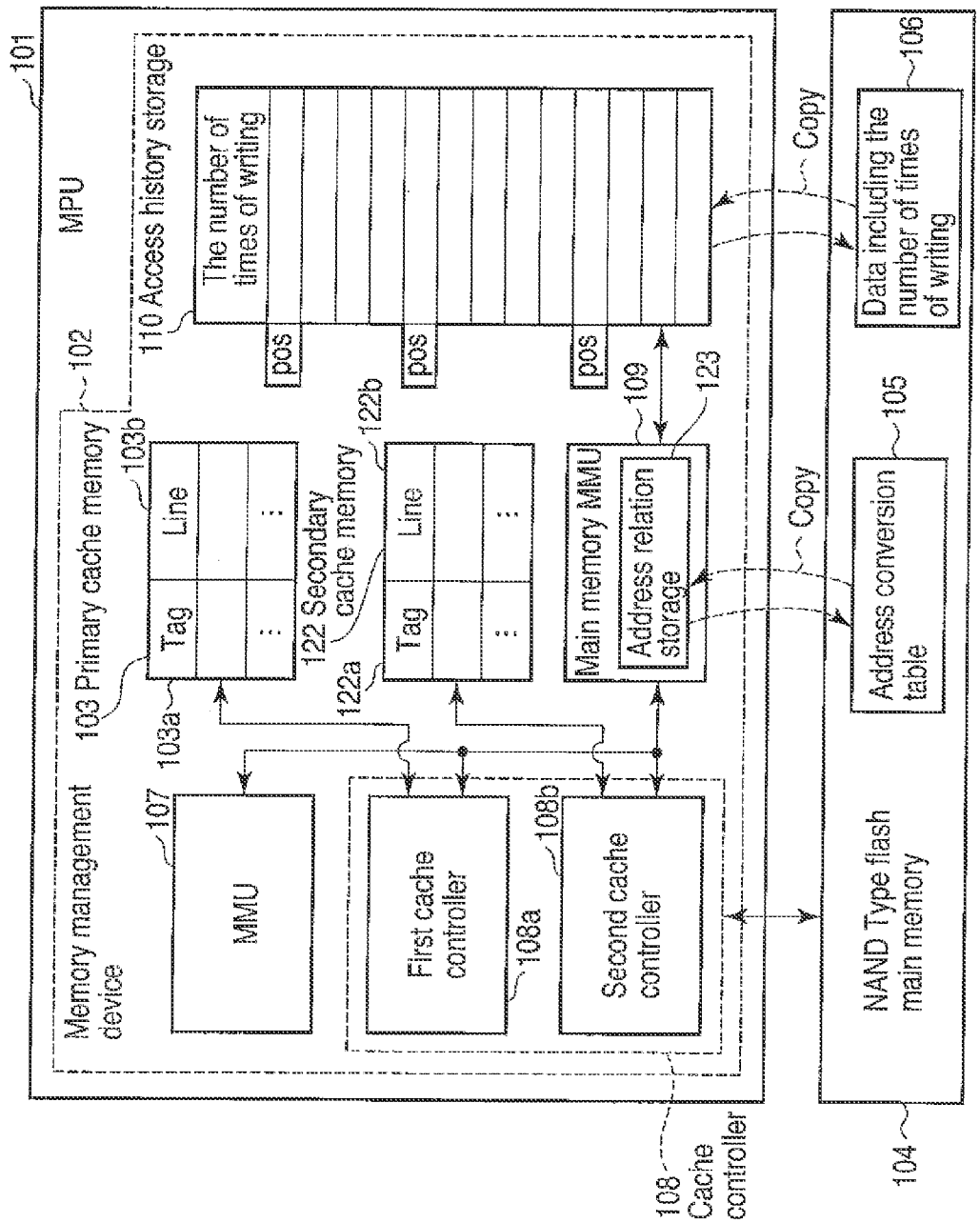
FIG. 8 is a block diagram showing a first example of an memory management device in accordance with a third embodiment of the present invention.

FIG. 8 is a block diagram indicating an example of an memory management device 102 according to a modification example of the first embodiment.

In the foregoing first embodiment, the main memory MMU 109 accesses the NAND type flash main memory 104 based on the physical address. However, the cache controller 108 may execute access to the NAND type flash main memory 104 based on the physical address.

In this case, the main memory MMU 109 executes control of converting a logical address to a physical location. Then, the cache controller 108 accesses the NAND type flash main memory 104 based on the physical location selected by the main memory MMU 109. According to this embodiment, the cache controller 108 reads and updates the address conversion table 105 and the write number data 106 of the NAND type flash main memory 104 in place of the main memory MMU 109.

FIG. 9 is a block diagram showing an example of an memory management device 112 according to a modification example of the first embodiment.

In the foregoing second embodiment, the integrated MMU 113 executes access to the NAND type flash main memory 104 based on the physical location. However, the cache controller 108 may execute access to the NAND type flash main memory 104 based on the physical address.

In this case, the integrated MMU 113 executes control of converting a logical address to a physical location. Then, the cache controller 108 accesses the NAND type flash main memory 104 based on the physical location selected by the integrated MMU 113. According to this embodiment, the cache controller 108 reads and updates the address conversion table 105 and the write number data 106 of the NAND type flash main memory 104.

(Fourth Embodiment)

The fourth embodiment relates to an example to which the memory management devices 102 and 112 according to the foregoing first to third embodiments are applied.

Figure 10:
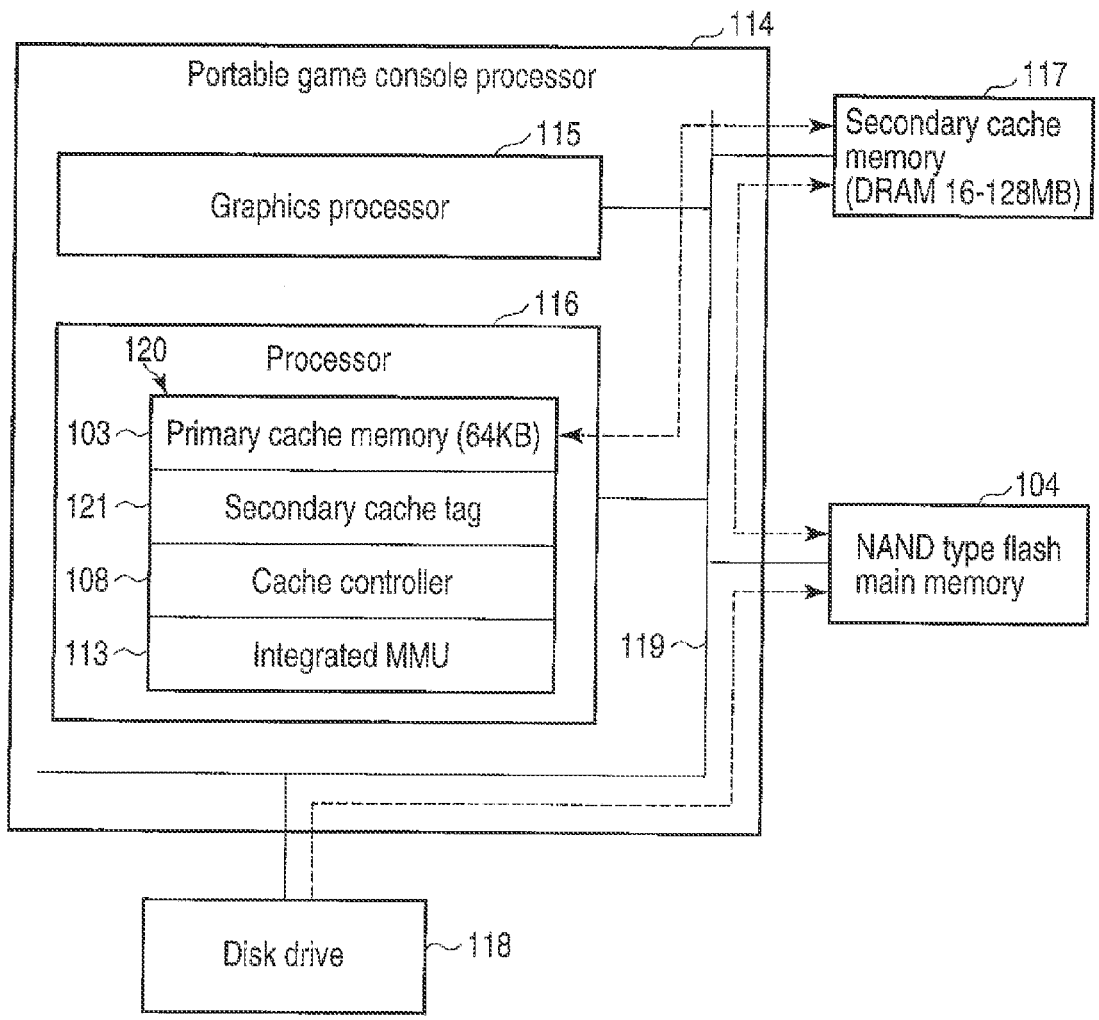
FIG. 10 is a block diagram showing an example to which a memory management device in accordance with a fourth embodiment of the present invention is applied.

FIG. 10 is a block diagram showing an applied example of a memory management device according to the fourth embodiment.

For example, in a game machine or car navigation system, data or program read from a disk drive is once written to a main memory. Thereafter, the data or program written to the main memory is read many times. The fourth embodiment makes an explanation about the case where a memory management device 120 is applied to a game machine. In this case, the memory management device 120 is applied to other devices such as car navigation system in the same manner. In addition, the memory management devices 102 or 112 of the foregoing first embodiment may be used in place of the memory management device 120.

A portable game console processor 114 includes a graphics processor 115 and a processor 116.

The graphics processor 115, the processor 116, a secondary cache memory 117, the NAND type flash main memory 104 and a disk drive 118 are connected to a bus 19.

The processor 116 includes a primary cache memory 103, a secondary cache tag 121 for accessing the secondary cache memory 117, a cache controller 108 and the integrated MMU 113.

The processor 116 further includes the access history storage 110; however, the access history storage 110 is not illustrated in FIG. 10. Incidentally, the processor 116 may use the primary or secondary cache memory 103 or 117 as the access history storage 110.

The cache controller 108 controls access to the primary and secondary cache memories 103 and 117. For example, a DRAM is usable as the secondary cache memory 117. According to this embodiment, the secondary cache memory 117 is separated from the portable game console processor 114.

A band width to the secondary cache memory 117 is set to about ten times as much as the NAND type flash main memory 104. For example, an optical disk drive is usable as the disk drive 118.

In this embodiment, write to the NAND type flash main memory 104 is executed when a game cartridge is replaced. In other operations, the NAND type flash main memory 104 is used in read only. Frequently written data or program code and frequently read data or program code are stored in the secondary cache memory 117. In addition, the further frequently read data or program code is stored in the primary cache memory 103.

For example, of data or program code stored in the primary or secondary cache memory 103 or 117, data or program code having low frequency is written to the NAND type flash main memory 104. Of data or program code stored in the NAND type flash main memory 104, data or program code having high frequency may be stored in the primary or secondary cache memory 103 or 117.

According to this embodiment, for example, the primary cache memory 103 has a data capacity of about 64 kilobytes, the secondary cache memory 117 has a data capacity of about 16 to 128 megabytes, and the NAND type flash main memory 104 has a data capacity of about 1 gigabytes.

For example, the graphics processor 115 has processing capabilities balanced with a speed of the NAND type flash main memory 104 having 1/10 band width or about two or three times as much as the speed. Low frequency data is read from the NAND type flash main memory 104; conversely, high frequency data is read from the primary or secondary cache memory 103 or 117.

According to this embodiment, garbage collection and erase of the NAND type flash main memory 104 are carried out when cache is replaced (cache miss). In this way, it is possible to provide the processor 116, which can realize optimization described above. Thus, preferable optimization is effected.

An entry size of the secondary cache memory 117 is set to about 1 megabyte, and thereby, the secondary cache memory 117 has good compatibility with the NAND type flash main memory 104.

According to this embodiment, it is possible to prevent overhead from becoming large because virtual memory conversion is made double.

In this embodiment, the processor 116 is provided with the integrated MMU 113, and thereby, the primary cache memory 103, the secondary cache memory 117 and the NAND type flash main memory 104 are integrally managed.

According to this embodiment, it is possible to reduce data stored in resume time.

According to this embodiment, data or program is stored in the NAND type flash main memory 104, and thereby, access to the disk drive 118 is reduced. Thus, this serves to reduce wait time, and to improve user's operability and satisfaction.

According to this embodiment, the NAND type flash main memory 104 having a memory unit price cheaper than the secondary cache memory 117 (such as DRAM) is used, and thereby, a large number of data or program is accessible at high speed.

(Fifth Embodiment)

The fifth embodiment relates to a memory management device which is interposed between at feast one of processors and a main memory.

FIG. 11 is a block diagram indicating a configuration of a memory management device according to a fifth embodiment.

A memory management device 124 in this embodiment is connected with a plurality of processors (for example, including a Codec IP or Graphic IP) 1251 to 1254 via a system bus 130. The memory management device 124 is applied to a multiprocessor configuration. The memory management device 124 is further connected with a non-volatile main memory 126 such as a NAND type flash memory, for example. According to the fifth embodiment, the number of processors is one or more, and may be freely changeable.

In the main memory 126, writing and reading are carried out at a unit of plural bits called as a page. Erasing is collectively carried out at a unit collecting a plurality of pages called as a block.

Some of the foregoing processors 1251 to 1254 execute a process including a logical address. According to this embodiment, processors 1251, 1252 and 1254 execute processes 1271, 1272 and 1274, respectively. Incidentally, the foregoing processes 1271, 1272 and 1274 may be an operating system.

The processors 1251 to 1254 include primary cache memories 1281 to 1284 and secondary cache memories 1291 to 1294, respectively.

The memory management device 124 executes wear leveling, and makes a conversion from a logical address to a physical address.

The memory management device 124 executes wear leveling at a page unit, a multiple unit of the page, a block unit, or a multiple unit of the block of the main memory 126. A wear leveling counter is stored in a redundancy area 26a of the main memory 126. The redundancy area 26a is a redundancy area given every page or block of the main memory 126. When making mapping in a memory space, the memory management device 124 executes memory securing considering wear leveling.

The memory management device 124 handles a removable memory as a main memory, and maps the removable memory in a memory space.

The memory management device 124 is provided on the side of the main memory 126 rather than the side of the processors 1251 to 1254. However, the memory management device 124 may be provided on the side of the processors 1251 to 1254.

The memory management device 124 changes a page size based on an instruction and data. For example, an instruction page size is set to a small size such as 16 kilobytes, and a data page size is set to a large size such as 512 kilobytes.

The main memory 126 has the same memory page size as the page size (process or OS) of the memory management device 124 or a memory page size of multiple of the page size of the memory management device 124.

Page transmission is collectively executed between primary and secondary cache memories 1281 to 1284 and 1291 to 1294 and the main memory 126. The batch (collective) transmission is carried out at the page unit, the multiple unit of the page, the block unit (e.g., 256 kilobytes to 512 kilobytes), or the multiple unit of the block of the main memory 126.

Access to primary and secondary cache memories 1281 to 1284 and 1291 to 1294 is made based on a logical address. The logical address is used on the system bus 130.

The memory management device 124 integrally executes the following conversions. One is a conversion from a logical address of a process level to a physical address with respect to the processors 1251 to 1254. Another is a conversion from a logical page or logical block to a physical page or a physical block for the wear leveling of the page unit, the multiple unit of the page, block unit, or the multiple unit of the page of the main memory 126.

Figure 12:
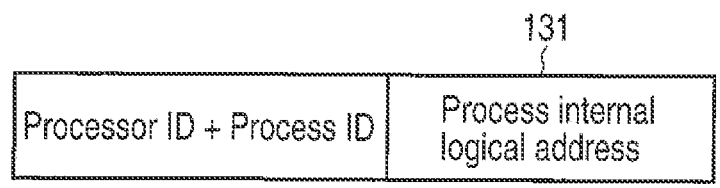
FIG. 12 is a block diagram showing an example of a system logical address according to the fifth embodiment.

According to the fifth embodiment, a system logical address 131 having a format shown in FIG. 12 is used. The system logical address 131 includes a processor ID and a process ID and a process internal logical address. At least one of processor ID and a process ID is may be converted. For example, the length of at least one of the processor ID and process ID is may be shortened by hashing. And the system logical address 131 may include a converted content. For example, the processor ID and process ID may be converted by hashing, and the system logical address 131 may include converted bits by hashing and the process internal logical address.

The main memory 126 is stored with a page table 126b in the entire system. Specifically, the main memory 126 comprises a page table 126b which integrates each page table corresponding to the processes 1271, 1272 and 1274, and does not comprises each page table corresponding to each process 1271, 1272 and 1274.

According to this embodiment, a main memory having the same capacity as HDD is used as the main memory 126. In this case, there is no need of using a secondary memory (swap out) because of using a memory space larger than a physical memory. In the conventional case, for example, the physical main memory is a DRAM, and has a capacity of about 1 GB. However, if a 4-GB logical memory space is used for each process, a secondary memory area is secured on the HDD having a larger memory capacity, and then, swap in/swap out must be executed. On the contrary, according to this embodiment, the main memory 126 has the same level memory capacity as the HDD capacity; therefore, the secondary memory device does not need to be used.

Thus, this serves to simplify a device configuration and operation.

According to this embodiment, instant on/off is carried out; therefore, resume is effected at a high speed.

In the conventional case, a file must be loaded before execution. On the contrary, according to this embodiment, there is only need to jump into an execution address on the cache memories 1281 to 1284 or 1291 to 1294 or the main memory 126. Thus, there is no need of lading the file before execution.

(Sixth Embodiment)

The sixth embodiment relates to a modification example of the foregoing fifth embodiment.

Figure 13:
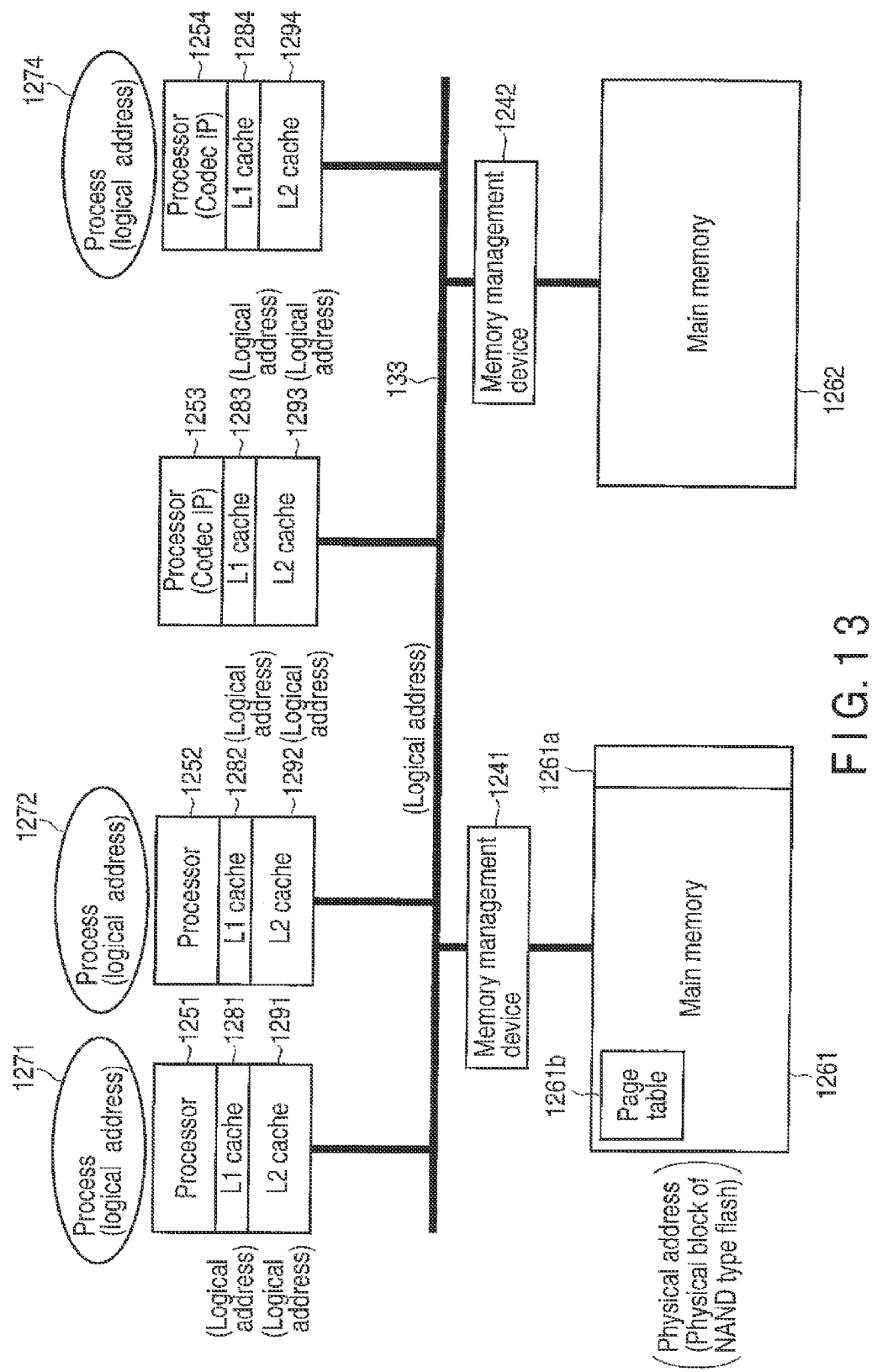
FIG. 13 is a block diagram showing an example of a memory device according to a sixth embodiment of the present invention.

FIG. 13 is a block diagram indicating a configuration of a memory management device according to a sixth embodiment.

In the memory management device of this embodiment, a plurality of memory management devices 1241 and 1242 is connected with a plurality of processors (such as including Codec IP, graphic IP) 1251 to 1254 via a network 133. The memory management devices 1241 and 1242 are respectively connected with non-volatile main memories 1261 and 1262 such as NAND type flash memory, for example.

The number of the memory management devices and the number of the main memories may be freely changeable.

The main memory 1261 has the same features as the main memory 126 of the foregoing fifth embodiment. The main memory 1261 has a redundancy area 1261a, which stores a wear leveling counter, and a page table 1261b which integrates page tables corresponding to processes 1271, 1272 and 1274. The main memory 1262 has the same features as the main memory 1261.

Figure 14:
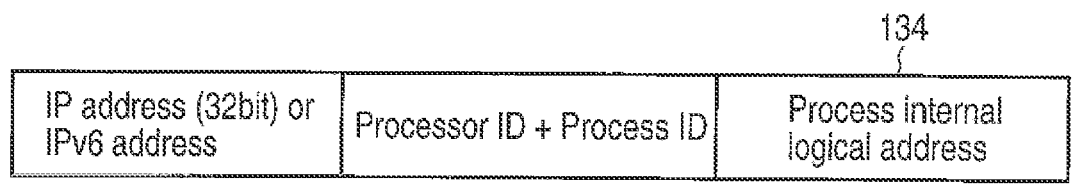
FIG. 14 is a block diagram showing an example of a system logical address according to the sixth embodiment.

According to the sixth embodiment, a logical address 134 is used. The logical address 134 shown in FIG. 14 includes a IP address or IPv6 address of the network 133, processor ID and process ID, and process internal logical address. At least one of each address and IDs is may be converted. For example, the length of at least one of addresses and IDs is may be shortened by hashing. And the logical address 134 may include a converted content. For example, IP address or IPv6 address, the processor ID and process ID may be converted by hashing, and the logical address 134 may include converted bits by hashing and the process internal logical address.

The main memories 1261 and 1262 have the same memory page size as a page size of the memory management devices 1241 and 1242 or has a memory page size of integer multiples of the page size of the memory management devices 1241 and 1242.

Page transmission is collectively executed between primary cache memories 1281 to 1284 or secondary cache memories 1291 to 1294 and main memories 1261 or 1262. The batch transmission is executed at a page unit, integer multiples unit of the page size, block unit (e.g., 256 kilobytes to 512 kilobytes), or integer multiples unit of the block size of the main memory.

According to this embodiment, an access to the primary cache memories 1281 to 1284 and access to secondary cache memories 1291 to 1294 is executed based on a logical address. A logical address is used on the network 133.

The memory management devices 1241 and 1242 integrally make the following conversions. One is a conversion from a logical address of a process level to a physical address with respect to the processors 1251 to 1254. Another is a conversion from a logical page or block to a physical page or block for wear leveling of a page unit, integer multiples unit of the page size, a block unit, or integer multiples unit of the block size of the non-volatile main memories 1261 and 1262.

According to the fifth embodiment, the same effect as the foregoing fifth embodiment is obtained in a wide memory space via the network 133.

(Seventh Embodiment)

The seventh embodiment relates to a modification example of the foregoing fifth and sixth embodiments. In the following description, a modification example of the fifth embodiment will be hereinafter described. The sixth embodiment may be also modified in the same manner.

Figure 15:
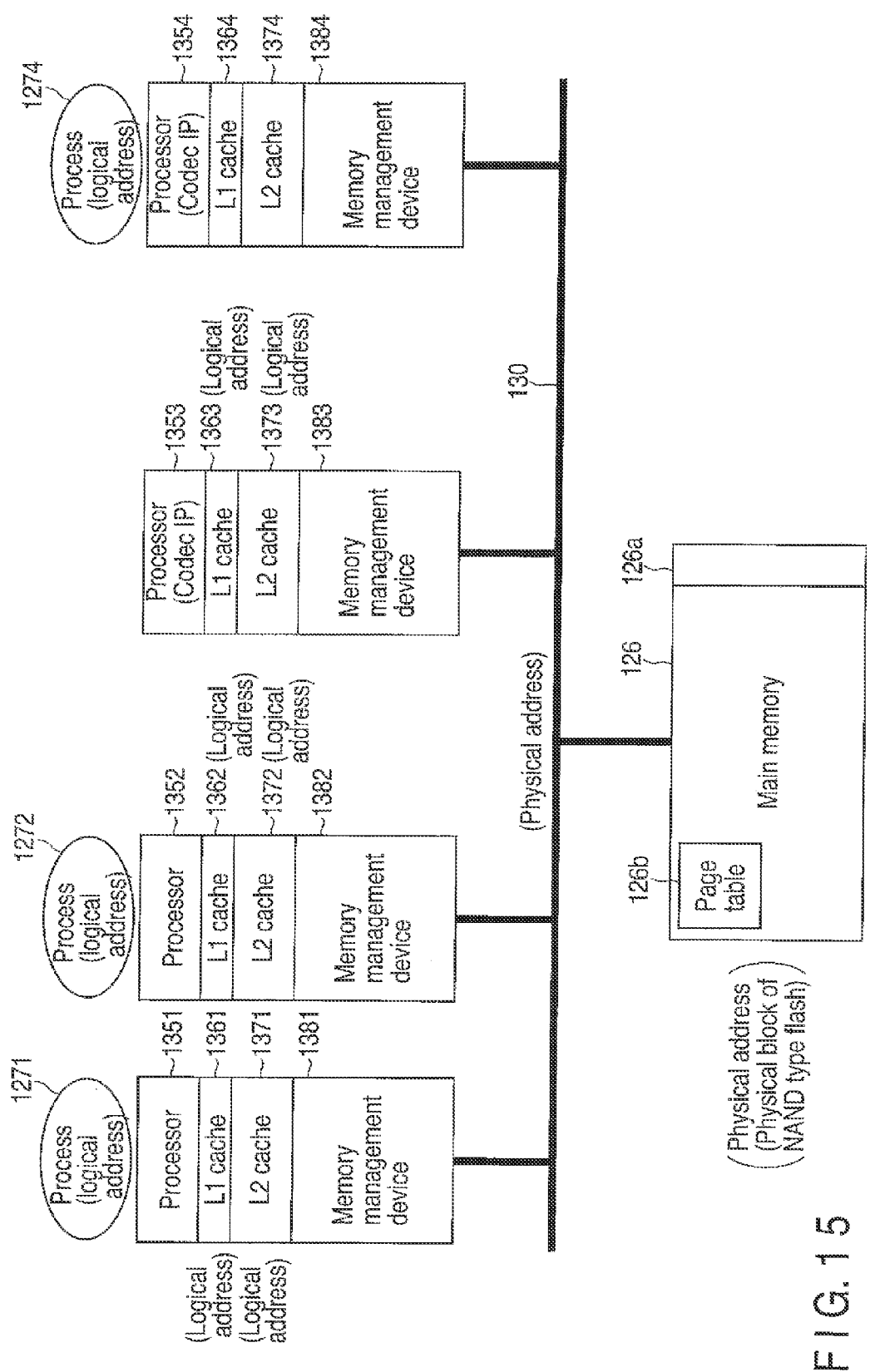
FIG. 15 is a block diagram showing an example of memory management device according to a seventh embodiment of the present invention.

FIG. 15 is a block diagram indicating a configuration of a memory management device according to a seventh embodiment.

A plurality of processors 1351 to 1354 are connected with a main memory 126 via a system bus 130. According to this embodiment, the number of processors may be freely changeable.

Some of the foregoing processors 1351 to 1354 execute a process including a logical address. According to this embodiment, processors 1351, 1352 and 1354 execute processes 1271, 1272 and 1274, respectively. At least one of the processes 1271, 1272 and 1274 may be an operating system.

The foregoing processors 1351 to 1354 include primary cache memories 1361 to 1364, secondary cache memories 1371 to 1374 and memory management devices 1381 to 1384, respectively.

The memory management devices 1381 to 1384 each execute wear leveling, and make a conversion from a logical address to a physical address. These memory management devices 1381 to 1384 are provided on the side of the processors 1351 to 1354.

The main memory 126 has the same memory page size as a page size of the memory management devices 1381 to 1384 or has a memory page size of integer multiples of the page size of the memory management devices 1381 to 1384.

Page transmission is collectively executed between primary cache memories 1361 to 1364 or secondary cache memories 1371 to 1374 and the main memory 126. For example, the batch transmission is executed at a block (integer multiples of a page) unit (e.g., 256 kilobytes to 512 kilobytes) of the main memory.

According to the seventh embodiment, a logical address is used for making access to primary cache memories 1361 to 1364 or for making access to secondary cache memories 1371 to 1374. A physical address is also used on the system bus 130.

The memory management devices 1381 to 1384 provided for the processors 1351 to 1354 each make the following conversions. One is a conversion from a logical address of a process level to a physical address. Another is a conversion from a logical address to a physical address for wear leveling of a page unit, integer multiples unit of the page size, block unit, integer multiples unit of the block size of the main memory 126.

As described above, according to the seventh embodiment, even if the memory management devices 1381 to 1384 are provided on the side of the processors 1351 to 1354, the same effect as the foregoing fifth embodiment is obtained.

(Eighth Embodiment)

In this embodiment, details of the fifth embodiment will be described.

FIG. 16 is a block diagram illustrating an example of a structure of the memory management device 124 according to this embodiment.

A NAND type flash main memory 126 includes a physical block 139 corresponding to a physical address, a page table 126b, memory usage information 140, and memory peculiarity (unique) information 141.

The cache line size of each of the primary cache memories 1281 to 1284 and the secondary cache memories 1291 to 1294 of the processors 1251 to 1254 is equal to the integral multiples of the page size or the block size of the NAND type flash main memory 126, which makes it possible to improve the transmission efficiency of data.

In the NAND type flash main memory 126, various types of data, such as data D1, may exist in a plurality of physical blocks 139. For example, a plurality of data, such as data D1 and D2, may exist in one physical block 139.

The data D1 and D2 may include unique read/write (read and write) frequency information items E1 and E2, respectively. For example, each of the data D1 and D2 includes at least one of static information and dynamic information. The static information means a predetermined value. The dynamic information includes the number of times data is actually written and the number of times data is actually read.

For example, information indicating that data for a captured image is read or written one time for two hours immediately after image capture, and information indicating that data for a captured image is read one time within two weeks and is not written after three days have elapsed from image capture is stored as the static information of image data of a digital camera. In addition, for example, the following information is stored as the static information of the cache information of a web browser: information indicating that data is written and read one time for several minutes; information indicating that the information of a site, which is accessed a predetermined number of times or more, is written one time per day; information indicating that, when there is a periodic access pattern, the information thereof is written according to the periodic access pattern; and information indicating that the number of write operations is large for a predetermined amount of time.

The static information needs to include a value that is effective for various types of data. A static information setting file may be shared on a network.

One page table 126b may suffice for one system. Alternatively, the page table 126b may not be provided.

The memory usage information 140 includes the number of read and write operations in each memory area and the number of times each data is read and written. Specifically, for example, the memory usage information 140 includes the number of times data is written (or rewritten) in each memory area (page or block), the number of times data is read from each memory area, and data information (for example, the number and type of data information items, the number of times data is read, and the number of times data is written) stored in the memory area.

The memory peculiarity information 141 includes, for example, the page size and the block size of the NAND type flash main memory 126, the number of times data can be written in the memory, and the number of time data can be read from the memory. Specifically, for example, the memory peculiarity information 141 includes the page size and the block size of the NAND type flash main memory 126, the total memory capacity of the memory, SLC (single level cell) area information (for example, a block position, a size, the number of times data can be read, and the number of times data can be written), and MLC (multi level cell) area information (for example, a block position, a size, the number of times data can be read, and the number of times data can be written).

The memory management device 124 converts a logical address for each process (or an OS) into a physical address, and converts a logical address for the NAND type flash main memory 126 into a physical address.

The integrated memory management device 124 performs optimal wear-leveling on the basis of the read/write frequency information items E1 and E2 peculiar to the data D1 and D2, the memory usage information 140, and the memory peculiarity information 141.

The memory management device 124 includes a microprocessor 142, a work memory 143, an information register 144, and a cache memory 145.

The microprocessor 142 uses the information register 144 and the work memory 143 to perform memory management. The cache memory 145 temporarily stores data from the processors 1251 to 1254 and data from the NAND type flash main memory 126. In addition, the cache memory 145 may be an external DRAM.

Figure 17:
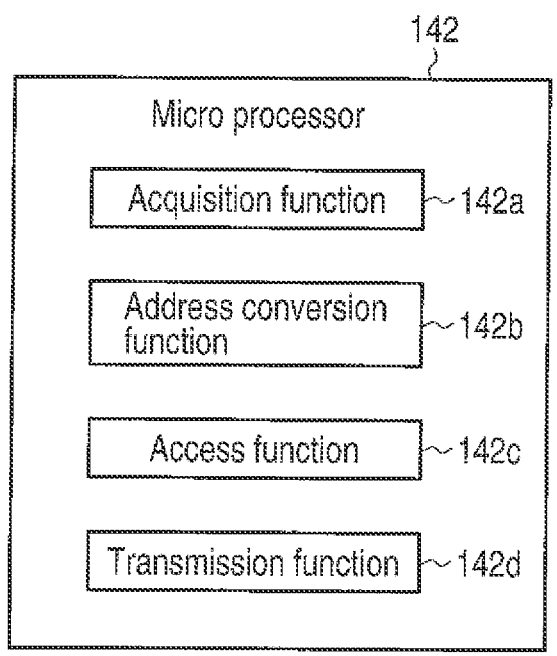
FIG. 17 is a block diagram illustrating an example of a function of a microprocessor of the memory management device according to the eighth embodiment.

FIG. 17 is a block diagram illustrating an example of a function of the microprocessor 142.

The microprocessor 142 has an acquisition function 142a, an address conversion function 142b, an access function 142c, and a transmission function 142d.

When any one of the plurality of processors 1251 to 1254 reads data from the NAND type flash main memory 126, the acquisition function 142a acquires a read logical address from any one of the plurality of processors 1251 to 1254.

The address conversion function 142b converts the read destination logical address acquired by the acquisition function 142a into the read destination physical address of the NAND type flash main memory 126. For example, the NAND type flash main memory 126 is divided into areas having each group attribute. The NAND type flash main memory 126 comprises memory peculiarity information 141 including the group attributes of the areas. In this case, the address conversion function 142b refers to read/write frequency information items E1 and E2 peculiar to data D1 and D2 and the memory peculiarity information 141. The read/write frequency information items E1 and E2 are defined by an operating of a file management program (process) on at least one of the processors 1251 to 1254. The address conversion function 142b decides the write destination physical address representing an area corresponding to the group attribute of the read/write frequency information items E1 and E2 peculiar to data D1 and D2.

The access function 142c reads data corresponding to the read destination physical address from the NAND type flash main memory 126. The size of the read data is equal to a page size, the integer multiples of the page size, a block size, or the integer multiples of the block size of the NAND type flash main memory 126.

The transmission function 142d transmits the read data to the cache memory of the processor that has issued the read logical address. The cache size of the cache memory of the processor that has issued the read logical address depends on (e.g., equal to) a page size, the integer multiples of the page size, a block size, or the integer multiples of the block size of the NAND type flash main memory 126.

When any one of the plurality of processors 1251 to 1254 writes data in the NAND type flash main memory 126, the acquisition function 142a acquires a write destination logical address and write data from the processor. For example, the size of the write data is equal to the cache size.

The address conversion function 142b converts the write destination logical address acquired by the acquisition function 142a into the write destination physical address of the NAND type flash main memory 126.

The access function 142c writes the write data in the NAND type flash main memory 126 at a position corresponding to the write destination physical address.

The address conversion function 142b of the microprocessor 142 performs wear-leveling on the basis of at least one of the read/write frequency information items peculiar to data, the memory usage information 140, and the memory peculiarity information 141.

FIG. 18 is a diagram illustrating an example of a first operation of transmission algorithm of the integrated memory management device 124.

The microprocessor 142 of the memory management device 124 reads out the memory usage information 140 and the memory peculiarity information 141 and stores the information in the information register 144 during start-up. The memory peculiarity information 141 includes the page size and the block size of the NAND type flash main memory 126. The cache size of each of the processors 1251 to 1254 is equal to a page size, the integer multiples of the page size, a block size, the integer multiples of the block size of the NAND type flash main memory 126.

When the memory management device 124 is applied to the existing processor and it is impossible to change the cache size of the processor, the microprocessor 142 performs buffering in the cache memory 145 to adjust a difference between the cache size of each of the processor 1251 to 1254 and the page size, the integer multiples of the page size, the block size, the integer multiples of the block size of the NAND type flash main memory 126. For example, the microprocessor 142 reads data corresponding to a 256-kilobyte page size to the work memory 143 and the cache memory 145, and outputs data corresponding to a cache line of 4 kilobytes to any one of the processors 1251 to 1254.

FIG. 19 is a diagram illustrating an example of a second operation of the transmission algorithm of the memory management device 124.

The microprocessor 142 of the memory management device 124 receives an access request corresponding to one cache line from the processor 1252 (Tr19A).

Then, the microprocessor 142 reads data that is equal to the page size, the integer multiples of the page size, the block size, the integer multiples of the block size corresponding to the access request from the NAND type flash main memory 126, and stores the read data in the cache memory 145 (Tr19B).

Then, the microprocessor 142 transmits data corresponding to the access request from the cache memory 145 to the processor 1252 (Tr19C).

FIG. 20 is a diagram illustrating an example of a third operation of the transmission algorithm of the memory management device 124.

The processor 1252 writes data in the cache memory 1282 or the cache memory 1292 (Tr20A).

Then, the microprocessor 142 of the memory management device 124 caches out the data written in the cache memory 1282 or the cache memory 1292, and transmits the data to the cache memory 145 (Tr20B).

In this way, the microprocessor 142 performs wear-leveling on the basis of the read/write frequency information items included in the data, and the memory usage information 140 and the memory peculiarity information 141 stored in the information register 144 to determine a physical block 139 for data writing among a plurality of physical blocks of the NAND type flash main memory 126.

The microprocessor 142 stores the written data stored in the cache memory 145 in the determined physical block 139 (Tr20C).

In the write operation, if necessary, a movement of a memory block and a garbage collection are performed.

FIG. 21 is a block diagram illustrating an example of the wear-leveling.

The NAND type flash main memory 126 includes two or more banks 146a and 146b.

The microprocessor 142 sequentially and additionally stores data (a block or a page) in one bank 146a. Additional data writing is executed to the NAND type flash main memory 126.

When data is erased, the microprocessor 142 erases target data from the bank 146a. However, until data is stored in the last area of the bank 146a, the additional data storage process is sequentially performed. In the bank 146a, which is a write target, data writing is not performed on an area from which data is erased. Therefore, when data is erased from the bank 146a, which is a write target, the area from which the data is erased is empty.

When data is completely stored in the last area of the bank 146a, the microprocessor 142 copies valid data that has not been erased from the bank 146a to the bank 146b while performing the garbage collection, and additionally stores new data in the bank 146b, starting from the area following the area in which the copied data is stored. The microprocessor 142 copies data of a first bank to another second bank, and then clears the first bank. Then, the same process as described above is repeated.

Next, the detailed example of the wear-leveling algorithm used by the microprocessor 42 of the integrated memory management device 24 will be described.

A empty area cancel process may be a process of which data of memory area of the NAND type flash main memory 126 is translocated to a redundancy area of the NAND type flash main memory 126.

In the following description, an operation example of wear-leveling algorithm using in microprocessor 142 of the memory management device 124 will be hereinafter described.

First, the microprocessor 142 receives data to be written from a processor or an OS. When there is a plurality of data to be written, data having the highest write frequency is used as a standard. When the existing processor or OS is used, the microprocessor 142 examines the head of data to determine the type of data.

For example, when the type of data to be written is compressed image data, the write frequency of the data to be written is low. Therefore, the microprocessor 142 determines an MLC area as a write area. Alternatively, when the type of data to be written is compressed image data, the microprocessor 142 determines an empty area in which the number of time of writing is high as a write area.

For example, when the type of data to be written is cache data of a web browser, the write frequency of data is high. Therefore, the microprocessor 142 determines an SLC area as the write area.

For example, the microprocessor 142 determines an empty block having the lowest number of times of writing in the SLC area or the MLC area as a write area.

For example, when the number of write operations in all the empty areas (for example, empty blocks) of the NAND type flash main memory 126 reaches a predetermined percent (for example, 80%) of the maximum number of times data can be written, the microprocessor 142 selects an area having the low number of time of writing on the basis of static information and an area having the low number of times of writing on the basis of dynamic information, from the areas in which data has already been written. Then, the microprocessor 142 stores, in an empty area, the data in the selected area. Then, the microprocessor 142 erases the data stored in the selected area. That is, the microprocessor 142 shifts data from the selected area to an empty area.

In this embodiment, the microprocessor 142 of the memory management device 124 may manage a plurality of NAND type flash main memories 126.

Figure 22:
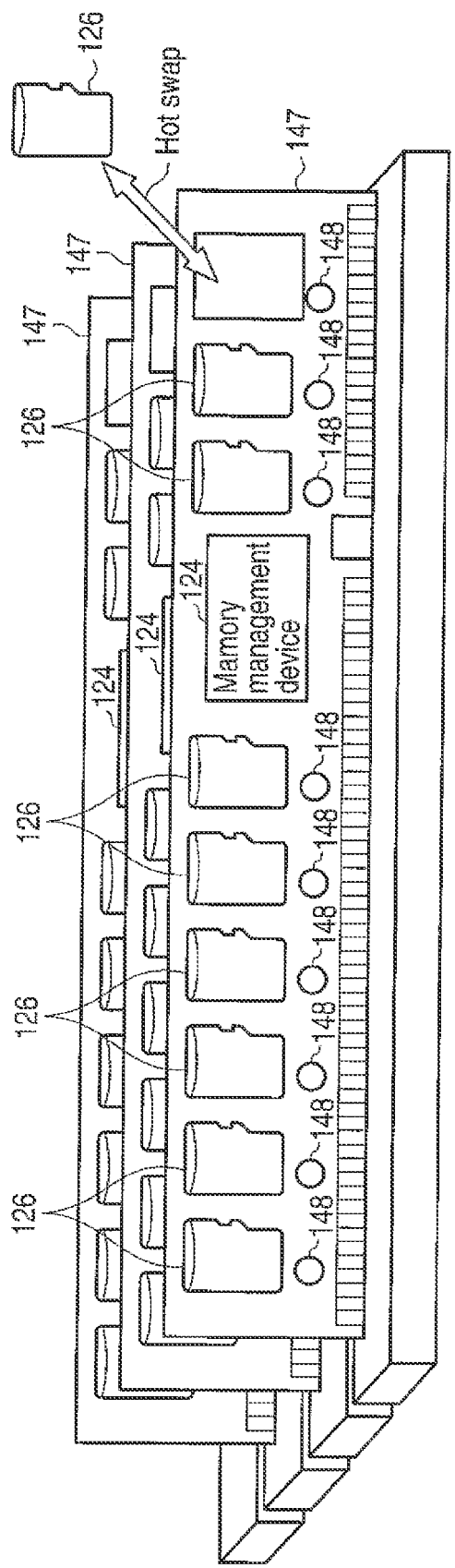
FIG. 22 is a perspective view illustrating an example of a memory management device that manages a plurality of NAND type flash main memories.

FIG. 22 is a perspective view illustrating an example of the memory management device 124 that manages a plurality of the NAND type flash main memories 126.

One memory management device 124 and a plurality of the NAND type flash main memories 126 form one memory unit 147. In FIG. 22, three memory units 147 are formed.

The memory management device 124 manages an access to a plurality of the NAND type flash main memories 126 belonging to one memory unit 147.

A plurality of the memory management devices 124 provided in the plurality of the memory units 147 are operated such as one memory management device in cooperation with each other.

The memory management device 124 of the memory unit 147 includes an ECC function and an RAID function for a plurality of the NAND type flash main memories 126 in the memory unit 147, and performs mirroring and striping.

Each of the NAND type flash main memories 126 is hot-swappable (replaceable) even when the memory unit 147 is turned on (operated). Each of the plurality of the NAND type flash main memories 126 is provided with a button 148.

The button 148 includes an alarm output unit (for example, an LED). For example, the alarm output unit has a first color (green) indicating a normal condition and a second color (red) indicating that replacement is needed.

When the button 148 is pushed, a notification signal is transmitted to a process or an OS. In a stable state in which access is not performed, the button 148 has a third color (blue), and the NAND type flash main memory 126 corresponding to the button 148 is hot-swappable.

When a hot-swap is executed, a lump which represents hot-swappable is lighted after the button 148 for a hot-swappable request was pushed and write back had been finished. And the NAND type flash main memory 126 is exchanged.

The microprocessor 142 of the memory management device 124 determines whether the number of write operations or read operations of each of the NAND type flash main memories 26 reaches the upper limit described in the memory peculiarity information 141 on the basis of the memory usage information 140 and the memory peculiarity information 141 stored in the information register 144. Then, when it is determined that the number of write operations or read operations reaches the upper limit, the microprocessor 142 notifies or alerts that the memory should be replaced.

In this embodiment, when the page size or block size of the NAND type flash main memory 126 is large, preload is available.

In the case of the preload, the microprocessor 142 of the memory management device 124 preloads data, which is more likely to be frequently accessed, to the cache memory 145 in advance, with reference to the data peculiarity (unique) information items E1 and E2 of the NAND type flash main memory 126.

Alternatively, the microprocessor 142 preloads data that has periodicity and is more likely to be accessed within a predetermined period of time before the predetermined period of time elapses.

FIG. 23 is a block diagram illustrating an example of a multi-processor system using the memory management device 124 according to this embodiment for an existing processor including an MMU.

A processor 1255 is the existing processor, and includes an MMU 1495, a primary cache memory 1285, and a secondary cache memory 1295. The processor 1255 executes a process 1275. The system shown in FIG. 23 includes both address conversion (translation) by the MMU 1495 according to the related art and address conversion by the memory management device 124 according to this embodiment. In this case, when the MMU 1495 of the processor 1255 accesses the NAND type flash main memory 126, first, the MMU 1495 accesses the page table 126b of the NAND type flash main memory 126. However, the page table 126b includes a content which does not perform address conversion, but passes through the conversion. For example, both an address before conversion and a converted address are same values in the page table 126b. Therefore, the MMU 1495 of the processor 1255 does not perform address conversion, but the memory management device 124 can perform address conversion.

Next, a difference between the system using the integrated memory management device 124 according to this embodiment shown in FIG. 16 and the multi-processor system according to the related art will be described.

FIG. 24 is a block diagram illustrating an example of a general multi-processor system according to the related art.

In the multi-processor system according to the related art, the existing processors 1255 to 1258, a main memory 150, and a secondary memory device 151 are connected to a system bus 130.

The processors 1255 to 1258 include MMUs 1495 to 1498 and the primary cache memories 1285 to 1288, and the secondary cache memories 1295 to 1298, respectively. The processors 1255, 1256, and 1258 perform the processes 1275 to 1277, respectively.

Each of the MMUs 1495 to 1498 performs conversion between a logical address and a physical address. An access from each of the processors 1255 to 1258 to any one of the primary cache memories 1285 to 1288, the secondary cache memories 1295 to 1298, the main memory 150, and the secondary memory device 151 is performed on the basis of the physical address.

For example, a volatile memory device, such as a DRAM, is used as the main memory 150. The main memory 150 includes page tables 1525 to 1528 for the processes 1275 to 1277.

For example, a hard disk drive, an SSD (solid state drive), or a NAND type flash memory is used as the secondary memory device 151.

In the multi-processor system according to the related art, for example, a DRAM is used as the main memory. However, in the multi-processor system according to this embodiment, the NAND type flash main memory 126 is used as the main memory. In general, the bit cost of the DRAM is higher than the bit cost of the NAND type flash main memory 126. Therefore, this embodiment can reduce costs.

In the multi-processor system according to the related art, the main memory is volatile. However, in the multi-processor system according to this embodiment, a non-volatile NAND type flash main memory 126 is used as the main memory. Therefore, this embodiment can perform instant boot-up, and reduce the time required to load, for example, a program or data to the main memory. As a result, it is possible to increase an operating speed.

The multi-processor system according to the related art is provided with both the volatile main memory 150 and the non-volatile secondary memory device 151. In contrast, the multi-processor system according to this embodiment is provided with the NAND type flash main memory 126. Therefore, it is possible to use a non-volatile main memory and remove the secondary memory device, such as a hard disk. In this embodiment, it is not necessary to provide a DRAM as the main memory. Therefore, in this embodiment, when a DRAM is provided as a cache, the storage capacity of the cache may be reduced. As a result, according to this embodiment, it is possible to simplify the structure of a system and the management of a memory, which results in a reduction in costs.

In the multi-processor system according to the related art, the page tables 1525 to 1528 should be shared, which causes access congestion. In contrast, in the multi-processor system according to this embodiment, it is not necessary to share the page tables. Therefore, it is possible to remove the access congestion.

When a DRAM or SSD is used as the secondary memory device as in the related art, the concept of, for example, a file or serial ATA (SATA) is used. In this case, an overhead certainly occurs. In contrast, in this embodiment, data is not abstracted by a file, but is directly accessed by the memory. Therefore, according to this embodiment, it is possible to improve the access efficiency of data.

In the related art, a DRAM or SSD is used for the secondary memory device. However, in this embodiment, at the time of start-up, a disk search time is not required, and it is possible to reduce the start-up time. In this embodiment, it is also possible to increase the start-up speed of application software. In this embodiment, it is also possible to increase a search speed and the execution speed of application software. In this embodiment, it is possible to operate application software for a plurality of processors. In this embodiment, since a non-volatile main memory is used, it is not necessary to consider the life span of a batter for a main memory when the system is in a sleep state. In this embodiment, it is possible to reduce the number of parts and thus reduce manufacturing costs. This embodiment can easily adapt to a multi-processor environment. In this embodiment, installation is reduced, and it is possible to remove process migration.

In this embodiment, the memory management device 124 performs optimal wear-leveling on the basis of the read/write frequency information items E1 and E2 peculiar to data, the memory usage information 140, and the memory peculiarity information 141. In this embodiment, the wear-leveling is performed on the basis of the read/write frequency information items E1 and E2 peculiar to data, which makes it possible to perform wear-leveling more efficiently than SSD.

In general, when the generations of the NAND type flash memories are different from each other, the NAND type flash memories have different page sizes and block sizes. In this embodiment, the memory management device 124 reads out the memory peculiarity information 141 from the NAND type flash main memory 126, and performs a process corresponding to the page size or block size indicated by the memory peculiarity information 141. In this way, it is possible to use various generations of NAND type flash memories as the NAND type flash main memory 126. In this embodiment, the memory management device 124 can read out the memory peculiarity information 141 including a page size or a block size from the NAND type flash main memory 126, and match the page size or block size of the NAND type flash main memory 126 with the cache line size of each processor.

In this embodiment, the memory management device 124 manages the life span of the NAND type flash main memory 126, and gives an alarm. In this way, it is possible to prevent the occurrence of defects.

In this embodiment, the memory management device 124 has an RAID function for a plurality of NAND type flash main memories 126. Therefore, it is possible to hot-swap the NAND type flash main memory 126 to be replaced. In this way, it is possible to easily replace an exhausted NAND type flash main memory 126.

Next, an example of the virtual memory access when a plurality of NAND type flash main memories are provided for a plurality of processors will be described.

FIG. 25 is a block diagram illustrating an example of a process of obtaining a pointer for a large address space.

A pointer 153 includes a pointer 153*a* for a small (narrow) address space and a pointer 153*b* for a small address space.

A segment table 154 is provided for each process ID 155, and includes a pointer 156 for a large (wide) address space.

A pointer 157 for a large address space is obtained by combining the pointer 153*b* for a small address space with the pointer 156 for a large address space on the segment table 154 that is specified by the pointer 153*a* for a small address space. A pointer 157 for a large address space may be obtained by combining the pointer 153*b* for a small address space, the pointer 153*a* for a small address space, and the pointer 156 for a large address space on the segment table 154.

Figure 26:
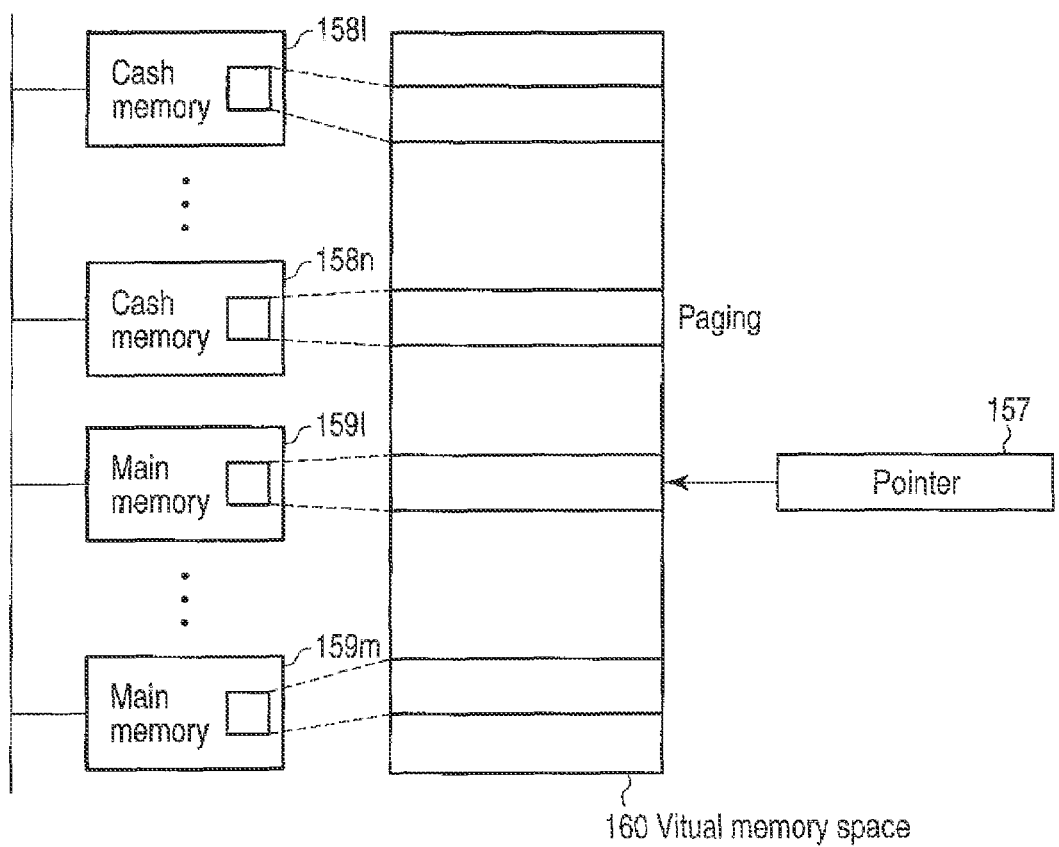
FIG. 26 is a block diagram illustrating an example of a virtual memory space formed between a plurality of cache memories and a plurality of NAND type flash main memories.

FIG. 26 is a block diagram illustrating an example of a virtual memory space formed between a plurality of cache memories and a plurality of NAND type flash main memories.

The pointer 157 for a large address space indicates any portion of a virtual memory space 160 formed by cache memories 1581 to 158n of a processor and a plurality of NAND type flash main memories 1591 to 159m.

In this way, it is possible to collectively deal with the cache memories 1581 to 158n of processors and the plurality of NAND type flash main memories 1591 to 159m.

The memory management devices of the above-described embodiments can use for both a write back type cache and write through type cache.

(Ninth Embodiment)

Described in this embodiment is a device for managing a access to a composite (hybrid) main memory which includes a plurality of types (kinds) of memories as a main memory. In this embodiment, the composite main memory includes a nonvolatile semiconductor memory.

FIG. 27 is a block diagram indicating an example of a configuration of a memory management device according to this embodiment.

FIG. 28 is a block diagram showing an example of a configuration of a processing unit in the memory management device according to this embodiment.

A memory management device 1 manages an access to a composite main memory 2 which is formed by a combination of a plurality of memories of different types. Here, the access means at least one of writing and reading in a memory device (storage).

Although processors 3a to 3c and the memory management device 1 are configured separately from each other in the example described in this embodiment, the memory management device 1 may be incorporated in at least one of the processors 3a to 3c.

The processors 3a to 3c include primary cache memories 4a to 4c and secondary cache memories 5a to 5c, respectively. The processors 3a to 3c execute processes 6a to 6c including virtual logical addresses, respectively. Although three processors 3a to 3c are shown in FIG. 27, the number of processors is one or more, and may be freely changeable.

The plurality of processors 3a to 3c are connected to the composite main memory 2 via a bus 7 and the memory management device 1.

While this embodiment is described below using the processor 3b, the same applies to the processors 3a, 3c.

In this embodiment, the processor 3b can access the primary cache memory 4b and the secondary cache memory 5b by using the logical address.

The composite main memory 2 includes a first memory, a second memory and a third memory. The first memory can be accessed more times than the second memory. The second memory can be accessed more times than the third memory.

In this embodiment, the first memory is a volatile semiconductor memory 8. For the volatile semiconductor memory 8, a memory used as a main memory in a general computer is used, such as a dynamic random access memory (DRAM), an FPM-DRAM, an EDO-DRAM or an SDRAM.

The second memory is a nonvolatile semiconductor memory 9. For the nonvolatile semiconductor memory 9, a single level cell (SLC) type NAND type flash memory, for example, is used. The SLC is higher in reading and writing speeds and higher in reliability than an MLC. However, the SLC is lower in the degree of element integration than the MLC and is not suited for increased capacity.

The third memory is a nonvolatile semiconductor memory 10. For the nonvolatile semiconductor memory 10, a multi-level cell (MLC) type NAND type flash memory, for example, is used. The MLC is lower in reading and writing speeds and lower in reliability than the SLC. However, the MLC is higher in the degree of element integration than the SLC and is suited for increased capacity.

In addition, the reliability means the degree of unlikelihood of a data loss in the case where data is read from a memory device.

The SLC is higher in durability than the MLC. Here, higher durability means a higher number of times of permitted access (a higher number of times of permitted access). And lower durability means a smaller number of times of permitted access.

The SLC can store M (an integral number equal to or more than 1) bits of information in one memory cell. The MLC can store M+1 or more bits of information in one memory cell.

That is, in the composite main memory 2 according to this embodiment, the volatile semiconductor memory 8, the nonvolatile semiconductor memory 9 and the nonvolatile semiconductor memory 10 are arranged in descending order of durability. The first memory is higher in durability than the second memory. The second memory is higher in durability than the third memory.

The nonvolatile semiconductor memories 9, 10 which are, for example, NAND type flash memories are less expensive and can have higher memory capacity than the volatile semiconductor memory 8.

Instead of the NAND type flash memory, a flash memory of a different type such as a NOR type flash memory, a phase change memory (PRAM) or a resistive random access memory (ReRAM) can be used.

If the use of the nonvolatile semiconductor memories 9, 10 as the main memory is compared with the use of the nonvolatile semiconductor memories 9, 10 as the secondary memories, the frequency of access to the nonvolatile semiconductor memories 9, 10 is higher when the nonvolatile semiconductor memories 9, 10 are used as the main memory. In this embodiment, the volatile semiconductor memory 8, the SLC nonvolatile semiconductor memory 9 and the MLC nonvolatile semiconductor memory 10 are combined together as the composite main memory 2 and an information processing device comprises the composite main memory 2. The composite main memory 2 is a main storage of a combination of different types. A position to store data in the composite main memory 2 is managed by the memory management device 1.

Memory usage information 11, memory peculiarity information 12, address conversion information 13 and a coloring table 14 are stored in at least one of the nonvolatile semiconductor memory 9 and the nonvolatile semiconductor memory 10. Here, the coloring table 14 is a table which includes data peculiarity information for each data as an entry.

The composite main memory 2 includes a plurality of memories of different kinds. At least one of the plurality of the memories is a nonvolatile memory. The first memory of the plurality of the memories has higher in durability than the second memory of the plurality of memories.

The memory management device 1 includes a processing unit 15, a work memory 16 and an information storage unit 17.

The processing unit 15 executes various kinds of processing using the work memory 16 on the basis of information stored in the information storage unit 17.

The work memory 16 is used as, for example, a buffer, and is used as a work area for, for example, various kinds of data conversions.

The processing unit 15 includes an accepting section 18, an address determining section 19, an address management section 20, a writing section 21, a relocating section 22, an address conversion section 23, a reading section 24 and a transfer section 25. The processing unit 15 may execute a program such as an operating system 27 to achieve functions corresponding to the sections 18 to 25.

In this embodiment, the operating system 27 controls the memory management device 1 which manages the writing and reading in the composite main memory 2.

At the start of the operation of the memory management device 1, the memory management device 1 reads the memory usage information 11, the memory peculiarity information 12, the address conversion information 13 and the coloring table 14 stored in at least one of the nonvolatile semiconductor memory 9 or the nonvolatile semiconductor memory 10, and then stores the memory usage information 11, the memory peculiarity information 12, the address conversion information 13 and the coloring table 14 in the information storage unit 17. For example, the processing unit 15 of the memory management device 1 or the accepting section 18 executes the processing of storing, into the information storage unit 17 at the start of operation, the memory usage information 11, the memory peculiarity information 12, the address conversion information 13 and the coloring table 14 stored in the nonvolatile semiconductor memory 9, 10.

The memory usage information 11 indicates how each area in the composite main memory 2 is used; for example, the number of times of access to each area in the composite main memory 2 (the number of times of reading and the number of times of writing), and information on the usage rate of the various memories included in the composite main memory 2 (the ratio of a free space).

The memory peculiarity information 12 indicates the characteristics of each area in the composite main memory 2; for example, the page size and block size of the composite main memory 2, and the number of times of permitted access (the number of times of permitted writing and the number of times of reading) to each area of the composite main memory 2.

The address conversion information 13 is, for example, information in which logical addresses are associated with corresponding physical addresses in the form of a table.

The coloring table 14 is, as described above, a table which includes the data peculiarity information for each data as the entry.

The data peculiarity information includes information peculiar to data, such as the number of times of access (the number of times of writing and the number of times of reading) with regard to an associated data.

The information storage unit 17 is a device for storing the memory usage information 11, the memory peculiarity information 12, the address conversion information 13 and the coloring table 14. For example, a register is used as the information storage unit 17. The information storage unit 17 may be divided into a plurality of registers.

The write operation performed by the processing unit 15 is described below.

When write target data from the processor 3b is written into the composite main memory 2, the accepting section 18 accepts a write destination logical address and the write target data from the processor 3b.

Furthermore, the accepting section 18 stores the write destination logical address and the write target data in the work memory 16.

On the basis of at least one of an importance and access frequency of the write target data, the address determining section 19 determines a write destination physical address corresponding to the write destination logical address so that the number of times of access to the volatile semiconductor memory 8 may be greater than the number of times of access to the nonvolatile semiconductor memory 9 and so that the number of times of access to the nonvolatile semiconductor memory 9 may be greater than the number of times of access to the nonvolatile semiconductor memory 10.

Here, the address determining section 19 determines the write destination physical address corresponding to the write destination logical address stored in the work memory 16 so that the access frequency may be equal in each of the memories 8, 9, 10.

Then, the address determining section 19 stores the write destination logical address in the work memory 16.

To explain more specifically, the address determining section 19 determines whether the write target data belongs to a high frequency group, a medium frequency group or a low frequency group in terms of the access frequency, on the basis of the memory usage information 11, the memory peculiarity information 12 and the data peculiarity information.

When determining that the write target data belongs to the high frequency group, the address determining section 19 determines an unused (free) physical address in the volatile semiconductor memory 8 as the write destination physical address. In this case, the address determining section 19 selects the unused physical address so that the access frequency is equal in the volatile semiconductor memory 8.

When the write target data belongs to the medium frequency group, the address determining section 19 determines an unused physical address in the nonvolatile semiconductor memory 9 as the write destination physical address. In this case, the address determining section 19 selects the unused physical address so that the access frequency is equal in the nonvolatile semiconductor memory 9.

When the write target data belongs to the low frequency group, the address determining section 19 determines an unused physical address in the nonvolatile semiconductor memory 10 as the write destination physical address. In this case, the address determining section 19 selects the unused physical address so that the access frequency is equal in the nonvolatile semiconductor memory 10.

At least one of the importance and access frequency of the write target data is obtained on the basis of access frequency information (read/write frequency information) which includes at least one of the type of the write target data, data set by an user, an out-of-use (unused) time from the last access time to the write target data to the present time, an access frequency estimated value which is determined by the type of the write target data, and an access frequency observed value of the write target data.

Furthermore, in this embodiment, the address determining section 19 changes threshold values which are used to determine whether to store the write target data in the volatile memory 8, the nonvolatile memory 9 or the nonvolatile memory 10, in accordance with a memory usage rate of the volatile memory 8, a memory usage rate of the nonvolatile memory 9 and a memory usage rate of the nonvolatile memory 10.

On the basis of information on an usage rate of the volatile semiconductor memory 8, information on an usage rate of the nonvolatile semiconductor memory 9 and information on an usage rate of the nonvolatile semiconductor memory 10 that are included in the memory usage information 11, the address determining section 19 changes the threshold values which are used to judge whether to store the write target data in the volatile semiconductor memory 8, the nonvolatile semiconductor memory 9 and the nonvolatile semiconductor memory 10.

For example, when the free (unused) space in the volatile memory 8 is more than the free spaces in the nonvolatile semiconductor memory 9, 10, an address is determined so that even the write target data belonging to the medium frequency group or the low frequency group may be stored in the volatile memory 8.

The address management section 20 stores, in the address conversion information 13 stored in the information storage unit 17, the write destination logical address acquired by the accepting section 18 and the write destination physical address determined by the address determining section 19 and stored in the work memory 16, in association with each other. The address conversion information 13 manages the relation between the logical address and the physical address in the form of, for example, a table.

The writing section 21 writes the write target data stored in the work memory 16 into the composite main memory 2 at a position indicated by the write destination physical address determined by the address determining section 19 and stored in the work memory 16.

For example, the writing section 21 converts the write target data into data based on a write unit (e.g., a page unit), and then stores the converted data into the work memory 16. The writing section 21 then stores the data based on the write unit stored in the work memory 16 into the composite main memory 2.

On the basis of at least one of the importance and access frequency of the write target data, the relocating section 22 determines a relocated (post-relocation) write destination physical address to relocate the write target data stored in a certain memory of the composite main memory 2 to another memory of the composite main memory 2, thereby relocating the write target data.

The relocating section 22 may be one function of the address determining section 19. Writing for relocation may be performed by the writing section 21.

When the relocation is performed by the relocating section 22, the address management section 20 updates, in accordance with the relocated write destination physical address, the memory usage information 11, the address conversion information 13, the data peculiarity information, etc. stored in the information storage unit 17. That is, the address management section 20 registers, in the address conversion information 13, the write destination logical address for the write target data and the relocated write destination physical address in relation to each other. Further, the address management section 20 updates, for example, the number of times of writing and the write frequency so that the memory usage information 11 and the data peculiarity information may represent the state after the relocation.

This relocation is effective when the importance or access frequency of the write target data is variable (dynamic) with the passage of time.

For example, suppose that the write target data is written into the nonvolatile semiconductor memory 9 of the SLC by the address determining section 19 and the writing section 21 on the basis of static information which can be obtained before writing of the data, such as the type (classification) of the write target data or the estimated value of the access frequency. Then, when at least one of the importance and access frequency of the write target data is beyond a certain level and higher than that in the previous writing, the relocating section 22 changes the storage destination of the write target data from the SLC nonvolatile semiconductor memory 9 to the volatile semiconductor memory 8 on the basis of dynamic information which changes with the passage of time after writing, such as the observed value of the access frequency of the write target data. On the basis of the dynamic information, the relocating section 22 changes the storage destination of the write target data from the SLC nonvolatile semiconductor memory 9 to the MLC nonvolatile semiconductor memory 10 when at least one of the importance and access frequency of the write target data is below a certain level and lower than that in the previous writing.

Similarly, the relocating section 22 may relocate, in the nonvolatile semiconductor memory 9 or the nonvolatile semiconductor memory 10 on the basis of the dynamic information, the write target data which is stored in the volatile semiconductor memory 8 on the basis of the static information or the dynamic information.

The relocating section 22 may relocate, to the volatile semiconductor memory 8 or the nonvolatile semiconductor memory 9 on the basis of the dynamic information, the write target data which is stored in the nonvolatile semiconductor memory 10 on the basis of the static information or the dynamic information.

The relocating section 22 may move the storage position of the write target data within the areas in each of the volatile semiconductor memory 8 and the nonvolatile semiconductor memories 9, 10.

The relocating section 22 may perform the above-described relocation processing, for example, every time a predetermined period of time passes. For example, the relocating section 22 may perform the above-described relocation processing when storage capacity has exceeded a threshold value in any area in the volatile semiconductor memory 8 and the nonvolatile semiconductor memories 9, 10.

A read operation performed by the processing unit 15 is described below.

When the processor 3b reads data from the composite main memory 2, the accepting section 18 accepts a read destination logical address from the processor 3b, and stores the read destination logical address in the work memory 16.

On the basis of the address conversion information 13 stored in the information storage unit 17, the address conversion section 23 converts the read destination logical address stored in the work memory 16 into a read destination physical address, and stores this read destination physical address in the work memory 16.

The reading section 24 reads data based on a read unit (e.g., a page unit) corresponding to the read destination physical address stored in the work memory 16 from the composite main memory 2, and stores the data in the work memory 16.

The transfer section 25 extracts read target data (e.g., data in a byte unit) in a part corresponding to the read destination physical address of the data based on the read unit which has been read from the composite main memory 2 and which has been stored in the work memory 16. The transfer section 25 sends the extracted read target data to the processor 3b.

In this embodiment, the unit of writing or reading data in the composite main memory 2 may be the page size, an integral multiple of (two or more times) the page size, the block size, or an integral multiple of (two or more times) the block size.

In addition, the transfer section 25 may transmit the data based on the read unit to the processor 3b, and the processor 3b may store the data based on the read unit in the primary cache memory 4b or the secondary cache memory 5b.

That is, in this embodiment, the unit of writing or reading in the primary cache memory 4b or the secondary cache memory 5b may also be the page size, an integral multiple of (two or more times) the page size, the block size, or an integral multiple of (two or more times) the block size.

Figure 29:
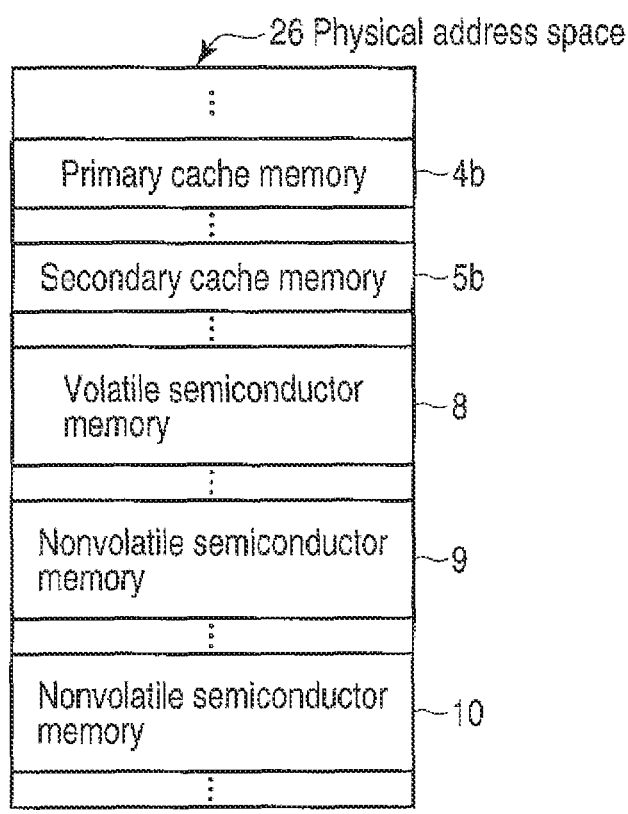
FIG. 29 is a block diagram showing an example of a physical address space obtained by the memory management device according to the ninth embodiment.

FIG. 29 is a block diagram indicating an example of a physical address space obtained by the memory management device 1 according to this embodiment.

The memory management device 1 according to this embodiment forms a physical address space 26 which includes the various cache memories 4a to 4c, 5a to 5c, the volatile semiconductor memory 8 and the nonvolatile semiconductor memories 9, 10. The memory management device 1 performs address management including, for example, address determination on the physical address space 26. Thus, the cache memories 4a to 4c, 5a to 5c, the volatile semiconductor memory 8 and the nonvolatile semiconductor memories 9, 10 can be treated in a flat memory hierarchy.

FIG. 30 is a block diagram indicating an example of an operation of the operating system 27 according to this embodiment.

In this embodiment, the operating system 27 selects one of the memories in the composite main memory 2 to store data.

In a process, when there are data writing into an area requested during process generation, data writing into a file map area, and data writing into an area dynamically required by the process, or when there is data writing into a parameter area used in a kernel, a threshold value for selecting a memory is obtained by the operating system 27 on the basis of the importance set for these data writings, the access frequency, and the remaining capacity of a usable area in each memory. Then, by comparing an evaluation value (coloring level) of the data writing obtained on the basis of at least one of the importance and access frequency of the data with the determined memory selection threshold value, the operating system 27 determines whether to locate the data in the volatile semiconductor memory, the nonvolatile semiconductor memory (SLC) or the nonvolatile semiconductor memory (MLC) included in the composite main memory 2.

For example, the importance of the data is determined by the static information, and the access frequency of the data is determined by the static information and the dynamic information. The coloring level is obtained on the basis of at least one of the static information and the dynamic information.

In this embodiment, the composite main memory 2 including different types of memories is effectively used in terms of durability. That is, in this embodiment, the location of data is determined on the basis of the durability of each memory to maximize the life of the composite main memory 2.

Furthermore, in this embodiment, the composite main memory 2 including different types of memories is effectively used in terms of reliability. In this embodiment, the location of data is determined on the basis of the reliability of each memory to avoid a crucial data loss in the composite main memory 2.

As described above, the operating system 27 calculates the coloring level (evaluation value) on the basis of information including, for example, the access frequency of the write target data and the importance of the data, thereby obtaining the coloring level.

Then, on the basis of information including, for example, the remaining capacity of the usable area in each memory and information such as the coloring level, the operating system 27 determines a position in the volatile semiconductor memory 8, the nonvolatile semiconductor memory 9, or the nonvolatile semiconductor memory 10 to store the write target data.

Thus, in this embodiment, the importance and the access frequency are generated and interpreted by the operating system 27, and the coloring level obtained as a result of this interpretation is saved. In the calculation of the coloring level, which information to use depends on the installations in the information processing device; for example, whether to use data set by an user or the result of interpretation by the operating system 27.

The operating system 27 optimizes an MMU replacement algorithm. Moreover, to all the data, the operating system 27 adds the data peculiarity information including the access frequencies of the data.

As indices for the evaluation of the importance of the data, the differentiation of executable files, the differentiation of media files and information on the positions of files are used.

Whether a file is executable can be judged by the permission to execute the file. For example, a high importance is set for an executable file.

Whether a file is a media file can be judged by the extension of the file. For example, a low importance is set for a media file.

The information on the position of a file is used to judge whether the file is located in, for example, the mailbox or trash box in the information processing device. For example, a low importance is set for a file in the mailbox or a file in the trash box.

Furthermore, as the index for the evaluation of the importance of data, information designated by the user, for example, is used. For example, a shadow file whose extension has been changed is used as a file including the index for the evaluation of the importance of the data. The setting of the importance designated by the user is written in this shadow file. The relation between a characteristic and importance of the data is described in the shadow file; for example, the relation between data identification information and the importance, the relation between a folder position and the importance, and the relation between the classification (type) and importance of the data. The operating system 27 determines the importance of the write target data on the basis of the information in the shadow file, identification information for the write target data, the folder position of the write target data, and the classification of the write target data.

Moreover, as the index for the evaluation of the importance of the data, the interval (out-of-use time of the data) between the last access time and the current time, for example, may be used. For example, the importance decreases in proportion to the length of the out-of-use time of the data.

As the indices for the evaluation of access frequency of the data, the type (format) of a file, an access pattern, a segment of an ELF format, data set by the user, and an actually measured value of the access frequency, for example, are used.

For example, when a type of file is a media file, the write frequency for this data is estimated to be low.

For example, the access frequency is changed in accordance with whether the access pattern is a permission designated by a system call or the permission of the file.

For example, the write frequency of an ELF-format segment in a read-only section is estimated to be low. Moreover, the write frequency is estimated to be high in a segment of a text section or a readable/writable section.

For example, when a plurality of evaluation indices representing the access frequencies show different values, the evaluation index representing high access frequency may be preferentially used.

In this embodiment, a coloring level CL is defined as in (1) and (2) below. It is to be noted that this is merely one example of the calculation of the coloring level CL and can be freely changed.

$$CL = \min(9, (\text{importance} \times W + \text{access frequency} \times (1-W))) \qquad (1)$$

$$0 \leq W \leq 1: \text{correction value for weighting importance and access frequency} \qquad (2)$$

In this case, CL is within the range of $0 \leq CL \leq 9$.

For the parameter area used in the kernel, the importance is 9 (fixed value).

For the area requested during process generation, the importance is 9 (fixed value).

For the area dynamically requested by the process, the importance is 5 (fixed value).

For the area used by the process to map a file in the composite main memory 2, the importance is obtained by Equations (3), (4).

$$\text{Importance} = \min(9, \max(\text{static importance}, \text{importance designated by user})) \quad (3)$$

$$0 \leq \text{static importance} \leq 9 \quad (4)$$

The access frequency is obtained by Equations (5) to (8).

$$\text{Access frequency} = \text{static access frequency} \times T \quad (5)$$

$$\text{Static access frequency} = \max(\text{access frequency designated by user}, \text{access frequency designated by OS}) \quad (6)$$

$$T = \max(0, -(\text{access time interval}/\text{maximum access time interval}) + 1) \quad (7)$$

$$0 \leq T \leq 1 \quad (8)$$

Here, the static importance is a value experientially judged on the basis of the type of data. A time correction value T is experientially set in accordance with the unused (out-of-use) time of the data. For example, the time correction value T is a value that is smaller when the unused time of the data is longer.

The maximum access time interval is an experientially defined value. The access time interval is an actually measured value.

The importance obtained by Equation (3) is:

$$0 \leq \text{importance} \leq 9.$$

FIG. 31 is a table showing an example of the calculation of the dynamic importance with regard to the area used by the process to map a file in the composite main memory 2.

When the access time interval (for example, the number of an unused month) is 0, 1, ..., 10, the time correction value T is set at 1, 0.9, ..., 0, respectively.

In FIG. 31, when the type of the data is the executable file, the media file or the trash box file, the static importance of the data is 9, 4, 2, respectively.

For example, when the type of the data is the executable file and when the access time interval is 0 (less than one month), the dynamic importance of the data is 9 (decimals are omitted). In other cases as well, the dynamic importance is determined on the basis of the relation in FIG. 31.

For the parameter area used in the kernel, the access frequency is 9 (fixed value).

For the area used by the process, the access frequency is determined on the basis of the access pattern. For example, when the pattern of accessing the data only includes reading, the access frequency is 3. For example, when there is a possibility that the data has been written, the access frequency is 5.

A specific example of the selection of a memory is described below.

The threshold value used to select one of the volatile semiconductor memory 8, the nonvolatile semiconductor memory (SLC) 9 and the nonvolatile semiconductor memory (MLC) 10 included in the composite main memory 2 to store data is determined on the basis of a remaining capacity of the usable area or usage rate in each memory. A write destination memory is selected in accordance with whether the coloring level is lower or higher than the determined threshold value.

FIG. 32 is a table showing one example of a relation between the usage rate of the memory and the threshold value according to this embodiment.

A threshold value ONRAM is a threshold value for judging whether to locate data in the volatile semiconductor memory 8. In this embodiment, data whose coloring level is equal to or more than the threshold value ONRAM is stored in the volatile semiconductor memory 8.

The threshold value ONRAM is calculated by Equation (9), and decimals are omitted.

$$ONRAM = \min(9, (9 \times (\text{usage rate of memory}(\%)/100) + 6)) \quad (9)$$

In FIG. 32, the threshold value ONRAM is within the range of $6 \leq ONRAM \leq 9$. When the usage rate of the volatile semiconductor memory 8 is higher, the threshold value ONRAM is greater, and the volatile semiconductor memory 8 is more difficult to select as a write destination.

A threshold value ONSLC is a threshold value for judging whether to locate data in the nonvolatile semiconductor memory (SLC) 9. In this embodiment, data having a coloring level equal to or more than the threshold value ONSLC and less than the threshold value ONRAM is located in the nonvolatile semiconductor memory 9.

The threshold value ONSLC is calculated by Equation (10), and decimals are omitted.

$$ONSLC = \min(5, (9 \times (\text{usage rate of memory}(\%)/100) + 3)) \quad (10)$$

In FIG. 32, the threshold value ONSLC is within the range of $3 \leq ONSLC \leq 5$. When the usage rate of the nonvolatile semiconductor memory 9 is higher, the threshold value ONSLC is greater, and the nonvolatile semiconductor memory 9 is more difficult to select as a write destination.

Then, when a coloring level of data is below the threshold value ONSLC and the data is not located in either the volatile semiconductor memory 8 or the nonvolatile semiconductor memory 9, the data is located in the nonvolatile semiconductor memory (MLC) 10.

In FIG. 32, when the usage rate of the volatile semiconductor memory 8 is 20% and the usage rate of the nonvolatile semiconductor memory 9 is 20%, the threshold value ONRAM is 7, and the threshold value ONSLC is 4. In this case, data whose coloring level is $7 \leq CL \leq 10$ is stored in the volatile semiconductor memory 8. Data whose coloring level is $4 \leq CL < 7$ is stored in the nonvolatile semiconductor memory 9. Data whose coloring level is $0 \leq CL < 4$ is stored in the nonvolatile semiconductor memory 10. The same holds true with other cases.

Figure 33:
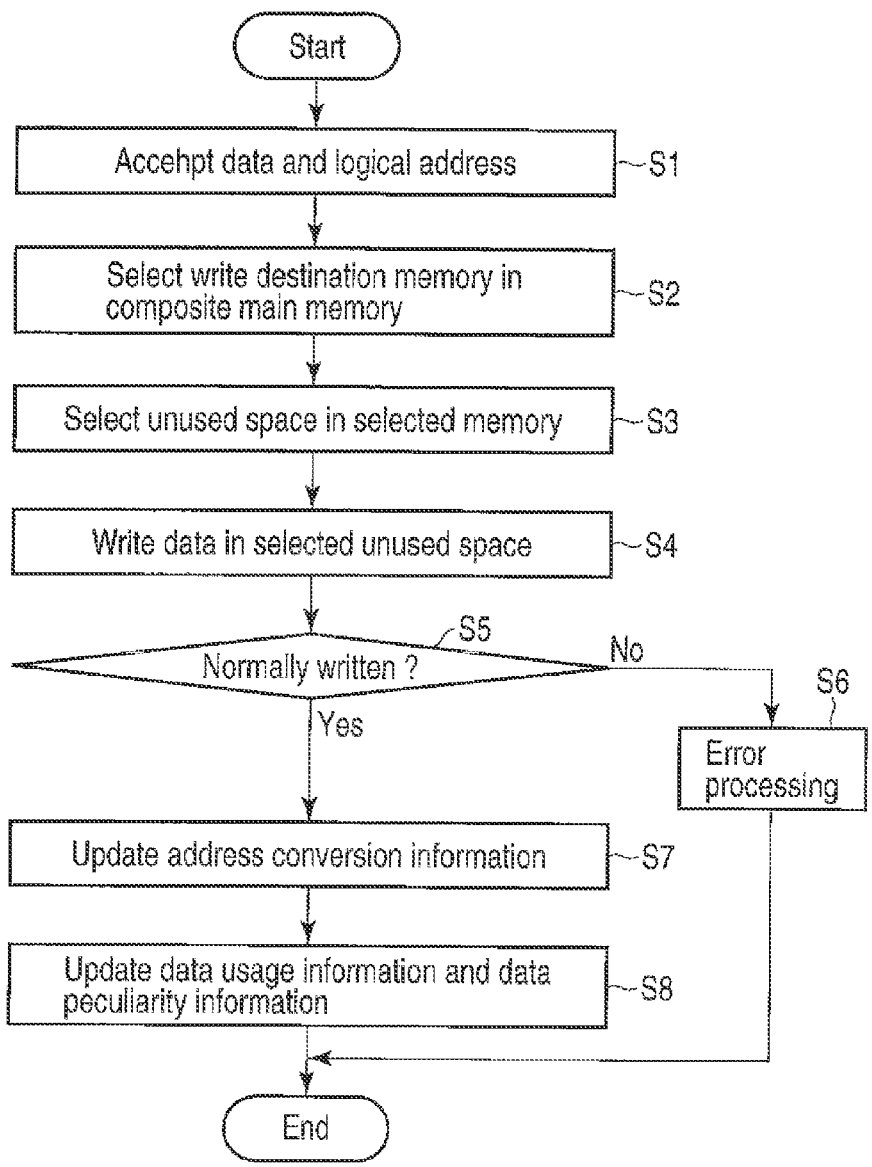
FIG. 33 is a flowchart showing an example of an operation of writing data into a composite main memory by the memory management device according to the ninth embodiment.

FIG. 33 is a flowchart showing an example of an operation of writing data into the composite main memory 2 by the memory management device 1 according to this embodiment.

In step S1, the memory management device 1 accepts data and a logical address.

In step S2, the memory management device 1 refers to the memory usage information 11, the memory peculiarity information 12 and the data peculiarity information in the coloring table 14, and selects a memory in the composite main memory 2 to serve as a write destination.

In step S3, the memory management device 1 selects a free space in the selected memory.

In step S4, the memory management device 1 writes the data in the selected free space.

In step S5, the memory management device 1 judges whether writing has been normally finished.

When the writing has not been normally finished, the memory management device 1 executes error processing in step S6 to finish the write processing.

When the writing has been normally finished, the memory management device 1 updates the address conversion information 13 on the basis of the accepted logical address and a physical address corresponding to the selected free space.

In step S8, the memory management device 1 updates the number of times of writing of the memory in the memory usage information 11, the number of times of writing of the data peculiarity information stored in the coloring table 14, and the number of times of writing of the data peculiarity information attached to the write target data.

Figure 34:
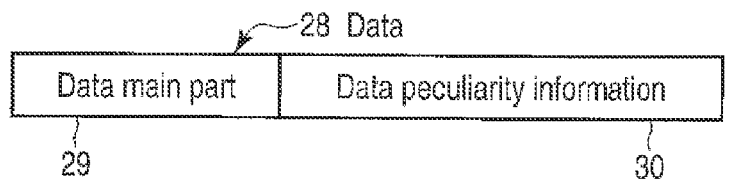
FIG. 34 is a diagram showing an example of a structure of write target data and read target data according to the ninth embodiment.

FIG. 34 is a diagram showing an example of structures of the write target data and the read target data according to this embodiment.

Data 28 has a structure in which a data main part 29 is combined with data peculiarity information 30 including the write and read frequencies of this data and others.

The coloring table 14 is generated on the basis of the data peculiarity information 30 attached to each data.

Figure 35:
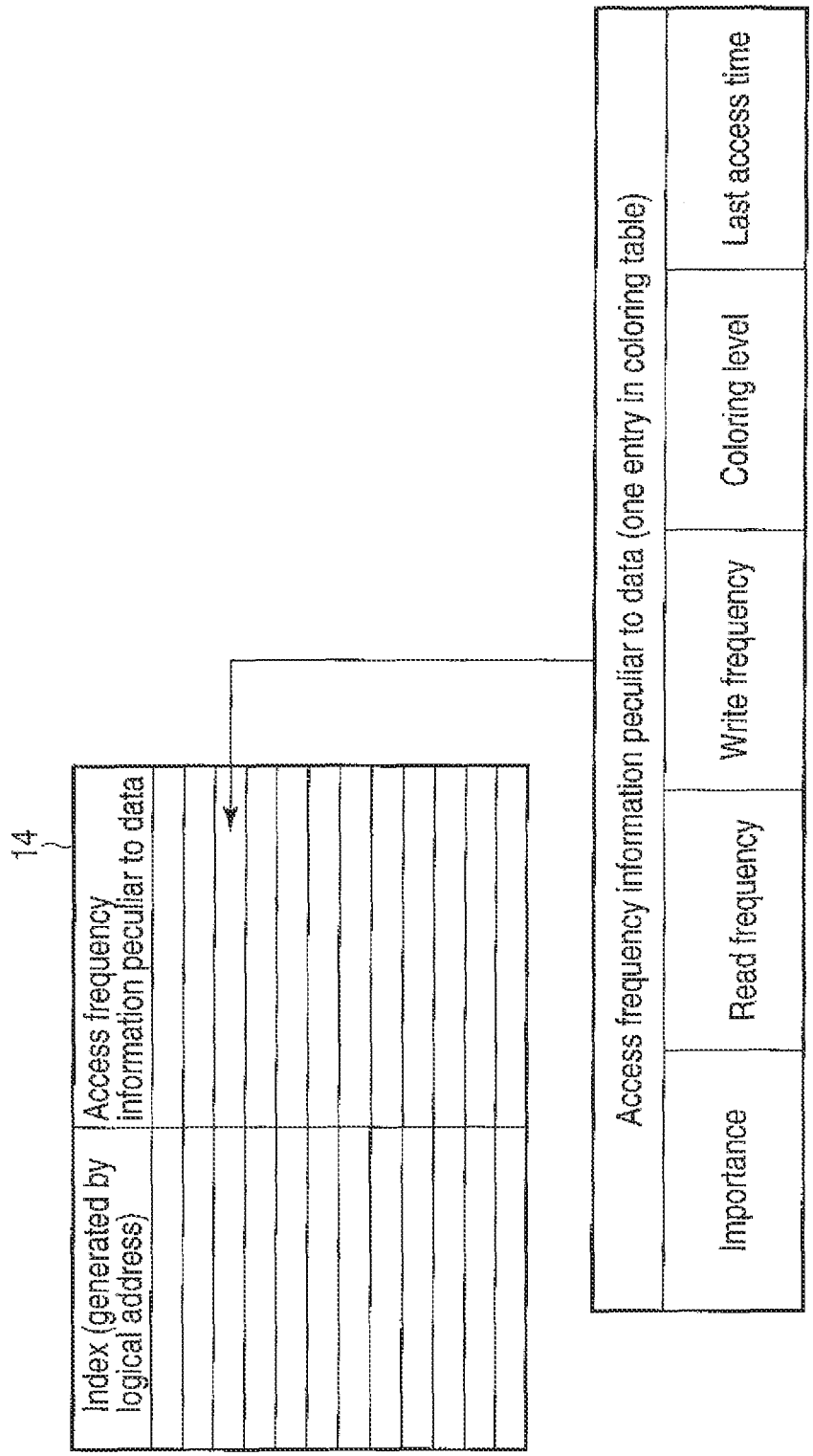
FIG. 35 is a diagram showing an example of a coloring table 14 according to the ninth embodiment.

FIG. 35 is a diagram showing an example of the coloring table 14.

Each entry in the coloring table 14 is allocated to the minimum 10 unit of the data.

The write frequency, read frequency and importance in the entry are values estimated (predicted) by the operating system 27 or the user.

When the write frequency, read frequency and importance are estimated by the operating system 27, the operating system 27 refers to the extension or permission of the data to determine the write frequency, read frequency and importance.

When the write frequency, read frequency and importance are set by the user, a graphical user interface (GUI) or configuration exclusive to this setting may be prepared.

The write frequency corresponds to SW_Color according to a tenth embodiment described below.

The importance and the read frequency in this embodiment corresponds to SR_Color according to the tenth embodiment described below.

The write frequency, read frequency and importance are written by the operating system 27 at the time of data generation.

The last access time in the entry is information on the time at which the corresponding data is accessed last. The difference between the last access time and a current time is the access time interval in Equation (7).

The coloring level in the entry is calculated by, for example, Equation (1).

The coloring level and the last access time in the coloring table 14 are updated by the memory management device 1 in step S8 in FIG. 33.

Figure 36:
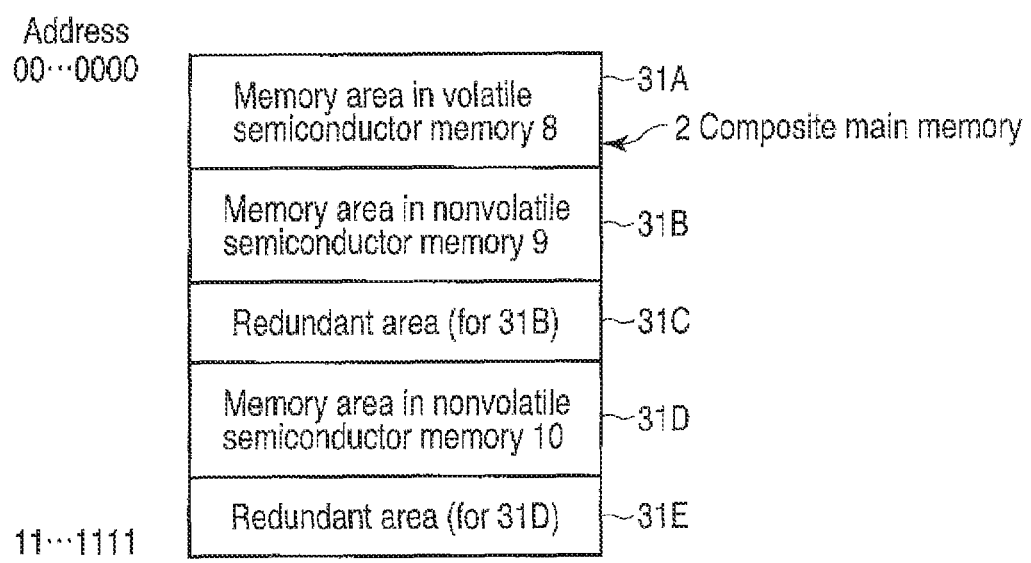
FIG. 36 is a diagram showing an example of an address map of the composite main memory according to the ninth embodiment.

FIG. 36 is a diagram showing one example of an address map in the composite main memory 2 according to this embodiment.

The composite main memory 2 includes a memory area 31A in the volatile semiconductor memory 8, a memory area 31B in the nonvolatile semiconductor memory 9, a redundant block area 31C for the nonvolatile semiconductor memory 9, a memory area 31D in the nonvolatile semiconductor memory 10, and a redundant block area 31E for the nonvolatile semiconductor memory 10.

Whether to select the memory area 31A, the memory area 31B or the memory area 31D at the time of writing the data is determined on the basis of the coloring level and the threshold values as described above.

For example, writing in the form of additional recording is used to store data in a certain position within each of the memory area 31B and the memory area 31D.

In the additional-recording writing, the storage position is sequentially changed within each of the memory areas 31B, 31D to write data. Such additional-recording writing makes it possible to equalize the access frequency in each of the memory areas 31B, 31D.

In the present embodiment, if the memory area 31B or memory area 31D is selected as the write destination for the data, the address determining section 19 sequentially generates a write destination physical address in the memory area 31B or memory area 31D. The writing section 21 writes the data on the basis of the sequentially generated physical address.

When the additional-recording writing advances in the memory area 31B or memory area 31D to some degree, a garbage collection is performed.

There are some examples of the garbage collection as follows: the current memory areas 31B, 31D are searched, and a plurality of entries that can be combined together are united; when effective data and erased data are mixed in the memory areas 31B, 31D, the effective data are only collected and relocated; data having low access frequency and data of less importance is moved to other memory to increase a free area.

When the garbage collection is performed for the memory area 31B, the redundant area 31C is used. When the garbage collection is performed in the memory area 31D, the redundant area 31E is used.

The garbage collection is performed by, for example, the relocating section 22. Writing for the garbage collection may be performed by the writing section 21.

If the garbage collection is performed by the relocating section 22, the address management section 20 updates, by a write destination physical address after the garbage collection, the memory usage information 11, the address conversion information 13 and the data peculiarity information and others.

In this embodiment described above, it is possible to effectively use, as the main memory, the nonvolatile semiconductor memory limited in the number of times of writing or reading.

In this embodiment, the memory management device 1 and the operating system 27 cooperate to generate access frequency information peculiar to data, and the memory management device 1 can execute an optimum writing processing on the basis of the access frequency information.

Consequently, excessive deterioration of the data stored in the nonvolatile semiconductor memories 9, 10 in the composite main memory 2 can be prevented, so that it is possible to obtain a high-speed and inexpensive information processing device using the nonvolatile semiconductor memories 9, 10.

(Tenth Embodiment)

In this embodiment, details of the memory management device 1 and the composite main memory 2 which have been explained in the previous ninth embodiment are described.

The operating system 27 according to this embodiment generates access frequency information (read/write frequency information) peculiar to data. The memory management device 1 determines a write destination for the data using the access frequency information peculiar to the data. Moreover, the memory management device 1 performs optimum wear-leveling on the basis of access information peculiar to the data, the memory usage information and the memory peculiarity information. While the coloring level is used to determine a memory area in the previous ninth embodiment, the values SW_Color, SR_Color indicating access frequencies estimated from the data are used to determine a memory area in this embodiment.

A NAND type flash memory is not capable of overwrite operation. Therefore, when new data is written into a block in a NAND type flash memory having no effective data, the data is written after data in the block is erased. If data is repeatedly erased in the block, the block deteriorates, and writing of data becomes difficult. Thus, if writing of data concentrates on a particular block alone, there occurs a phenomenon in which writing is not enabled in part of an area alone. In order to avoid this, the memory management device 1 has a wear-leveling function. For example, this wear-leveling function is adapted to periodically replace data in accordance with the number of times of erasure in the block.

Conventionally, a nonvolatile semiconductor memory has been used as a secondary memory device. Thus, when accessing the secondary memory device, an MPU has to transfer data via an I/O interface.

On the contrary, in this embodiment, the nonvolatile semiconductor memories 9, 10 are arranged in a main memory area. The memory management device 1 has a configuration whereby the operating system 27 can access the nonvolatile semiconductor memories 9, 10 on the same level as the volatile semiconductor memory 8. As a result, there is no need to transfer data between the MPU and the nonvolatile semiconductor memories 9, via the I/O interface, thereby enabling high-speed access to the nonvolatile semiconductor memories 9, 10.

Furthermore, in this embodiment, there is no need to comprise an expensive DRAM equal in capacity to an inexpensive flash memory as in the case of a conventional mobile device, so that it is possible to provide an inexpensive system.

When a system is designed so that the operating system 27 can access the nonvolatile semiconductor memory on the same level as the main memory, the number of times of writing into the nonvolatile semiconductor memory is greater than in the conventional system in which the nonvolatile semiconductor memory is used as the secondary memory device.

When the nonvolatile semiconductor memory is a NAND type flash memory, there is a need for a method that avoids excessive writing and that prolongs the life of the system.

In this embodiment, the writing method is improved so that the nonvolatile semiconductor memories 9, 10 limited in the number of times of writing can be used as the main memory. In the present embodiment, the access frequency information peculiar to data is used to predict the frequency of data writing. Data having a high access frequency is located in the DRAM or the SLC area having high durability to protect the memory area in the information processing device. The access frequency information peculiar to data is applied to wear-leveling. For example, movement of data by the wear-leveling is controlled on the basis of the access frequency information peculiar to data.

As shown in FIG. 27, the memory management device (flat memory management device) 1 is provided between the composite main memory 2 and the logical address bus 7 to which the processors 3a to 3c that are MPUs (graphic IPs also suffice) are connected. The memory management device 1 manages the composite main memory 2. Although two MPUs and one GPU are connected to the common logical bus 7 in the example shown in FIG. 27, the same effects can be obtained if this embodiment is applied to a device equipped with a single processor.

The memory management device 1 includes the processing unit 15 such as an MPU for memory management, the work memory 16 used by the processing unit 15, and the information storage unit 17 for storing, for example, information to determine the method of writing into the nonvolatile semiconductor memories 9, 10.

The memory management device 1 may include, independently of the information storage unit 17, a coloring table register which indicates a base address of the coloring table for holding the access frequency information peculiar to each data to be written into the nonvolatile semiconductor memories 9, 10.

The composite main memory 2 connected to the memory management device 1 includes the volatile semiconductor memory 8 which is, for example, a DRAM, and the nonvolatile semiconductor memories 9, 10.

Although NAND type flash memories, for example, are used as the nonvolatile semiconductor memories 9, 10, other file memories may be used, such as PRAMs or ReRAMs.

The memory usage information 11, the memory peculiarity information 12, the address conversion information (page table) 13, and the coloring table (table for holding access information peculiar to each data) 14 are stored at predetermined addresses in at least one of the memory spaces in the nonvolatile semiconductor memories 9, 10. The memory usage information 11, the memory peculiarity information 12 and the address conversion information 13 are copied from at least one of the areas in the nonvolatile semiconductor memories 9, 10 to the information storage unit 17 after the system has been powered on. The information storage unit 17 is preferably configured by an SRAM on a chip of the memory management device 1 in order to perform high-speed address conversion. Moreover, the base address (logical address) of the coloring table 14 is set in the information storage unit 17 or the coloring table register that is included in the memory management device 1 after the system has been powered on.

The address conversion information 13 is a table in which physical map information (a chip address, a block address, a page address) of the composite main memory 2 is associated with the logical address.

Mapping data for the memory areas of the nonvolatile semiconductor memories held by the address conversion information 13 includes, in addition to information which associates between a logical address and an address of the composite main memory 2, flag information indicating whether each page or block is in a writable state, and flag information indicating whether each page data is the latest and valid data or whether each page data has already been updated to another page and is thus invalid.

FIG. 37 is a diagram showing one example of a memory map for the composite main memory 2 according to this embodiment.

The memory peculiarity information 12 includes: 1) the size of a DRAM space in the memory space of the composite main memory 2; 2) the sizes of the nonvolatile semiconductor memories 9, 10 in the memory space of the composite main memory 2; 3) the size of a block in the NAND type flash memory constituting the memory space of the composite main memory 2, and the size of a page; 4) information (including the upper limit number of times of erasure and the upper limit number of times of reading) on the memory space allocated as an SLC area (binary area) in the nonvolatile semiconductor memory 9; 5) information (including the upper limit number of times of erasure and the upper limit number of times of reading) on the memory space allocated to a multivalued area of a 2 bit/cell; 6) information (including the upper limit number of times of erasure and the upper limit number of times of reading) on the memory space allocated to a multivalued area of a 3 bit/cell; and 7) information (including the upper limit number of times of erasure and the upper limit number of times of reading) on the memory space allocated to a multivalued area of a 4 bit/cell.

In response to a data write instruction from the operating system 27, the memory management device 1 refers to the memory peculiarity information 12 and the coloring table 14 to determine a memory space (SLC area (binary area), the multivalued area of the 2 bit/cell, the multivalued area of the 3 bit/cell, or the multivalued area of the 4 bit/cell) to write data. Further, the memory management device 1 refers to the memory usage information 11 and the access frequency information peculiar to data to determine a physical address in a determined memory space to write the data.

Furthermore, when data is read by the operating system 27, the memory management device 1 refers to the coloring table 14 to determine a reading method.

The memory usage information 11 indicates how many times data has been erased in each block in the memory areas of the nonvolatile semiconductor memories 9, 10 and how many times data has been read. Whenever data is erased in each block, the number of times of erasure (the number of times of rewriting) in each block in the memory usage information 11 is incremented. Moreover, whenever each page is read, the number of times of reading the page in the memory usage information 11 is incremented.

FIG. 38 is a diagram showing one example of the coloring table 14.

The coloring table 14 is a table for holding access frequency information peculiar to each data.

The coloring table 14 is used, when given data is generated, to associate a logical address space where the data is mapped with the access frequency information peculiar to the data.

Each entry in the coloring table 14 corresponds to the minimum reading/writing size of data (e.g., the page size of the NAND type flash memory). Each entry includes SW_Color which is a value indicating the access frequency estimated from data, SR_Color which is a value indicating the read frequency estimated from the data, the life of the data estimated from the data, the time at which the data is generated, the number of times of writing the data, and the number of times of reading the data.

Figure 39:
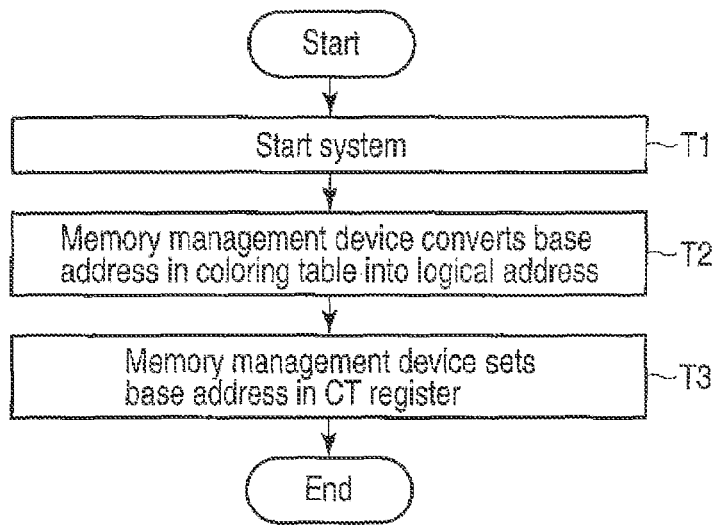
FIG. 39 is a flowchart showing an example of processing for generating the coloring table.

FIG. 39 is a flowchart showing one example of processing for generating the coloring table 14.

The coloring table 14 is located in a given area on the nonvolatile semiconductor memories 9, 10. The address at which the coloring table 14 is located may be determined depending on the installations in the memory management device 1.

In step T1, the memory management device 1 is powered on and started.

In step T2, the memory management device 1 converts the base address of the coloring table 14 into a logical address, and generates an index for each data.

In step T3, the memory management device 1 sets the base address of the coloring table 14 in the information storage unit 17 or the coloring table register.

The operating system 27 and the memory management device 1 refers to the coloring table 14 via the information storage unit 17 or the coloring table register.

Figure 40:
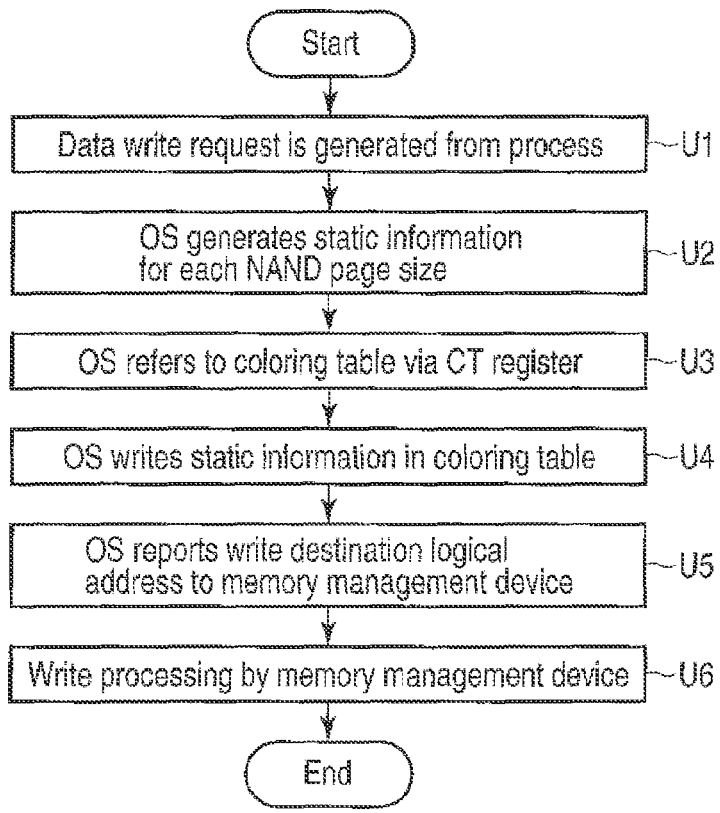
FIG. 40 is a flowchart showing an example of processing for generating entries of the coloring table performed by the operating system.

FIG. 40 is a flowchart showing one example of the processing for generating the entries in the coloring table 14 performed by the operating system 27. FIG. 40 shows the operation in which, when a processor 6*b* generates given data, the operating system 27 sets the data in the entry of the coloring table 14. When new data is written into the nonvolatile semiconductor memories 9, 10, the operating system 27 writes, into the entries of the coloring table 14, the values SW_Color and SR_Color of the access frequency information peculiar to the data, the life of the data and the time of the generation of the data.

Regarding the SW_Color and SR_Color, the operating system 27 predicts the write frequency and read frequency of the data to set the values SW_Color and SR_Color. Higher values are set for the SW_Color and SR_Color when a higher write frequency and a higher read frequency are predicted. For the life of the data, how long the data is present on the composite main memory 2 is predicted, and the life of the data is set on the basis of this prediction. These values may be statically designated by a source code of a program generating the data. These values may be written into the coloring table 14 by the operating system 27. Alternatively, the operating system 27 may refer to, for example, the extension of a file or a file header to predict these values.

In step U1, the given process 6*b* generates a data write request.

In step U2, the operating system 27 generates static information for each of the page sizes of the nonvolatile semiconductor memories 9, 10.

In step U3, the operating system 27 refers to the coloring table 14 on the basis of the contents stored in the information storage unit 17 or the coloring table register.

In step U4, the operating system 27 writes the static information into the coloring table 14.

In step U5, the operating system 27 reports a write destination logical address to the memory management device 1.

In step U6, the memory management device 1 executes write processing.

The ranges of the SW_Color and SR_Color, the later-described pattern of the frequency prediction by the operating system 27, and the operation of the memory management device 1 for determining a memory area by use of the SW_Color and SR_Color are illustrative only. A person who installs the system may be able to suitably tune the operation of the memory management device 1.

Here, how the SW_Color, the SR_Color and the data life are determined to given data by the operating system 27 is described.

FIG. 41 is a table showing a first example of how to set the SW_Color, the SR_Color and the data life to various kinds of data.

FIG. 42 is a table showing a second example of how to set the SW_Color, the SR_Color and the data life to various kinds of data.

Reading is performed in many cases and writing is less likely to be performed in a text area of the kernel. The operating system 27 sets the SW_Color at 5 and the SR_Color at 1 in the text area where the operating system 27 itself operates. Moreover, the operating system 27 predicts that the data life in the text area of the kernel is long.

On the other hand, both the read and write frequencies are high in a data area of the kernel. Thus, the operating system 27 sets the SW_Color at 5 and the SR_Color at 5 in the data area of the kernel.

In a data area dynamically secured by the kernel, unnecessary data is deleted, and the data life is therefore short.

The read frequency of a text area of a user program is lower than the read frequency of the kernel which is frequently called from all the processes. However, the read frequency of the text area of the user program is high as in the kernel when the process is active. Thus, the SW_Color is set at 1 and the SR_Color is set at 4 in the text area of the user program. In the text area of the user program, the data life remains until the user program is uninstalled, and is therefore long in general. Consequently, a long data life is set in the text area of the user program.

There are roughly two kinds of areas that are dynamically secured by a program. One is data (including a stack area)

which is discarded simultaneously with the end of the execution of the program. The life of such data is short, the read and write frequencies thereof are high. Therefore, for the data which is discarded simultaneously with the end of the execution of the program, the SR_Color is set at 4, and the SW_Color is set at 4. Another area that is dynamically secured by the program is an area generated by the program for a new file. The life of the data generated by the program is long, and the read and write frequencies depend on the type (classification) of the file to be generated.

A long life is set for the data treated as a file referred to by the process.

Reading of a system file whose extension is represented by, for example, SYS, dll or DRV is described. Data having such an extension is a file which is read when the operating system performs various kinds of processing. The operating system, if installed on the composite main memory 2, is rarely updated once written. Files having such extensions have relatively high access frequencies among various files, but it is predicted that the access frequencies of these files are lower than the access frequency in the text area of the program (kernel). Therefore, the operating system 27 sets the SW_Color at 1 and the SR_Color at 3 for the data having the above-mentioned extensions. This setting shows that the write frequency predicted from the data is extremely low and the read frequency predicted is high. That is, it is predicted that data having such extensions are only rewritten several times in the event of the update of the operating system or installation of another program and are mostly treated in a read-only form.

Picture data such as data having a JPEG extension and movie data such as data having a MOV extension are hardly rewritten once written. It is predicted that such picture and movie data are less frequently accessed by the program. Therefore, the operating system 27 sets lower values for the SW_Color and the SR_Color in the case of the picture and movie data.

Figure 43:
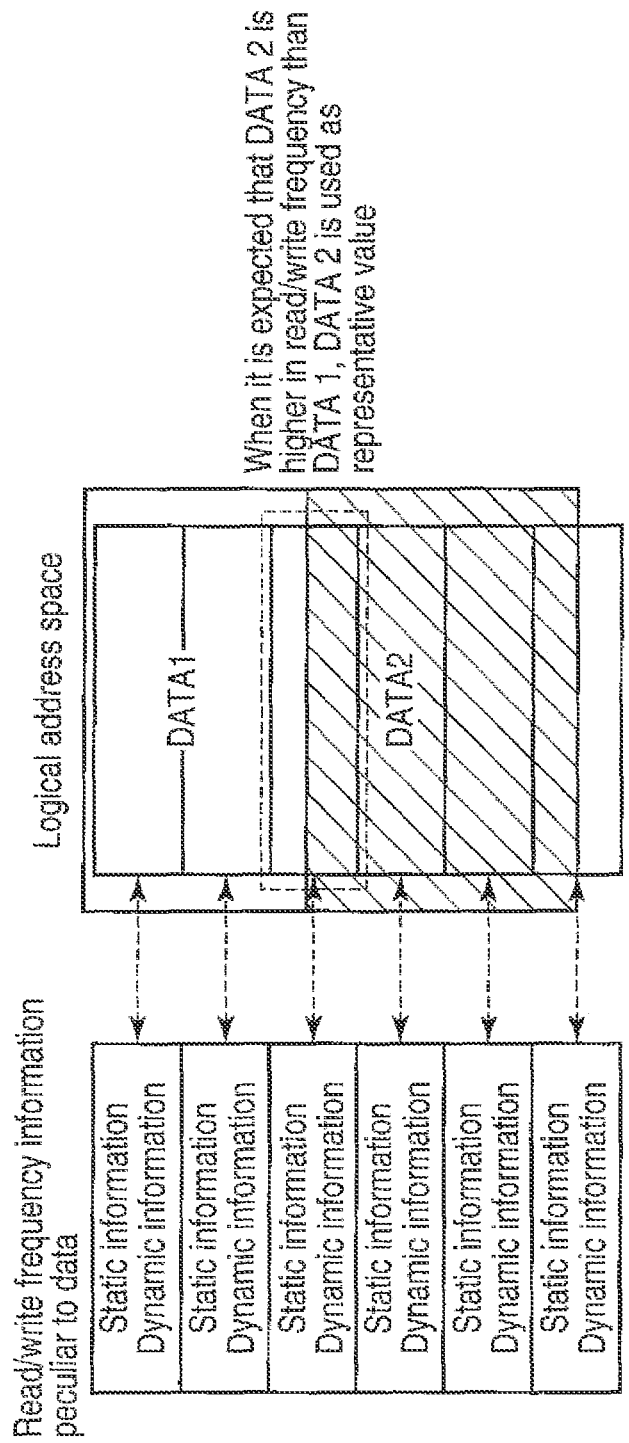
FIG. 43 is a diagram showing a first example of an alignment of entries of the coloring table.

FIG. 43 is a diagram showing a first example of an alignment of entries in the coloring table.

FIG. 44 is a diagram showing a second example of an alignment of entries in the coloring table.

The entries in the coloring table are adapted to the minimum reading/writing size of data (e.g., the page size of the NAND type flash memory). However, the process is not obliged to map data in the logical address space in alignment with the minimum reading/writing size of data. Therefore, there is a possibility that a plurality of data may correspond to one entry in the coloring table.

In such a case, as shown in FIG. 43, the operating system 27 sets, as representative data, data for which the highest read or write frequencies are predicted, among the plurality of data corresponding to one entry.

Alternatively, as shown in FIG. 44, the operating system 27 uses the size of the data occupying one entry as a weight, and sets weighted averages of the SW_Color and the SR_Color of each data.

The SW_Color and the SR_Color indicated by the coloring table 14 may be embedded in a source code of, for example, the operating system 27 by a program creator, or predicted by the operating system 27. However, the file or the picture data may be used contrary to the intention of a program developer. In general, access to picture data or the like is mostly intended for reading, and the contents of the picture are rarely rewritten. However, when a particular picture is treated by a picture processing program, the picture being processed may be frequently rewritten. In such a case, if the user can rewrite the SW_Color and the SR_Color in the coloring table 14, the particular file can be moved to an area which allows for a higher speed and a greater number of times of writing. In order to enable such operation, the file system of the operating system 27 is preferably designed so that the access frequency information peculiar to each data can be rewritten on software of the operating system 27. For example, a system is designed so that an attribute of a file set in the coloring table 14 can be viewed on a GUI screen if the property of the file is opened on a general browser. The operating system 27 is preferably designed so that the user can change initial data corresponding to the file included in the coloring table 14 on the GUI.

Next, an operation of reading data from the composite main memory 2 according to the information processing device which uses the memory management device 1 of this embodiment is described in detail.

When a data read request is made by the processor 3b, a virtual logical address issued by the processor 3b is converted into a logical address assigned to the logical address space (addition of at least one of a CPUID and process ID). Then, the memory management device 1 reads data from the volatile semiconductor memory 8 or the nonvolatile semiconductor memories 9, in accordance with the converted logical address. When data corresponding to the logical address is present in the memory area of the volatile semiconductor memory 8, the data on the volatile semiconductor memory 8 is loaded into the secondary cache memory 5b via the memory management device 1.

When no data corresponding to the logical address is present on the volatile semiconductor memory 8, the memory management device 1 searches for a block address and page address within chips of the nonvolatile semiconductor memories 9, 10 corresponding to the logical address based on the address conversion information 13 in the information storage unit 17. Then, the memory management device 1 reads necessary data from a predetermined page in a specified block within the chips of the nonvolatile semiconductor memories 9, 10.

Here, the memory management device 1 refers to the access frequency information peculiar to data corresponding to the logical address to determine a reading method on the basis of the coloring table 14.

Figure 45:
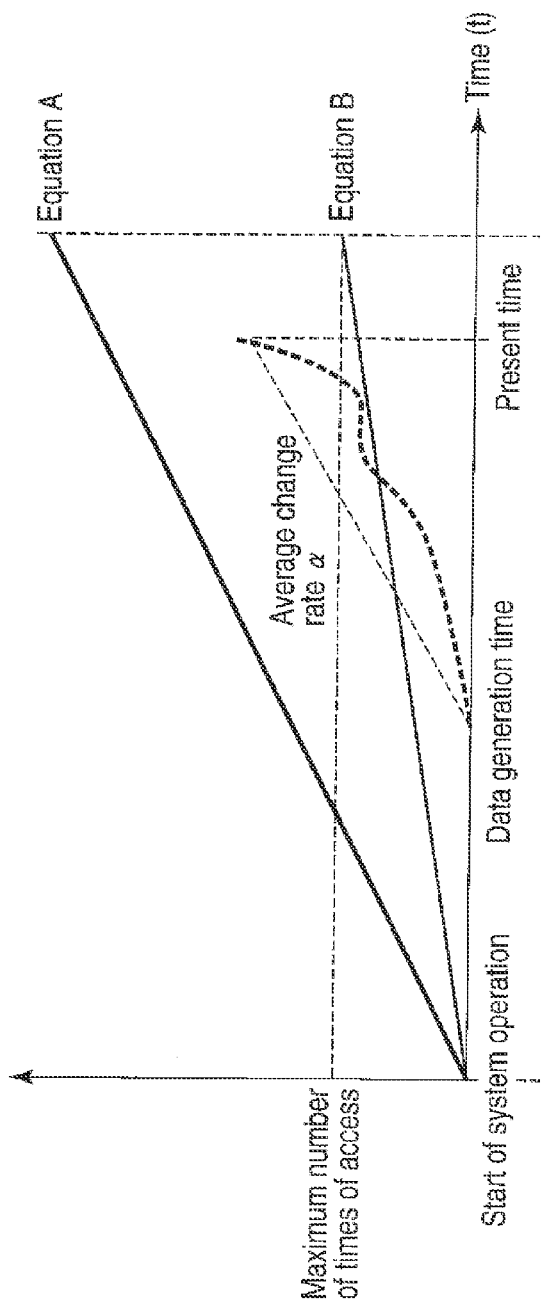
FIG. 45 is a graph showing an example of a method of calculating a write frequency and a read frequency in the coloring table.

FIG. 45 is a graph showing one example of a method of calculating a write frequency and a read frequency in the coloring table 14.

The developer of the operating system 27 sets the SW_Color and the SR_Color by use of, for example, the previously described standard in accordance with the data reading method and the data writing method installed in the memory management device 1.

Figure 46:
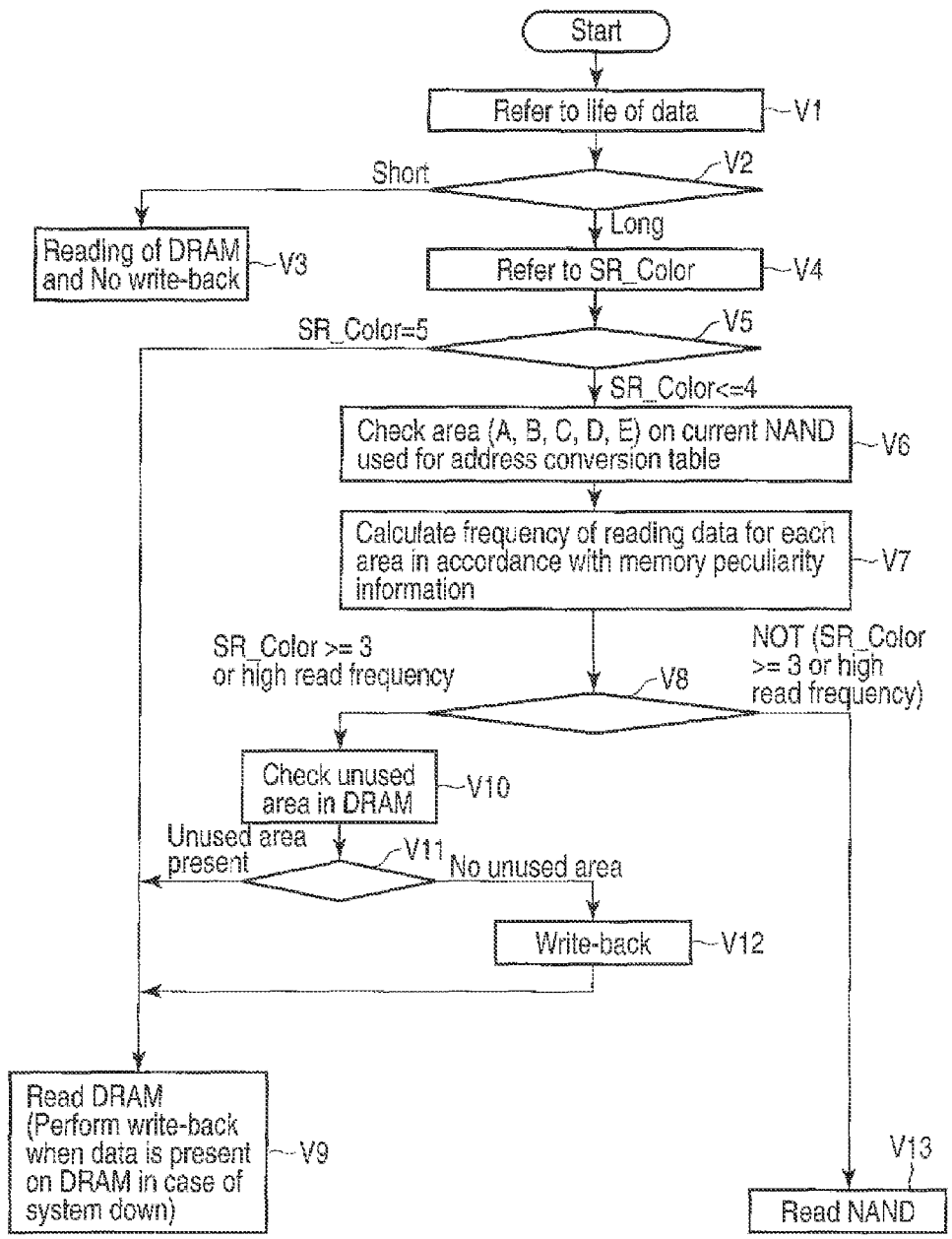
FIG. 46 is a flowchart showing an example of processing of determining a reading method performed by a memory management device according to the tenth embodiment.

FIG. 46 is a flowchart showing one example of the processing of determining the reading method performed by the memory management device 1 according to this embodiment.

The SR_Color in FIG. 46 corresponds to the SW_Color in the coloring table 14. The write frequency and the read frequency in the coloring table 14 are values calculated by the memory management device 1 using the number of times of writing, the number of times of reading and the data generation time included in the coloring table 14, the memory usage information 11, the memory peculiarity information 12.

In steps V1 to V13 in FIG. 46, how data is read by the memory management device 1 in accordance with, for example, the SR_Color set in FIGS. 41 and 42 is described.

First, it is estimated that reading is performed in many cases and writing is less likely to be performed in a text area of the kernel for which the SR_Color is set at 5 and the SW_Color is set at 1. First data in the text area of the kernel is read when the operating system performs various kinds of processing, so that the first data is read many times and needs to be read at a higher speed.

The memory management device 1 writes the first data read from the nonvolatile semiconductor memory 9 or 10 into the secondary cache memory 5b or the primary cache memory 4b of the processor 3b. And, the memory management device 1 transfers the read first data to the memory area of the volatile semiconductor memory 8 in the composite main memory 2 in parallel.

When the same first data is read again, the first data is read from the secondary cache memory 5b or the primary cache memory 4b of the processor 3b. Alternatively, when there is no cache hit, the first data is read from the memory area of the volatile semiconductor memory 8 in the composite main memory 2. The first data stored in the memory area of the volatile semiconductor memory 8 on the composite main memory 2 is retained on the volatile semiconductor memory 8 until power is turned off.

Furthermore, the data area of the kernel for which the SR_Color is set at 5 and the SW_Color is set at 5 is newly generated and initialized whenever the system starts. Therefore, it is estimated that the life of second data in the data area of the kernel is short. The memory management device 1 initially refers to the life of the second data. The second data is always present on the volatile semiconductor memory 8 during the operation of the system, and is erased from the volatile semiconductor memory 8 when the power is turned off.

Moreover, in the area of the user program for which the SR_Color is set at 4 and the SW_Color is set at 1, the read frequency of the area of the user program is lower than the read frequency by the kernel which is frequently called from various processes. Third data in the area of the user program is located in the memory area of the volatile semiconductor memory 8. When the memory area of the volatile semiconductor memory 8 in the composite main memory 2 is full, the third data is targeted for a write-back from the volatile semiconductor memory 8 to the memory area of the nonvolatile semiconductor memory 9 or 10. The order of the third data to be erased is determined on the basis of the information in the coloring table 14. In the case of the write-back, the third data is moved from the volatile semiconductor memory 8 to the nonvolatile semiconductor memory 9 or 10 in ascending order of the number of times of reading.

Among fourth data in the area which is dynamically secured by the program and for which the SR_Color is set at 4 and the SW_Color is set at 4, fourth data for which a short data life is specified is always present on the volatile semiconductor memory 8 during the operation of the system as in the data area of the kernel, and is erased from the volatile semiconductor memory 8 when the power is turned off.

On the other hand, the fourth data for which a long data life is specified is located in the memory area of the volatile semiconductor memory 8. When the memory area of the volatile semiconductor memory 8 in the composite main memory 2 is full, such fourth data is targeted for a write-back from the volatile semiconductor memory 8 to the memory area of the nonvolatile semiconductor memory 9 or 10.

Next, data treated as a file which is referred by the process is described. In FIGS. 41 and 42, a long data life is set for all the files.

It is estimated by the operating system 27 that the write frequency is extremely low and the read frequency predicted is high in the case of fifth data included in a file group for which the SW_Color is set at 1 and the SR_Color is set at 3. Here, the memory management device 1 locates the fifth data in the memory area of the volatile semiconductor memory 8. When the memory area of the volatile semiconductor memory 8 in the composite main memory 2 is full, the fifth data is targeted for a write-back from the volatile semiconductor memory 8 to the memory area of the nonvolatile semiconductor memory 9 or 10.

It is estimated by the operating system 27 that the write frequency is extremely low and the read frequency predicted is also low in the case of sixth data included in a file group for which the SW_Color is set at 1 and the SR_Color is set at 2. Thus, when the read frequency is not judged to be high, the memory management device 1 directly accesses the nonvolatile semiconductor memory 9 or 10 without copying the data in the memory area of the volatile semiconductor memory 8 at the time of reading.

It is estimated by the operating system 27 that the write frequency is extremely low and the read frequency predicted is also extremely low in the case of seventh data included in a file group for which the SW_Color is set at 1 and the SR_Color is set at 1. Thus, when the read frequency is not judged to be high, the memory management device 1 directly accesses the nonvolatile semiconductor memory 9 or 10 without copying in the memory area of the volatile semiconductor memory 8 at the time of reading.

FIG. 47 is a flowchart showing one example of read processing in the memory management device 1 according to this embodiment.

In steps W1 to W10 in FIG. 47, the memory management device 1 refers to the number of times of reading the page address corresponding to the memory usage information 11 in the information storage unit 17 and the upper limit number of times of reading the memory peculiarity information 12.

The memory management device 1 checks whether the number of times of the reading from memory stored in the memory usage information 11 is beyond the upper limit number of times of reading.

When the number of times of reading from the memory is not beyond the upper limit number of times of reading, the memory management device 1 increments the number of times of reading in the information storage unit 17.

When the number of times of reading from the memory is beyond the upper limit number of times of reading, the memory management device 1 copies data in all the pages in the block to another block in the same memory space (SLC area (binary area), the multivalued area of the 2 bit/cell, the multivalued area of the 3 bit/cell, the multivalued area of the 4 bit/cell). When the data is thus copied, it is preferable that the memory management device 1 search for a fresh block with a smaller number of times of reading and relocate (move) the whole page data into the block. When the read processing is successful, the memory management device 1 increments the number of times of reading in the coloring table 14.

FIG. 48 is a flowchart showing one example of data write processing in the memory management device 1 according to this embodiment.

In steps X1 to X8 in FIG. 48, when a data write request is made by the processes (programs) 6a to 6c, the processors 3a to 3c check whether data is present on the primary cache memories 4a to 4c or the secondary cache memories 5a to 5c provided in the processors 3a to 3c.

When data is present on the primary cache memories 4a to 4c or the secondary cache memories 5a to 5c, the processors 3a to 3c rewrite the data on the primary cache memories 4a to 4c or the secondary cache memories 5a to 5c, so that the write operation ends.

When the write target data is not on the primary cache memories 4a to 4c or the secondary cache memories 5a to 5c, the memory management device 1 converts the virtual logical address into a logical address assigned to the logical address space.

When data corresponding to the converted logical address is present on the volatile semiconductor memory 8, the memory management device 1 performs writing into the volatile semiconductor memory 8 of the composite main memory 2.

When the data corresponding to the logical address is not present on the volatile semiconductor memory 8, the memory management device 1 performs writing into the memory area of the nonvolatile semiconductor memories 9 or 10, as shown in FIG. 48. At the time of data generation, write addresses of the nonvolatile semiconductor memory 9 or 10 corresponding to this logical address are determined on the basis of the entry in the coloring table 14 corresponding to the logical address and on the basis of the memory usage information 11 and the memory peculiarity information 12 that are stored in the information storage unit 17 of the memory management device 1. After the write addresses have been determined, the memory management device 1 writes information associated with the determined write address into the address conversion information 13. When the writing is successful, the memory management device 1 increments the number of times of writing in the coloring table 14.

FIG. 49 is a flowchart showing one example of write destination area determining processing performed by the memory management device 1 according to this embodiment. The memory management device 1 performs the determination of a write destination area in FIG. 49 in accordance with the coloring table 14. For example, the attributes of the coloring table 14 used to determine a memory area are the SW_Color, the SR_Color and the write frequency.

The developer of the operating system 27 performs the setting as shown in FIGS. 41 and 42 for the data reading method and the data writing method installed in the memory management device 1. Steps Y1 to Y12 in FIG. 49 show how data is read by the memory management device 1 in accordance with the setting shown in FIGS. 41 and 42.

First, it is estimated that the first data in the text area of the kernel for which the SR_Color is set at 5 and the SW_Color is set at 1 is read many times and is less likely to be written. The first data is moved to the volatile semiconductor memory 8 during the operation of the system and read or written on the basis of the reading method determining operation shown in FIG. 46. Thus, the frequency at which the first data is actually written into the nonvolatile semiconductor memories 9, 10 is low. However, the importance of the first data is high, so that in FIG. 49, the memory management device 1 writes the first data in an area B of the nonvolatile semiconductor memory 9 which is an SLC.

Furthermore, the data area of the kernel for which the SR_Color is set at 5 and the SW_Color is set at 5 is newly generated and initialized whenever the system is started. Therefore, it is estimated that the life of the second data in the data area of the kernel is short. The memory management device 1 initially refers to the life of the second data. The second data is always present on the volatile semiconductor memory 8 during the operation of the system, and is erased from the volatile semiconductor memory 8 when the power is turned off. Therefore, the second data is never written into the memory areas of the nonvolatile semiconductor memories 9, 10.

Moreover, in the area of the user program for which the SR_Color is set at 4 and the SW_Color is set at 1, the read frequency of the area of the user program is lower than the read frequency by the kernel which is frequently called from various processes. The third data in the area of the user program is written into the memory area of the nonvolatile semiconductor memories 9 or 10 only when there is no access to this third data for a long time based on the reading operation shown in FIG. 46. Thus, the frequency at which the third data is written into the nonvolatile semiconductor memory 9 or 10 is low. The importance of the third data is lower than the importance of the data in the text area of the kernel, so that in FIG. 49, the third data is written in an area A which is an MLC area.

Among the fourth data in the area dynamically secured by the program for which the SR_Color is set at 4 and the SW_Color is set at 4, the fourth data for which a short data life is specified is always present on the volatile semiconductor memory 8 during the operation of the system as in the data area of the kernel. The memory management device 1 initially refers to the life of the data. The fourth data is always present on the volatile semiconductor memory 8 during the operation of the system, and is erased from the volatile semiconductor memory 8 when the power is turned off. Therefore, the fourth data is never written into the memory areas of the nonvolatile semiconductor memories 9, 10.

On the other hand, the fourth data for which a long data life is specified is located in the memory area of the volatile semiconductor memory 8. When the memory area of the volatile semiconductor memory 8 in the composite main memory 2 is full, such fourth data is targeted for a write-back from the volatile semiconductor memory 8 to the memory area of the nonvolatile semiconductor memory 9 or 10. The importance of the data in the text area of the program is high, so that the data in the text area of the program is written in an area C which is an SLC area.

Next, data treated as a file which is referred by the process is described. In FIGS. 41 and 42, a long data life is set for all the files.

It is estimated by the operating system 27 that the write frequency is extremely low and the read frequency predicted is high in the case of fifth data included in a system file group for which the SW_Color is set at 1 and the SR_Color is set at 3. Here, the memory management device 1 locates the fifth data in the memory area of the volatile semiconductor memory 8. When the memory area of the volatile semiconductor memory 8 in the composite main memory 2 is full, the fifth data is targeted for a write-back from the volatile semiconductor memory 8 to the memory areas of the nonvolatile semiconductor memory 9 or 10. The write frequency of the fifth data is judged to be low, the memory management device 1 locates the fifth data in the MLC area.

It is estimated by the operating system 27 that the write frequency is extremely high and the read frequency predicted is also high in the case of a file group for which the SW_Color is set at 3 and the SR_Color is set at 3. Thus, the memory management device 1 locates, in the SLC area, the data in the file group for which the SW_Color is 3 and the SR_Color is 3.

It is estimated by the operating system 27 that the write frequency is extremely low and the read frequency predicted is also low in the case of sixth data included in a file group for which the SW_Color is set at 1 and the SR_Color is set at 2. The importance of the sixth data as a file is also judged to be low, so that the memory management device 1 locates the sixth data in the MLC area.

It is estimated by the operating system 27 that the write frequency is extremely low and the read frequency predicted is also extremely low in the case of seventh data included in a file group for which the SW_Color is set at 1 and the SR_Color is set at 1. The importance of the seventh data as a file is also judged to be low, so that the memory management device 1 locates the seventh data in the MLC area.

Next, the determination of a write destination physical address in the memory area is described.

When a write target memory area is determined by the above-described processing, the memory management device 1 determines a write destination block address. In this case, the memory management device 1 refers to the coloring table 14 and suitably selects the write destination block address, thereby inhibiting the generation of wear-leveling and reducing unnecessary erasing processing.

Details of a technique for inhibiting the generation of the wear-leveling are described below.

In general, the wear-leveling interchanges data between blocks. Thus, the number of times of erasure is leveled by the frequency of the wear-leveling. Erasure in a block is performed each time in the wear-leveling. If the frequency of the wear-leveling is reduced, there is a trade-off between a decrease in the number of times of erasure and the absence of leveling of the block to be erased. In an algorithm in which the difference in the number of times of erasure between blocks triggers the wear-leveling, the frequency of the wear-leveling depends on the threshold value for the difference in the number of times of erasure. In this embodiment, in order to achieve leveling in such a manner as to avoid the increase of erasure by the wear-leveling, the memory management device 1 uses the access frequency information peculiar to data, and selects a suitable write target block when the writing processing is executed.

Figures 50, 52:
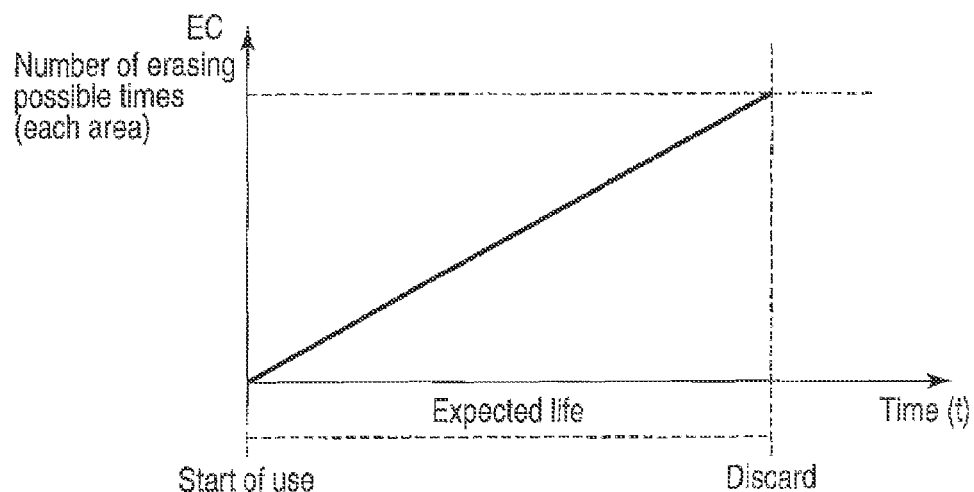
FIG. 50 is a graph showing an example of transition of the number of times of erasure in a block of a nonvolatile semiconductor memory.
FIG. 52 shows an example of a table for determining a referential number of times of erasure in accordance with information in the coloring table 14.

FIG. 50 is a graph showing one example of a transition of the number of times of erasure in a given block of the nonvolatile semiconductor memories 9, 10.

An ideal number of times of erasure changes with the passage of time. In an information processing device which uses a NAND type flash memory, the NAND type flash memory deteriorates in the future, and there will be a need for the replacement of the memory. In order to use a great number of blocks of the NAND type flash memory before the replacement of the memory, the number of times of erasure needs to be leveled by the wear-leveling. In FIG. 50, the transition of the number of times of erasure in a given block of the NAND type flash memory is shown.

In order for all the blocks to follow the transition of the number of times of erasure shown in FIG. 50, the threshold value for the difference in the number of times of erasure between blocks is lowered in the wear-leveling.

FIG. 51 is a graph showing one example of a change made when the threshold value for the difference in the number of times of erasure is lowered in the wear-leveling.

Broken lines in FIG. 51 indicate a range of variation in the number of times of erasure in each block. FIG. 51 shows how the erasure processing for the wear-leveling is increased by the decrease of the threshold value with the result that the life of the whole NAND type flash memory is reduced.

In order to reduce the dispersion (diffusion) of the number of times of erasure and the number of times of the erasure processing performed by the wear-leveling, the memory management device 1 selects a block to erase, in accordance with the access frequency information for data when writing the data.

FIG. 52 shows one example of a table for determining a referential number of times of erasure in accordance with the information in the coloring table 14.

The memory management device 1 calculates a referential number of times of erasure in accordance with parameters in the coloring table 14, and selects a block having a number of times of erasure closest to the referential number of times of erasure. For the referential number of times of erasure in the block, the minimum number of times of erasure in the block within the current memory area is used as the minimum value (a usage rate of 0%), and the value in which the threshold value of the wear-leveling is added to the minimum number of times of erasure is used as the maximum value (a usage rate of 100%).

In FIG. 52, the SW_Color in the coloring table 14 and the write frequency are used to calculate the referential number of times of erasure. However, the SW_Color and the read frequency may be used as parameters to restrain the wear-leveling.

FIG. 53 is a graph showing one example of grouping of blocks in accordance with the number of times of permitted (possible) erasure.

FIG. 54 is a table showing a judgmental standard for the grouping of blocks in accordance with the number of times of permitted erasure.

In this embodiment, the blocks are grouped for each memory area in accordance with the number of times of permitted erasure. Information indicating the results of the grouping of the blocks is saved as the memory peculiarity information 12. The information indicating the results of the grouping of the blocks may be saved as the memory usage information 11.

A thick line in FIG. 53 indicates the transition of the minimum number of times of erasure, and a broken line indicates the threshold value of the wear-leveling. As shown in FIG. 53, each block is divided into groups for the respective numbers of times of erasure within the threshold value (within the variation) of the wear-leveling.

When data in a certain block is erased and data can be written into this block again, the memory management device 1 judges to which the groups of the block belong in accordance with the judgment table shown in FIG. 54, and stores the result of the judgment in the memory peculiarity information 12.

Figure 55:
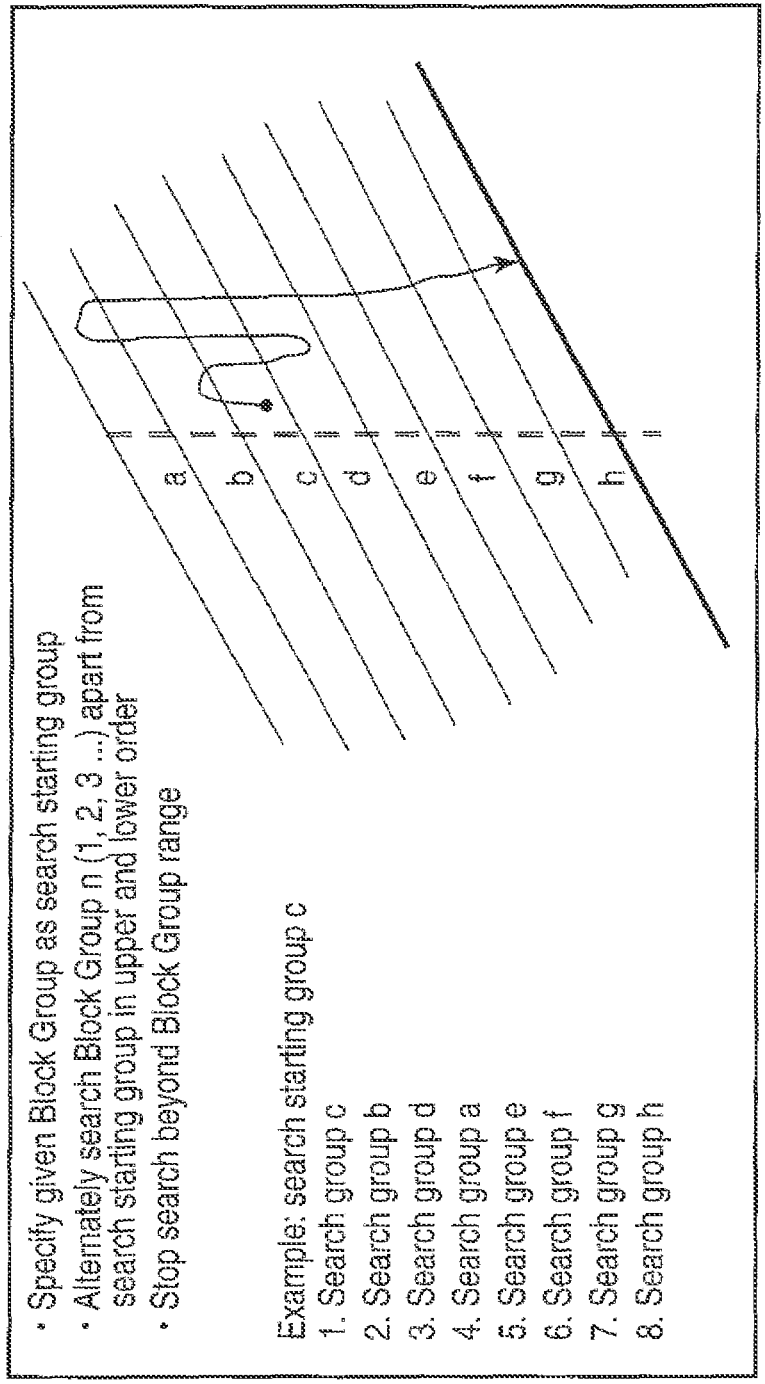
FIG. 55 is a diagram showing an example of a search for a group to which a block belongs in the wear-leveling on the basis of the information in the coloring table.

FIG. 55 is a diagram showing one example of a search for a group to which a block belongs in the wear-leveling on the basis of the information in the coloring table 14.

The memory management device 1 determines a group of a block which serves as the reference for the block search, on the basis of the information in the coloring table 14.

When a group of a block to serve as the reference for the search is determined, the memory management device 1 searches the block groups around the referential group until the relevant block is found, as shown in FIG. 55. When a physical address of the area to write data is determined by this search, the memory management device 1 writes the data and updates the address conversion information 13.

The memory management device 1 may determine a write address using a different block search method. For example, the memory management device 1 manages writable blocks (erased) in accordance with a tree structure (e.g., B-Tree B+Tree RB-Tree) in which the number of times of erasure serves as a key and in which a block to erase serves as a node. Thus, the memory management device 1 saves this management information in the memory peculiarity information 12 or the memory usage information 11. The memory management device 1 searches the tree using the referential number of times of erasure as a key, and thereby selects a block having the closest number of times of erasure.

If data is erased by a given process 3b, the operating system 27 erases the contents of this data in the coloring table 14. When the contents in the coloring table 14 are erased, the memory management device 1 erases the physical address corresponding to the logical address of the erasure target data in the address conversion information 13.

When the erasure target data is located in the volatile semiconductor memory 8, the erasure target data of the volatile semiconductor memory 8 is erased.

FIG. 56 is a block diagram indicating an example of a memory management device in which a cache memory is further included in the memory management device 1 according to this embodiment.

This memory management device 32 is equipped with a cache memory 33 in addition to the configuration similar to that of the memory management device 1.

The processor 3b can directly access the cache memory 33 as well as the primary cache memory 4b and the secondary cache memory 5b.

In the event of a page-in or page-out in any one of the primary cache memory 4b, the secondary cache memory 5b and the cache memory 33, a memory management device 32 accesses the composite main memory 2.

In this embodiment described above, data arrangement is achieved on the basis of the durability of each memory in the composite main memory 2, so that the life of the composite main memory 2 can be prolonged.

Furthermore, in this embodiment, data arrangement is achieved on the basis of the reliability of each memory in the composite main memory 2, so that a crucial data loss in the composite main memory 2 can be prevented.

The use of the memory management device 1 and the composite main memory 2 according to this embodiment makes it possible to reduce swaps.

In this embodiment, the nonvolatile semiconductor memories 9, 10 are used as the main memory. Thus, the storage capacity of the main memory can be higher, and there is no need for a secondary memory device using an HDD/SSD.

In this embodiment, the number of layers of the memory hierarchy can be reduced, and the structure of the operating system 27 can be simpler. For example, in this embodiment, the primary cache memories 4a to 4c, the secondary cache memories 5a to 5c and the composite main memory 2 can be treated in the same layer of the memory hierarchy.

In this embodiment, the nonvolatile semiconductor memories 9, 10 are used as the main memory, so that instant-on can be rapid.

In this embodiment, the life of the composite main memory 2 can be prolonged by using the memory usage information 11, the memory peculiarity information 12 and the coloring table 14 which includes the data peculiarity information. Moreover, memory conversion enabling high-speed access can be achieved.

In this embodiment, in reading data from the composite main memory 2, data based on the page size equal to the nonvolatile semiconductor memories 9, 10, a multiple of the page size, a block size or a multiple of the block size is once stored in the work memory 16. Then, necessary data (e.g., byte data) can be further transmitted from the work memory 16 to the processor 3b. This enables byte access in reading data.

The work memory 16 may be obtained by using at least one of the primary cache memories 4a to 4c and the secondary cache memories 5a to 5c in the processors 3a to 3c and the information storage unit 17.

In the embodiments described above, the write frequency may be the number of times of writing per unit time. The read frequency may be the number of times of reading per unit time.

In the ninth and tenth embodiments, the composite main memory 2 comprises the SLC nonvolatile semiconductor memories 9 and the MLC nonvolatile semiconductor memories 10.

The number of times of erasing of SLC and the number of times of erasing of MLC are different.

Thus a wear-leveling executed by the memory management device 1 may be changed in accordance with memory areas.

In this case, the erasing blocks are classified as a used group or a free group in accordance with states of the erasing blocks.

The used group is a group of erasing blocks which are data remaining state.

The free group is a group of erasing blocks which are data erased state.

When a difference in the number of times of erasing between an erasing block having a small number of times of erasing in the used group and an erasing block having a large number of times of erasing in the free group is above a threshold value, the memory management device 1 selects an used erasing block having a small (such as minimum) number of times of erasing in the used group and a free erasing block having a large (such as maximum) number of times of erasing in the free group. The memory management device 1 transfer data of the selected used erasing block to the selected free erasing block, converts the selected used erasing block to a block belonging to the free group, and converts the selected free erasing block to a block belonging to the used group.

The selected used erasing block is protected at a determined term, and the selected used erasing block is out of wear-leveling target.

By this wear-leveling, the number of times of block erasing is leveled in the SLC nonvolatile semiconductor memory 9, the number of times of block erasing is leveled in the MLC nonvolatile semiconductor memory 10.

The memory management device 1 changes the threshold value used the wear-leveling. In a SLC memory area, for example, the memory management device 1 determine whether or not to execute the wear-leveling based on a first threshold value used the wear-leveling. And in a MLC memory area, for example, the memory management device 1 determine whether or not to execute the wear-leveling based on a second threshold value used the wear-leveling.

Thus, the wear-leveling can be executed in each memory area in accordance with an appropriate condition.

What is claimed is:

1. An information processing device including a memory management device, comprising:
   a processor;
   a volatile memory;
   a non-volatile memory;
   an accepter which accepts write-target-data from the processor;
   a storage which holds a coloring level; and
   an operating system which generates an access frequency of the write-target-data and an importance of the write-target-data,
   wherein the operating system:
       calculates the coloring level based on the access frequency of the write-target-data and the importance of the write-target-data,
       obtains a threshold value for selecting the volatile memory or the non-volatile memory,
           wherein the threshold value is determined based on a remaining capacity of a usable area in the volatile memory and the non-volatile memory, and determines whether to write the write-target-data in the volatile memory or the non-volatile memory by comparing the coloring level and the threshold value.

2. The information processing device according to claim 1, wherein the importance is determined using static information.

3. The information processing device according to claim 2, wherein the access frequency is determined based on static information and dynamic information.

4. The information processing device according to claim 1, wherein the volatile memory and non-volatile memory comprise different areas of a memory addressable by the operating system.

5. An information processing device including a memory management device, comprising:
   a processor;
   a volatile memory;
   a non-volatile memory;
   an accepting section which accepts write-target-data from the processor;
   a storage which holds a coloring level; and
   an operating system which generates an access frequency of write-target-date and importance of the write-target-data, wherein the operating system:
      calculates the coloring level based on the access frequency of the write-target-data and the importance of the write-target-data, where coloring level =min, (importance×W+access frequency ×(1−W))), W is the correction value for weighting the importance and the access frequency, $0 \leq W \leq 1$, the importance is min(9, max(static importance, importance designated by user), $0 \leq$ static importance $\leq 9$, the access frequency=static access frequency ×T, the static access frequency=max(access frequency designated by the user, access frequency designated by the operating system), T=max(0,(−access time interval/maximum access time interval)+1), and $0 \leq T \leq 1$,
      obtains a threshold value for selecting the volatile memory or the non-volatile memory wherein the threshold value is determined based on a remaining capacity of a usable area in the volatile memory and the non-volatile memory, and
      determines whether to write the write-target data in the volatile memory or the non-volatile memory by comparing the coloring level and the threshold value.

6. A new method for managing memory on an information processing device, comprising:
   receiving write-target-data from a processor of the information processing device;
   at an operating system executing on the information device:
      obtaining an access frequency and an importance of the write-target-data;
      calculating a coloring level for the write-target-data based on the access frequency of the write-target-data and the importance of the write-target-data;
      storing the coloring level for the write-target-data;
      determining a threshold value based on a remaining capacity of a usable area in a volatile memory and a non-volatile memory of the information processing device; and
      determining whether to write the write-target-data in the volatile memory or the non-volatile memory by comparing the coloring level and the threshold value.

7. The method according to claim 6, wherein the importance is determined using static information.

8. The method according to claim 7, wherein the access frequency is determined based on static information and dynamic information.

9. The method according to claim 6, wherein the volatile memory and non-volatile memory comprise different areas of a memory addressable by the operating system.

\* \* \* \* \*